United States Patent [19]

Woods et al.

[11] 4,099,234

[45] Jul. 4, 1978

[54] INPUT/OUTPUT PROCESSING SYSTEM UTILIZING LOCKED PROCESSORS

[75] Inventors: John M. Woods, Glendale; Marion G. Porter, Phoenix, both of Ariz.; Donald V. Mills, Rosenberg, Tex.; Edward F. Weller, III; Garvin Wesley Patterson, both of Glendale, Ariz.; Earnest M. Monahan, Phoenix, Ariz.

[73] Assignee: Honeywell Information Systems Inc., Waltham, Mass.

[21] Appl. No.: 741,632

[22] Filed: Nov. 15, 1976

[51] Int. Cl.² .................. G06F 15/16; G06F 11/00
[52] U.S. Cl. ................................. 364/200; 235/303.4
[58] Field of Search ............... 364/200; 235/153 AK

[56] References Cited

U.S. PATENT DOCUMENTS

| | | | |
|---|---|---|---|
| 3,386,082 | 5/1968 | Stafford | 364/200 |
| 3,409,877 | 11/1968 | Alterman | 235/153 AK |
| 3,503,048 | 3/1970 | Ausan | 364/200 |
| 3,517,174 | 6/1970 | Ossfeldt | 364/200 |
| 3,557,315 | 1/1971 | Kobus | 235/153 AK |
| 3,812,468 | 5/1974 | Wollum | 364/200 |
| 3,828,321 | 8/1974 | Wilber | 364/200 |
| 3,838,261 | 9/1974 | Rice | 235/153 AK |
| 3,864,670 | 2/1975 | Inoue | 364/200 |
| 3,898,621 | 8/1975 | Zelinski | 364/200 |
| 3,908,099 | 9/1975 | Borbas | 235/153 AK |
| 3,921,141 | 11/1975 | Wilber | 364/200 |
| 3,958,111 | 5/1976 | Hackett | 235/153 AK |

*Primary Examiner*—James D. Thomas
*Attorney, Agent, or Firm*—Faith F. Driscoll; Nicholas Prasinos; Ronald T. Reiling

[57] ABSTRACT

An input/output system includes at least a pair of processing units and system interface apparatus for comparing the results produced by both halves of the pair during normal system operation under control of a main or host processing unit. The system interface apparatus includes comparison circuits for detecting a mis-compare between the results of each half and sequence control logic circuits which are conditioned upon the occurrence of a mis-compare to unlock or deconfigure the pair to establish in a predetermined manner which of the processing units is faulty. The system interface apparatus, following signal indications of a certain minimum confidence within a processing unit, continues testing of the processor using stored diagnostic routines to determine which one of the processing units is good. It then stops the operation of the bad processing unit and enables system operation to be continued with the good processing unit. To ensure reliable processing, both halves of the pair are tested when a miscompare cannot be related to an error condition associated with one of the pair notwithstanding the fact that the first processing unit tests well. Following reconfiguration, the operating system associated with the system provides periodic testing of the good processing unit, thereby ensuring that the system continues to operate reliably.

41 Claims, 34 Drawing Figures

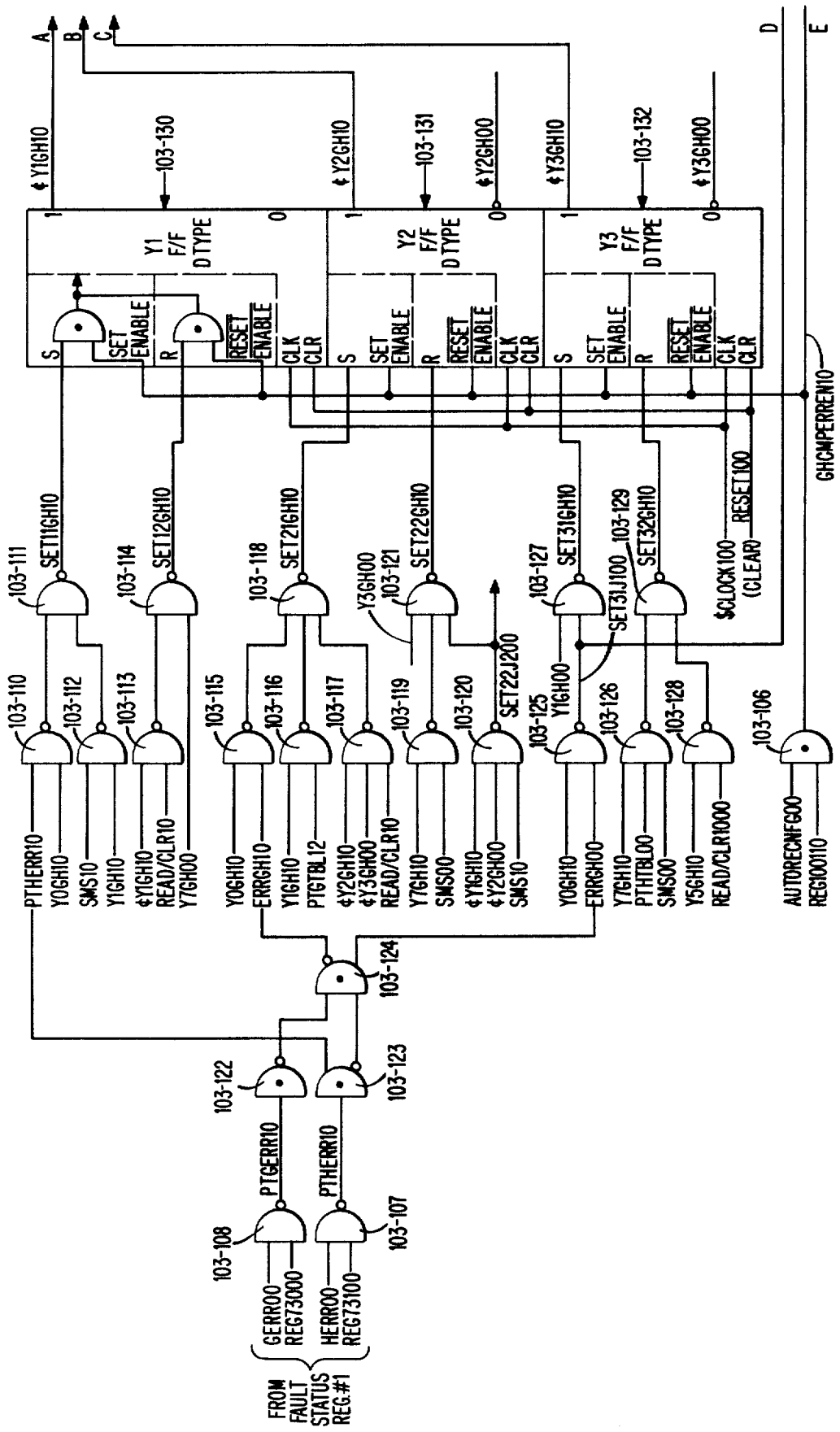
Fig. 3d (sheet 1 of 2).

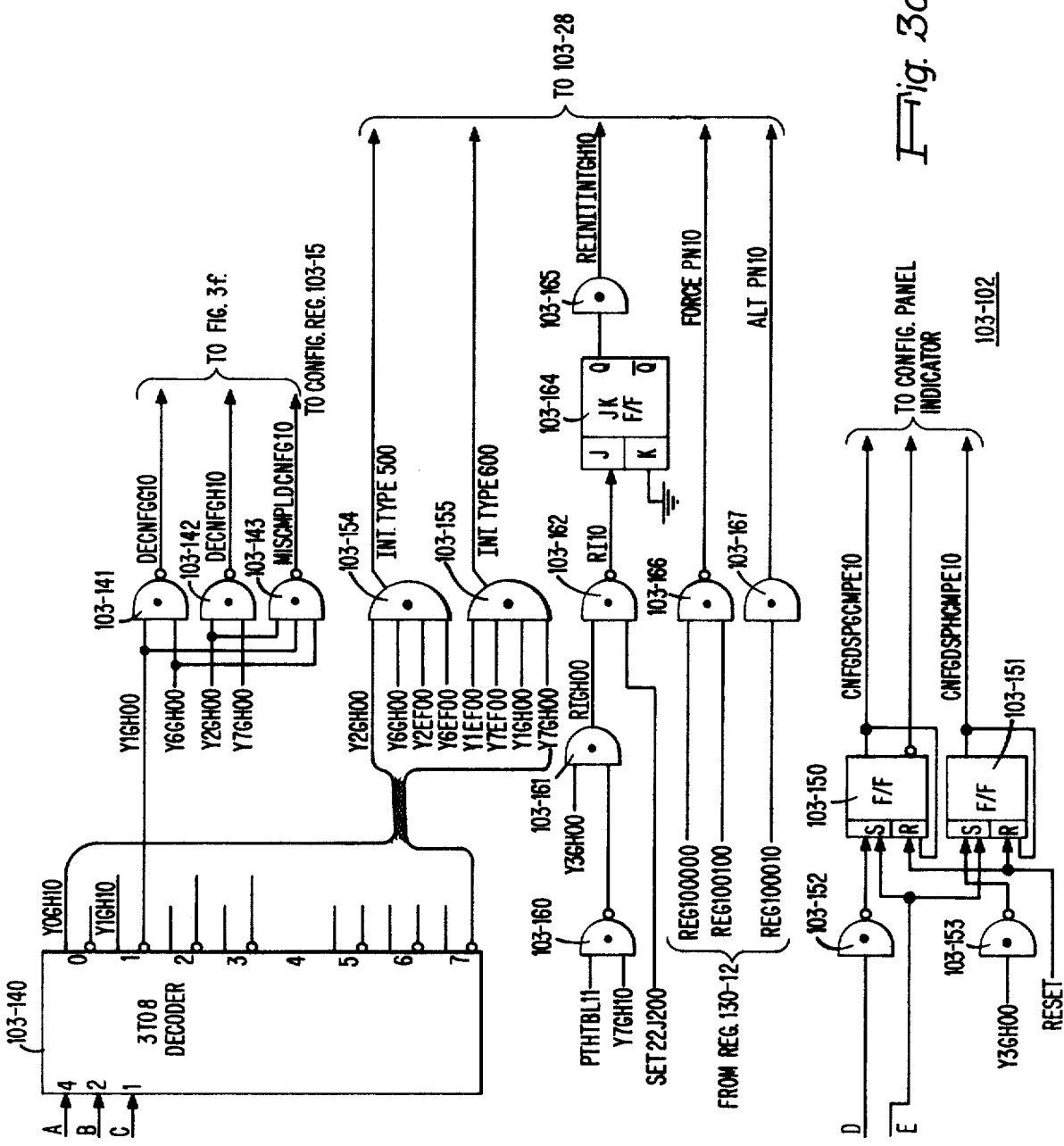
Fig. 3d (sheet 2 of 2).

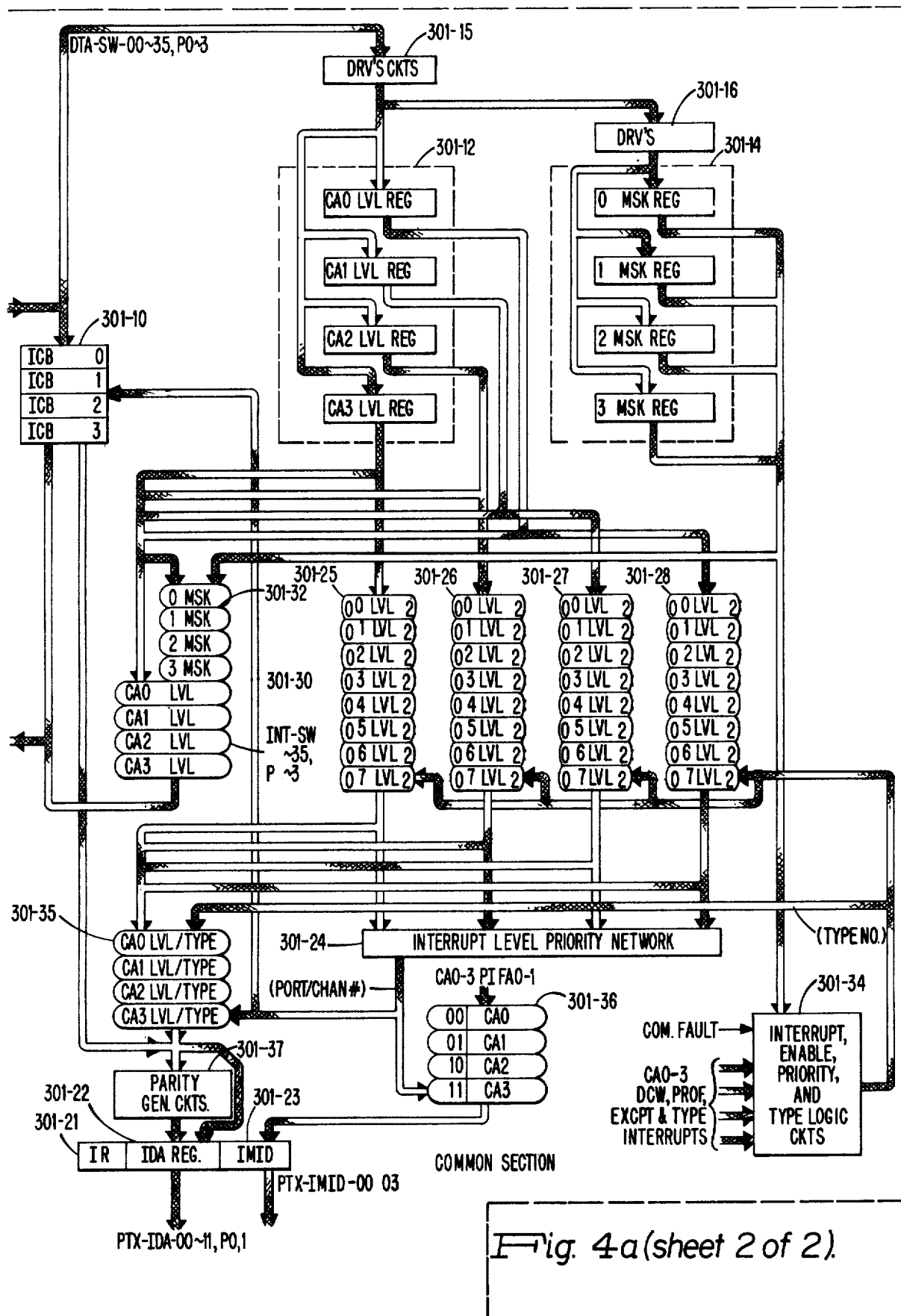
Fig. 4a (sheet 2 of 2).

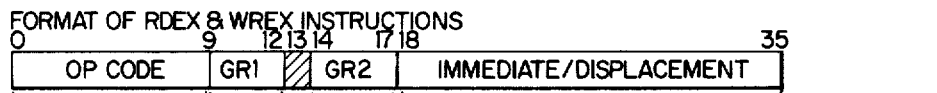
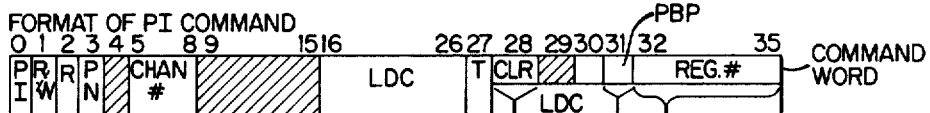
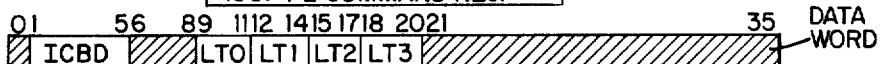
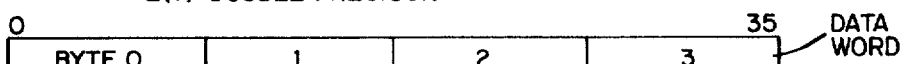

CONFIGURATION REGISTER 00₈

| 0 | 8 9 | 23 24 | 27 28 | 29 30 31 | 34 35 |
|---|---|---|---|---|---|
| SIU I.D. | OPI'S | PID | E A I P | RFU PC | L M |

BIT 28 = EAIP = ENABLE ALTERNATE INTERRUPT PATH
RFU = RESERVED FOR FUTURE USE
* PC = PROCESSOR CONFIGURATIONS
BITS 31,32 = MODULE NO.1 CONFIGURATION
    X  X-MODULE F ENABLED (1=ENABLED)
         — MODULE E ENABLED (1=ENABLED)
BITS 33,34 = MODULE NO. 0 CONFIGURATION
    X  X-MODULE H ENABLED (1=ENABLED)
         — MODULE G ENABLED (1=ENABLED)
   LM = LOCAL MEMORY ASSIGNMENT
      1 = LOCAL MEMORY PORT 1 TO BE ACCESSED FOR BOOTLOAD
      0 = LOCAL MEMORY PORT 0 TO BE ACCESSED FOR BOOTLOAD
* BITS 31-32 OR
   33-34 = 11 MEANS THAT THE PROCESSORS ARE BOTH ENABLED, LOCKED AND RUNNING IN THE COMPARE MODE

SIU I.D. = SIU = 200₈ (010000000)
OPI'S = BIT 9 = OPI PRESENT ON PORT A
     10 = OPI PRESENT ON PORT B
       •               •
     18 = OPI PRESENT ON PORT K
     19 = OPI PRESENT ON LM0
     20 = OPI PRESENT ON LM1
     21 = OPI PRESENT ON RM0
     22 = OPI PRESENT ON RM1
     23 = RFU
PID = PROCESSOR IDENTIFIERS
  BIT 24 = 1 = MODULE PRESENT ON PORT E IS A PROC.
      25 = 1 = MODULE PRESENT ON PORT E HAS A PI INTERFACE
      26 = 1 = MODULE PRESENT ON PORT F IS A PROC.
      27 = 1 = MODULE PRESENT ON PORT F HAS A PI INTERFACE

*Fig. 8a.*

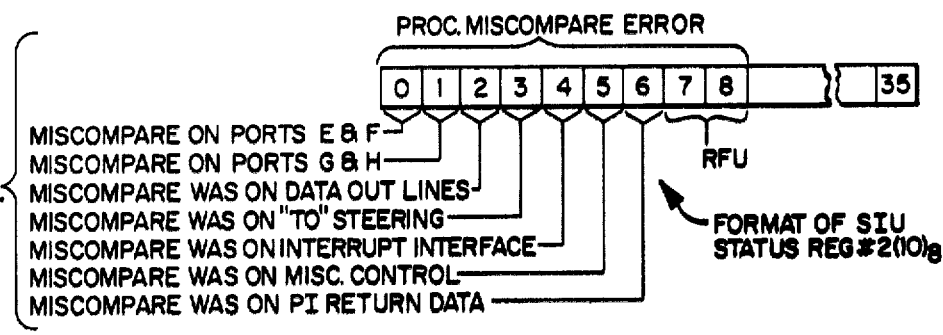

Fig. 8d.
- MISCOMPARE ON PORTS E & F
- MISCOMPARE ON PORTS G & H
- MISCOMPARE WAS ON DATA OUT LINES
- MISCOMPARE WAS ON "TO" STEERING
- MISCOMPARE WAS ON INTERRUPT INTERFACE
- MISCOMPARE WAS ON MISC. CONTROL
- MISCOMPARE WAS ON PI RETURN DATA

FORMAT OF SIU STATUS REG #2 (10)₈

INITIALIZE REGISTER (4)₈

| 0 | 13 14 | 27 28 | 35 |
|---|---|---|---|
| PORT MASK CONTROL REG. | PORT INITIALIZE CONTROL REG. | NA | |

BIT 0 = PORT A  1 = SET MASK  0 = RESET MASK
      •
      •
   9 = PORT K  1 = SET MASK  0 = RESET MASK
BIT 14 = PORT A  1 = SENT INITIALIZE TO PORT
      •
      •
   23 = PORT K  1 = SENT INITIALIZE TO PORT
NA = NOT AVAILABLE

*Fig. 8b.*

FAULT STATUS REGISTER #1 (7)₈

| 0 | 11 12 | 15 16 | | 21 22 23 24 25 26 27 28 | 31 32 | 35 0 | 15 |
|---|---|---|---|---|---|---|---|
| SID ERRORS | PORT POINTER | SIE | R E | P P F | L M 0 | L M 1 | L M 2 | L M 3 | PEL | PTL | PORT DESIGNATIONS |

SID ERROR = STEERING, INTERRUPT & DATA ERRORS IN THE SIU INTERRUPT & MULTIPLEXING LOGIC CIRCUITS
  BIT 0 = PARITY ERROR ON "TO" STEERING
    1 = PARITY ERROR ON "RETURN" STEERING
    2 = PARITY ERROR ON INTERRUPT LEVEL
    3 = PARITY ERROR ON INTERRUPT ICBD
    4 = PARITY ERROR ON PI DATA FROM LOGIC MODULE
    5 = PARITY ERROR ON DATA FROM ACTIVE PORT
    6 = PARITY ERROR ON DATA FROM MEMORY
    7 = PARITY ERROR ON BITS 4, 5 & 6 IS ON BYTE 0
    8 = PARITY ERROR ON BITS 4, 5 & 6 IS ON BYTE 1
    9 = PARITY ERROR ON BITS 4, 5 & 6 IS ON BYTE 2
    10 = PARITY ERROR ON BITS 4, 5 & 6 IS ON BYTE 3
    11 = RFU
PORT POINTER = THE SIU PORT NUMBER FROM WHICH THE ERROR IN BITS 0-11 EMANATED.

| PORT NO. | PORT DESIGNATED |
|---|---|
| 1101 | A |
| 1001 | B |
| 1010 | C |
| • | • |
| • | G |
| • | H |
| • | • |
| 0010 | L |
| 0000 | LM0 |
| 0100 | LM1 |
| 1000 | REMA0 |
| 1100 | REMA1 |

SIE = SIU INTERNAL ERRORS (SIU = PORT L)
  BIT 16 = COMMAND PARITY ERROR ON PI TO SIU PORT L
    17 = PARITY ERROR ON WRITE PI DATA TO SIU PORT L
    18 = ERROR IN BITS 16 & 17 IS ON BYTE 0
    19 = ERROR IN BITS 16 & 17 IS ON BYTE 1
    20 = ERROR IN BITS 16 & 17 IS ON BYTE 2
    21 = ERROR IN BITS 16 & 17 IS ON BYTE 3
  RE = RESTRICTED ERROR
  LM0-LM3 = ERROR INDICATED FROM LOCAL MEMORY
  PEL = PARITY ERROR LINES FROM PROCESSORS
  BIT 28 = PARITY ERROR INDICATED FROM PROCESSOR ON PORT E
    29 = PARITY ERROR INDICATED FROM PROCESSOR ON PORT F
    30 = PARITY ERROR INDICATED FROM PROCESSOR ON PORT G
    31 = PARITY ERROR INDICATED FROM PROCESSOR ON PORT H
  PTL = TROUBLE LINES FROM PROCESSORS
    32 = TROUBLE LINE FROM PROCESSOR ON PORT E
    33 = TROUBLE LINE FROM PROCESSOR ON PORT F
    34 = TROUBLE LINE FROM PROCESSOR ON PORT G
    35 = TROUBLE LINE FROM PROCESSOR ON PORT H
BITS 0-15 = PORT DESIGNATIONS
    THE ENCODED INFORMATION CONTAINED IN BITS 12-15 IS STORED IN BITS 0-15
    OF ANOTHER REGISTER PRIOR TO ENCODING.
  BIT 0 = PORT A
    1 = PORT B
    • •
    • •
    9   PORT K
  BIT 15 = REMA1

Fig. 8c.

100 = PROC. ERROR-NO MISCOMPARE
101 = MISCOMPARE-ERROR DETECTED
110 = MISCOMPARE-NO ERROR
111 = SIU INTERNAL ERROR
000 = SYSTEM INT.
001 = INTERVAL TIMER EXHAUST
010 = IOPP INTERCOMM.
011 = MEMORY ACCESS PANEL ENTRY

INPUT/OUTPUT PROCESSING SYSTEM UTILIZING LOCKED PROCESSORS

RELATED APPLICATIONS

1. "Steering Code Generating Apparatus For Use In An Input/Output Processing System" invented by Garvin Wesley Patterson, William A. Shelly, and Earnest M. Monahan, Ser. No. 562,362, filed on Mar. 26, 1975 now U.S. Pat. No. 4,000,487, and assigned to the same assignee as named herein.

2. "A Pathfinder Microprogram Control Store" invented by Garvin Wesley Patterson and Marion G. Porter, Ser. No. 562,363, filed on Mar. 26, 1975 now U.S. Pat. No. 4,000,788, and assigned to the same assignee as named herein.

3. "Priority Interrupt Mechanism" invented by Earnest M. Monahan, Garvin Wesley Patterson, and Jaime Calle, Ser. No. 562,315, filed on Mar. 16, 1975 now U.S. Pat. No. 4,001,783, and assigned to the same assignee as named herein.

4. "Dispatcher Mechanism" invented by Earnest M. Monahan and Garvin Wesley Patterson, Ser. No. 562,314, filed on Mar. 26, 1975 now U.S. Pat. No. 4,028,664, and assigned to the same assignee as named herein.

5. "Fail Soft Memory" invented by Marion G. Porter, Jaime Calle, and Garvin Wesley Patterson, Ser. No. 562,361, filed on Mar. 26, 1975, now U.S. Pat. No. 4,010,450, and assigned to the same assignee as named herein.

6. "Instruction Look Ahead Having Prefetch Concurrency and Pipeline Features" invented by Marion G. Porter, Ser. No. 562,272, filed on Mar. 26, 1975 abandoned and continued as Ser. No. 814,599, filed July 11, 1977, and assigned to the same assignee as named herein.

7. "Data Alignment Circuit" invented by Darrell L. Fett, Ser. No. 559,115, filed on Mar. 17, 1975 now U.S. Pat. No. 3,967,101, and assigned to the same assignee as named herein.

8. "Processor for Input/Output Processing System" invented by Marion G. Porter, Garvin Wesley Patterson, William A. Shelly, and Nicholas S. Lemak, Ser. No. 562,317, filed on Mar. 26, 1975 now U.S. Pat. No. 3,976,977, and assigned to the same assignee as named herein.

9. "Method of Generating Addresses to a Paged Memory" invented by Garvin Wesley Patterson and Marion G. Porter, Ser. No. 562,330, filed on Mar. 26, 1975 now U.S. Pat. No. 3,976,978, and assigned to the same assignee as named herein.

10. "Memory Steering in a Data Processing System" invented by William A. Shelly, Ser. No 562,313, filed on Mar. 26, 1975 now U.S. Pat. No. 3,990,051, and assigned to the same assignee as named herein.

BACKGROUND OF THE INVENTION

1. Field of Use

The present invention relates to input/output systems and, more particularly, to systems which include duplicate units for improved reliability.

2. Prior Art

It is well-known to provide duplicate arithmetic units whose outputs are connected to comparison circuits for checking whether the results are correct. Such arrangements have been utilized in the prior art primarily for the purpose of error detection. Accordingly, the two units operated as a single unit and the single unit was, therefore, regarded as having failed in the event of a mis-compare in results. Other prior art systems have employed triplicate computer systems which connect to majority logic circuits for detecting the presence of errors and for establishing the failed system upon the occurrence of an error. These systems, while exceedingly reliable, normally are quite costly and complex.

Accordingly, it is an object of the present invention to provide a processing system which has a high degree of reliability and has a minimum of complexity.

It is a more specific object of the present invention to provide an input/output processing system in which it is possible to detect which processor within a pair has failed.

SUMMARY OF THE INVENTION

The above objects are achieved in a preferred embodiment of the present invention which comprises at least a pair of input/output processing units having their outputs coupled to comparison circuits included within a system interface unit for detecting and storing indications of a processor mis-compare error. Additionally, the unit includes circuits for detecting and storing signals indicating the presence of other types of errors associated with each of the processors which occurred at the time the miscompare error was detected. These circuits are coupled to receive signals from sets of control lines of an error interface to which each of the processors of the pair connect. Apparatus including sequence control logic circuits in response to a mis-compare error signal is operative to generate signals which "unlock" the processor pair and select a first one of the pair to be tested.

In accordance with a preferred embodiment of the present invention, the sequence control circuits generate signals which direct a specific type of interrupt request to the processor selected for testing. The type of interrupt request is dependent upon whether the circuits included in the system interface unit detected the presence of any other types of errors associated with any one of the processors. For example, when an internal processor error is detected, signalled by a processor forcing one of the control lines of the error interface to a predetermined state, a first type of interrupt request is directed by the unit to the "good" processor. Also, the unit stops the "bad" processor from continuing operation by forcing another one of the control lines to a predetermined state. Where no other type of error is detected in either processor of a pair, the unit directs a second type of interrupt request to a first one of the processors of the pair and stops the operation of the second processor.

After testing each of the processors as reqiired, the apparatus logically disconnects the faulty processor from the system. Thereafter, input/output operations are only performed by the good processor which can be then periodically tested by the operating system software to the extent deemed necessary.

Thus, the arrangement of the present invention provides for both error detection and the availability of both processors for processing in the event that a miscompare error is detected. Since such testing is carried out with a small amount of additional circuits included in the system interface unit system reliability is increased. Additionally, in the event that testing fails to detect errors within either one of the processors, the control circuits can be enabled to lock both processors back together. This enables the system to continue reliable processing notwithstanding transition error conditions.

The selected processor is first conditioned to perform a self test operation. Additionally, a timer included in the processor is started and causes a predetermined one of the control lines to be forced to a predetermined state following a time out of the timer. This signals that the processor has trouble in that it cannot complete the self test operation and is the bad or faulty processor. By requiring that the processor respond to the interrupt request within a given amount of time, this signals the satisfactory completion of the self test operation by the processor.

Completion of the self test operation provides sufficient verification of a number of the processor circuits such that the processor should be able to generate memory commands without error. It is only when the apparatus detects that the processor possesses a minimum confidence level therein is more extensive testing continued. Even when the apparatus and associated diagnostic routines have established that the processor is good, testing is continued with the other processor of the logical pair in those instances where no errors associated with either one of the processors was directed. This ensures processing reliability.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIGS. 3a through 3f show in greater detail the system interface unit 100 of FIG. 1.

FIG. 6 illustrates the format of WREX and RDEX program instructions.

FIGS. 7a through 7c illustrate the formats of interface commands.

FIGS. 8a through 8d illustrate the formats of the contents of different registers included in the system interface unit 100 of FIG. 1.

TABLE OF CONTENTS

Description of the Preferred Embodiment

Figure 2:
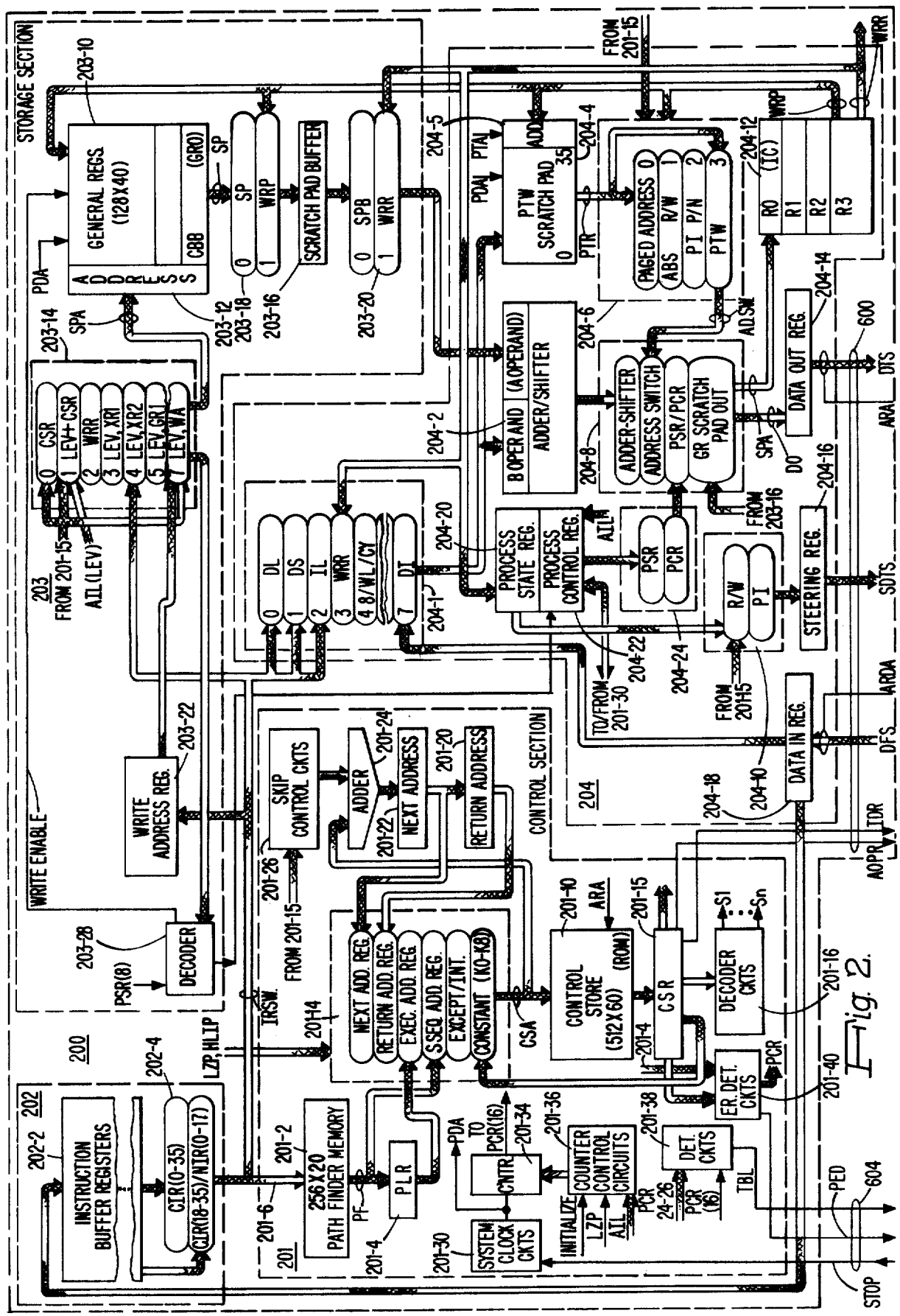
FIG. 2 shows in greater detail an input/output processing unit of a processor pair of FIG. 1.

General Description
The Port Interfaces
Data Interface Lines
Programmable Interface Lines
Interrupt Interface Lines
Local Memory Interface Lines
Error Notification Interface Lines
Detailed Description of Input/Output Processor 200
Control Store Section 201
Instruction Buffer Section 202
Storage Section 203
Processing Section 204
Error Detection Circuits 201-32 - FIG. 2
Counter and Detector Circuits Detailed Description of System Interface Unit 100

Interrupt Section 101
Data Transfer Section 102
Control Section 103
Detailed Description of Section 103

Detailed Description of High Speed Multiplexer 300

Common Section
Channel Adapter Sections
Controller Adapter Lines

Description of Operation.

DESCRIPTION OF THE PREFERRED EMBODIMENT

General Description

Figure 1:
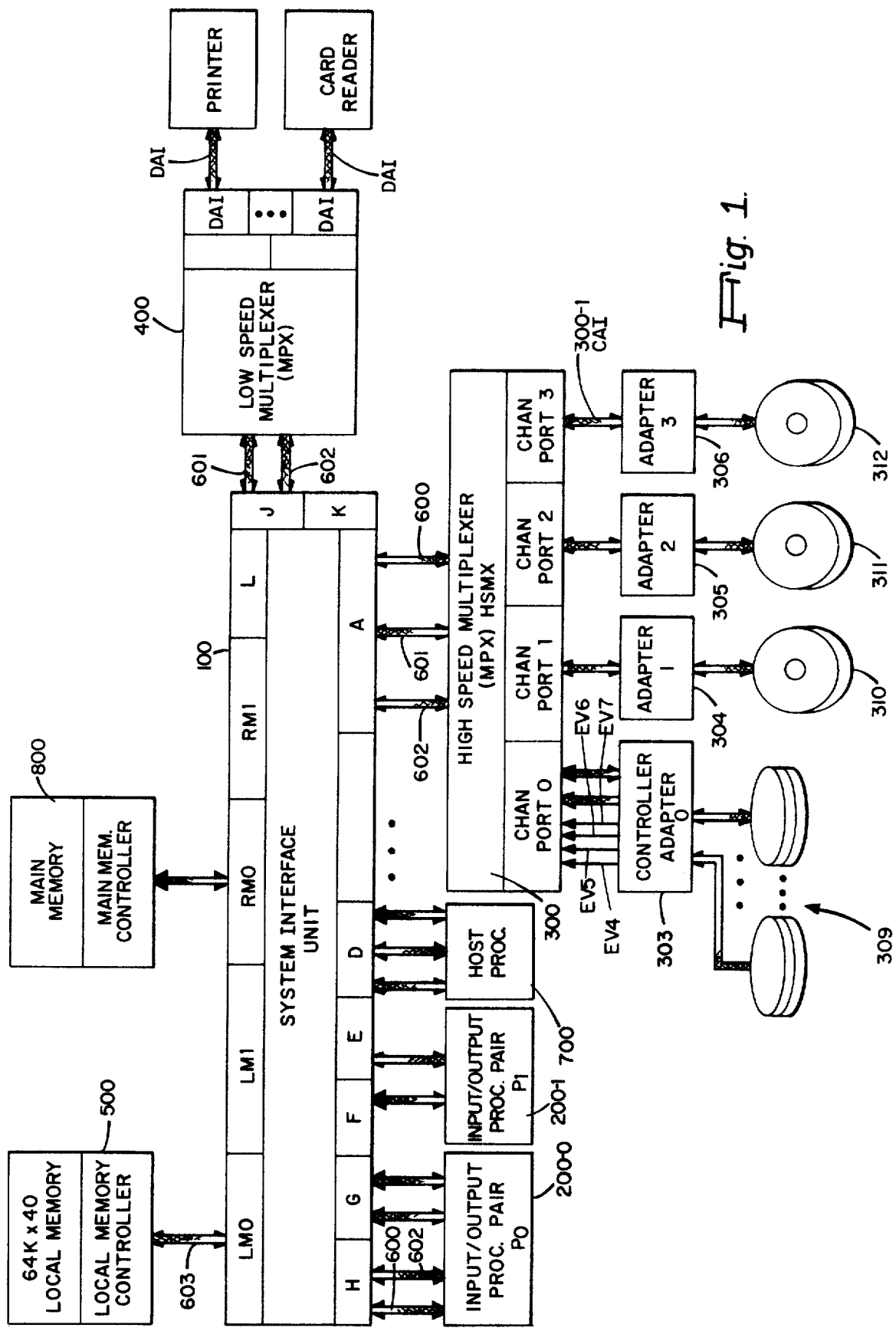
FIG. 1 illustrates in block diagram form an input/output system employing the principles of the present invention.

As seen from FIG. 1, the system which incorporates the principles of the present invention includes two input/output processor (IOPP) pairs 200-0 and 200-1, a system interface unit (SIU) 100, a high speed multiplexer (HSMX) 300, a low speed multiplexer (LSMX) 400, a host processor 700, a local memory module 500, and a main memory module 800. Different ones of these modules connect to one of a number of ports of the system interface unit 100 through a plurality of lines of different ones of different types of interfaces 600 through 603. More specifically, the two input/output processors of logical pair 200-0 and 200-1, the host processor 700, and high speed multiplexer 300 connect to ports G, H, E, F, D, and A, respectively, while the low speed multiplexer 400, memory modules 500 and 800 connect to ports J, LMO, and RMO, respectively.

The input/output system of FIG. 1 can be viewed as including a number of "active modules", "passive modules", and "memory modules". The IOP processor 200, host processor 700, and high speed multiplexer 300 serve as active modules in that each has the ability to issue memory commands. The active modules normally connect to ports A through H. A plurality of passive modules are connected to three ports J, K, and L. These modules correspond to the low speed multiplexer 400 and the system interface unit 100 and are units capable of interpreting and executing commands applied to the lines of interface 601 as described herein. The last group of modules constitutes local memory modules and remote memory modules (not shown) such as those of the main system (not shown) which are capable of executing two different types of commands applied to the lines of interface 603.

The input/output system of FIG. 1 normally functions as an input/output subsystem responsive to input/output instructions issued by host processor 700 which normally connects to port D via the interface 600, 601, and 602 which correspond to a data interface, a programmable interface, and an interrupt interface, respectively, described in greater detail herein. Ports F and E include interfaces for enabling connection of either multiplexer or processor modules of FIG. 1.

For the purpose of the present invention, processor 700 is conventional in design and may take the form of those units described in U.S. Pat. No. 3,413,613. In the preferred embodiment, the input/output processor 200 initiatess and terminates channel programs required for the execution of input/output instructions, processes interrupt requests received from the system interface unit 100 and directly controls unit record peripheral devices coupled to low speed multiplexer 400. The processor pair 200-0 connects to ports G and H via the data interface 600 and interrupt interface 602.

The low speed multiplexer 400 which for the purposes of the present invention can be considered conventional in design, provides for attachment of low speed peripheral devices via peripheral adapters, each of which couples to the lines of a device adapter interface (DAI). The interface and adapter may take the form of those units described in U.S. Pat. No. 3,742,457, which is assigned to the assignee of the present invention. The low speed devices include card readers, card punches, printers, and consoles. As seen from FIG. 1, the multiplexer 400 connects to port J via the programmable interface 601.

The high speed multiplexer 300 directly controls transfers between the groups of disk devices and tape devices 309 through 312 which connect to different ones of the channel adapters 302 to 305. Each of the channel controller adapters 303 through 306 which connects to a maximum of 16 devices, in turn, connects to a different one of the ports or channels 0 through 3 via the interface lines of a channel adapter interface (CAI) 301-1. The high speed multiplexer 300 connects to a port A corresponding to a data interface 600, a programmable interface 601, and an interrupt interface 602.

For the purpose of the present invention, each of the channel controller adapters 302 through 305 may be considered conventional in design and take the form of controller adapters described in the aforementioned U.S. Pat. No. 3,742,457.

As mentioned previously, each of the modules connects to different ports of the system interface unit 100. The unit 100 controls the connection of the different modules to each other via transfer paths enabling the transfer of data and control information between pairs of modules. For the purpose of the present invention, the system interface unit 100 can be viewed as a switching network enabling each of the "active" modules to transfer data to and from local memory module 500 when the requesting module has the highest priority and is granted the next available memory cycle. That is, as explained herein, the unit 100 includes priority logic circuits which determine the relative priority of requests from each of the active modules and grants the next available memory cycle to the highest priority request received.

Additionally, the unit 100 includes interrupt priority logic circuits which determine the relative priority of interrupt requests received from each of the modules and selects the highest priority request received and passes the request to processor 200 via a switching network as explained herein.

THE PORT INTERFACES

Before describing in greater detail different ones of the modules of FIG. 1, each of the interfaces 600 through 603 referred to previously will now be described with reference to FIGS. 5a through 5d.

Figure 5E:
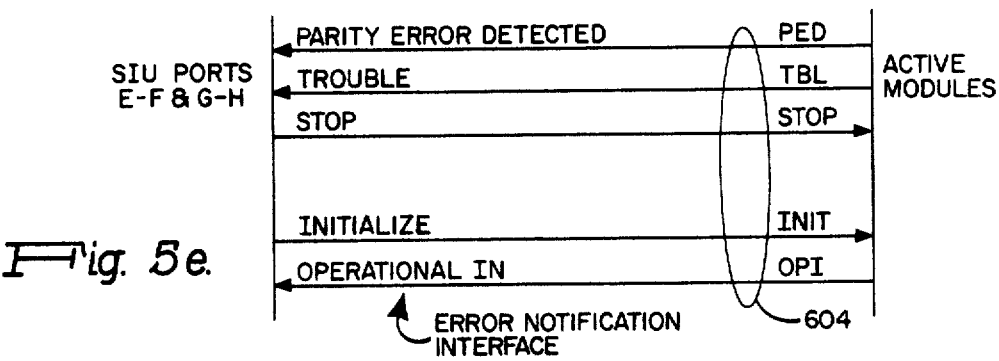
FIG. 5e shows the lines which comprise an error notification interface of FIG. 1.
Figure 5A:
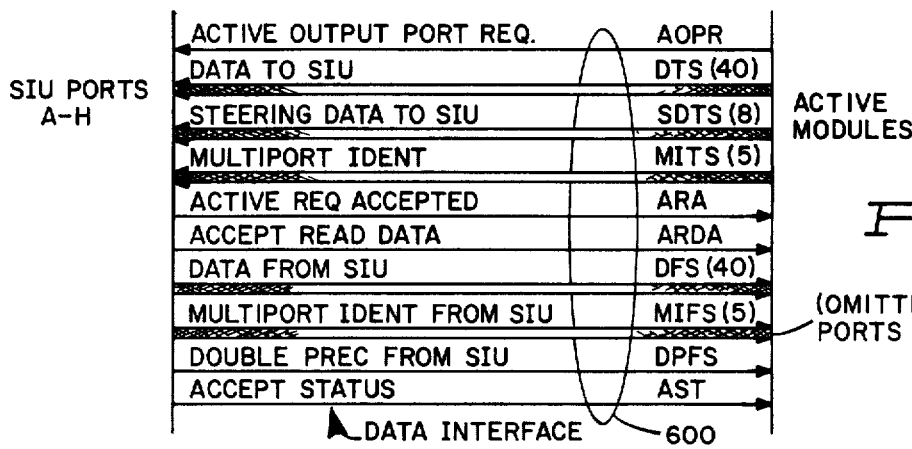
FIG. 5a shows the lines which comprise a data interface.

Referring first to FIG. 5a, it is seen that this figure discloses the lines which constitute the data interface which is one of the interfaces which provides for exchange of information between an active module and the system interface unit 100. Exchange is accomplished by controlling the logical states of various signal lines in accordance with pre-established rules implemented through a sequence of signals termed "a dialog".

As seen from FIG. 5a, the interface includes an active output port request line (AOPR), a plurality of data to SIU lines (DTS 00-DTS 35, P0-P3), a plurality of steering data to SIU lines (SDTS 0-6, P), a plurality of multiport identified to SIU lines (MITS 0-3, P), an active request accepted line (ARA), an accept read data line (ARDA), a plurality of data from SIU bus lines (DFS 00-35, P0-P3), a plurality of multiport identifier from SIU lines (MIFS 0-3, P), a double precision from SIU line (DPFS), and an accept status line (AST). The description of the interface lines is given in greater detail in the section to follow.

| DATA INTERFACE LINES | |
|---|---|
| Designation | Description |
| AOPR | The active output port request line is a unidirectional line which extends from each of the active modules to the SIU 100. When set, this line signals the SIU that the module requests a transfer path over which a command or data is to be transferred. |
| DTS 00-35, P0-P3 | The data to SIU lines are a four byte wide unidirectional path (four 10 bit bytes) that extend between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows: a) The state of bit 0 - The type of command applied to the DTS lines (whether the command is a programmable interface command or a memory command). b) Bits 1-4 are coded to indicate which one of the modules is to receive and interpret the command (commands are interpreted only by memory modules and programmable interface commands shall be inter- |

DATA INTERFACE LINES -continued

| Designation | Description |
| --- | --- |
| | preted by all modules except input/output processors 200-0).<br>c) The state of bit 5 indicates whether one or two words of the command information is to be transferred between the requesting active module and the designated receiving module (one word specifies a single precision transfer and two words specifies a double precision transfer).<br>d) The state of bit 6 indicates the direction of transfer between the requesting module and the designated receiver module.<br>e) Bit P is a parity bit generated by the requesting active module which is checked by apparatus included within the SIU 100. |
| MITS 0-3, P | The four multiport identifier to SIU lines extend from the active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00-35, P0-P3 data path lines which are a four byte wide | The data from SIU lines are another set of<br><br>unidirectional path (four 10 bit bytes) which extends from the SIU to each active module. This set of lines is used by the SIU 100 to convey read type data to a designated one of the active modules. |
| MIFS 0-8, P | The four multiport identifier from SIU lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA signals the active module that it should accept status information applied to the DFS lines. |

Figure 5B:
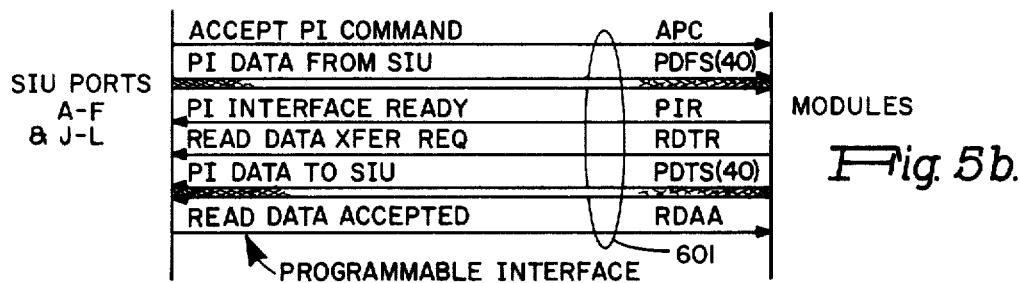
FIG. 5b shows the lines which comprise programmable interface employed in the system of FIG. 1.

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed "dialog". The programmable interface includes an accept programmable interface command line (APC), a plurality of programmable interface data from SIU lines (PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

PROGRAMMABLE INTERFACE LINES

| Designation | Description |
| --- | --- |
| APC | The accept programmable interface command line extends from the SIU 100 to each receiving module. When set, this line signals the module that command information has been applied to the PDFS lines of the interface by the SIU and is to be accepted by the module. |
| PDFS 00-±, P0-P3 | The programmable interface data from SIU lines are a four byte wide unidirectional path (four 10 bit bytes) that extends from the SIU 100 to each module. These lines apply programmable interface information from the system interface unit to a designated receiving module. |
| PIR | The programmable interface ready line extends from each module to the SIU. When set or high, this line indicates that the module is ready to accept a command to be applied to line PDFS. |
| PDTS 00-35, P0-P3 lines | The programmable interface data to the SIU are a four byte wide unidirectional path (four 10 bit bytes) that extend from each module to the SIU 100. These lines are used to transfer programmable interface information to the SIU. |
| RDTR | The read data transfer request line extends from each module connected to the programmable interface to the SIU 100. When set or high, this line indicates that the previously requested read data is available for transfer to a module and has been applied to the lines PDTS by the module. |
| RDAA | The read data accepted line extends from the SIU 100 to each module. When set or high, the line indicates to the module that the data applied to the lines PDTS has been accepted and that the module may remove the information from these lines. |

Figure 5C:
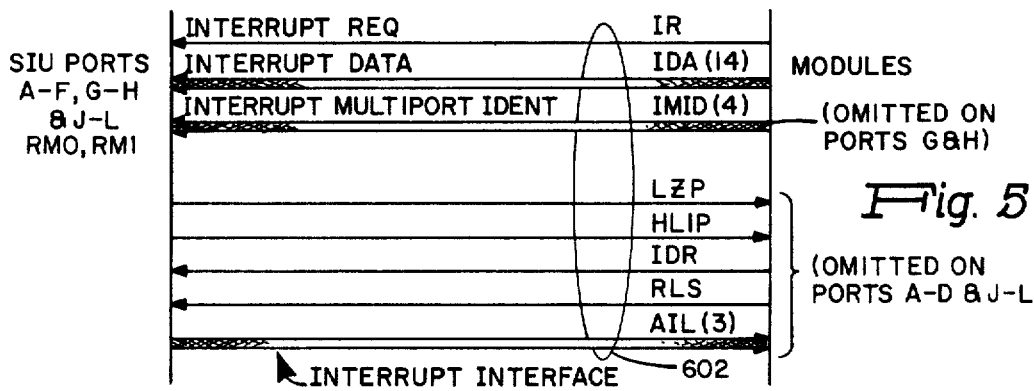
FIG. 5c discloses lines which comprise the interrupt interfaces included within the system of FIG. 1.

A further interface is the interrupt interface 602 of FIG. 5c which provides for interrupt processing by the input/output processor pairs 200-0 and 200-1. That is, the interface enables the transfer of interrupt information by an active module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog".

The interface includes an interrupt request line (IR), a plurality of interrupt data lines (IDA 00-11, P0-P1), and a plurality of interrupt multiport identifier lines (IMID 00-03) for modules connected to ports A through L. For modules connected to ports G and H, the interrupt interface further includes a level zero present line (LZP), a higher level interrupt present line (HLIP), an interrupt data request line (IDR), a release line (RLS), and a plurality of active interrupt level lines (AILO-2). As seen from FIG. 5c, the interrupt interface ports G and H do not include an interrupt multiport identifier line. The description of the interrupt lines is given in greater detail herein.

INTERRUPT INTERFACE LINES

| Designation | Description |
| --- | --- |
| IR | The interrupt request line extends from each module to the SIU 100. When set or high, this line indicates to the SIU that it requires service. |
| IDA 0-3, P0<br>IDA 4-11, P1 | The interrupt data lines extend from an active odule to the SIU 100. These lines are coded to contain control information required to be transferred to the input/output proces- |

INTERRUPT INTERFACE LINES

| Designation | Description |
|---|---|
|  | sor. These bits are coded as follows:<br>a) The state of bit 0 specifies to the SIU 100 which of the two processors (i.e., processor number) is to process the interrupt request.<br>b) Bits 1-3 are coded to indicate the priority or level number of the interrupt request to the SIU 100.<br>c) Bit P0 is a parity bit for bits 0-3.<br>d) Bits 4-8 are coded to provide a portion of an address required to be generated by an input/output processor for referencing the correct procedure for processing the interrupt (i.e., an interrupt control block number ICBN).<br>e) Bit P1 is a parity bit for bits 4-11. |
| IMID00-03 | The interrupt multiport identifier lines extend from each active module to the SIU 100. These lines are coded to identify which specific subchannel of the active module has requested interrupt service. |
| LZP | The level zero present line extends from the SIU 100 to the input/output processor. When set or high, this line indicates that there is a highest priority (level 0 interrupt) request being directed to a processor by the SIU 100. |
| HLIP | The higher level interrupt present line extends from the SIU to each input/output processor. When set or high, this line indicates that there is an interrupt request having a higher level or priority than the procedure or process being executed by the processor. |
| IDR | The interrupt data request line extends from the input/output processor to the SIU 100. When set or high, this line indicates that interrupt data is to be sent to the processor on lines DFS by the SIU 100. |
| RLS | The release line extends from each input/output processor to the SIU 100. This line, when set or high, indicates that the processor has completed execution of the current procedure. |
| AIL 0-2 | The active interrupt level lines extend from the SIU to the input/output processor. These lines are coded to designate the interrupt level number of the procedure being executed by the processor. |

Figure 5D:
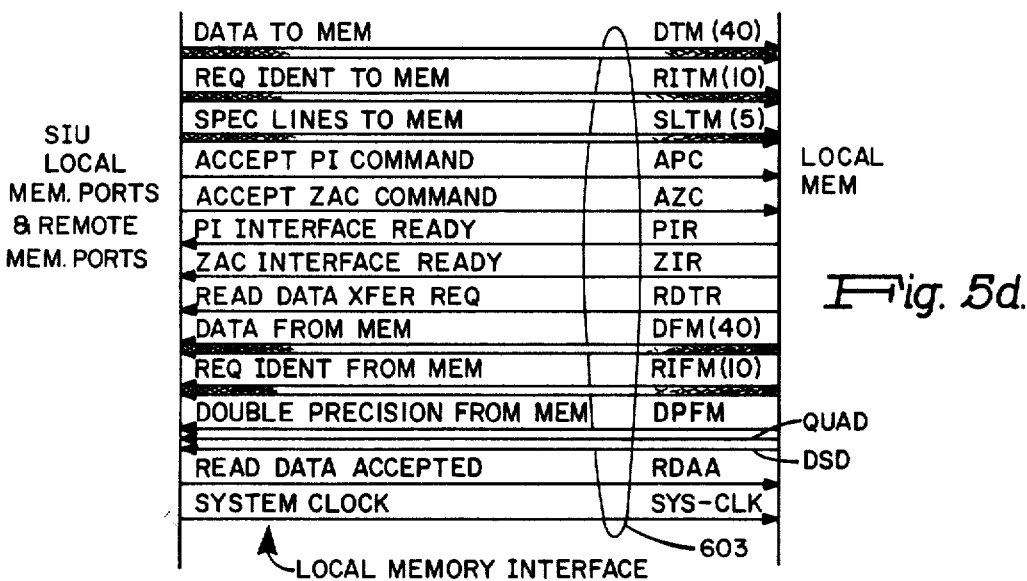
FIG. 5d shows the lines which comprise a local memory interface of FIG. 1.

A further set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed a "dialog". The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept PI command line (APC), an accept ZAC command line (AZC), a PI interface ready line (PIR), a ZAC interface ready line (ZIR), a read data transfer request line (RDTR), a plurality of data from memory lines (DFM 00-35, P0-P3), a plurality of request identifier from memory lines (RIFM 0-7, P0-P1), a double precision from memory line (DPFM), a QUAD line, a read data accepted line (RDAA) and a system clock line (SYSCLK). A similar interface is used for connecting the main memory module 800 to the SIU 100.

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines is given in greater detail herein.

LOCAL MEMORY INTERFACE LINES

| Designation | Description |
|---|---|
| DTM 00-35, P0-P3 | The data path lines constitute a four byte wide unidirectional path (36 information lines and four odd parity lines) that extends from the SIU 100 to the local memory 500. These lines are used to transfer memory or programmable interface commands to the local memory 500. |
| RITM 0-3, P0<br>RTIM 4-7, P1 | The requestor identifier to memory lines constitutes two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows.<br>a) Bits 0-1 are port number selection bits coded to specify which port or subchannel within the attached module is to receive or interpret the memory command sent to the module.<br>b) Bit 2 is a read/write to memory bit which is included in the steering control information received from the active module which is forwarded by the SIU to the local memory 500 when a new command is sent to the memory by the SIU 100. The state of this bit indicates the direction of data transfer.<br>c) Bit 3 is a double precision to memory bit coded to specify the amount of data to be transferred. It is also |

-continued
LOCAL MEMORY INTERFACE LINES

| Designation | Description |
|---|---|
| | included in the steering control information provided by the active module which is forwarded to the local memory module 500 by the SIU 100 when a new command is sent to the memory module. |
| AZC | The accept ZAC command line extends from the SIU 100 to the local memory module 500. When set or high, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set or high, this line indicates that the command information applied to the lines DTM is to be accepted by the local memory module 500. |
| PIR/ZIR | The programmable interface ready line/ZAC interface ready line extends from the local memory module 500 to the SIU 100. When set or high, each line signals the SIU 100 that the local memory module 500 is capable of accepting a programmable interface (PI)/memory (ZAC) command. |
| RDTR | The read data transfer request line extends from the local memory module 500 to the SIU 100. This line, when set or high, indicates that the read type data previously requested by a ZAC or PI command is available along with the necessary control information to be sent to the module requesting the data. |
| DFM 00-35, P0-P3 The data from memory lines are a four byte | wide unidirectional bus which extends from the local memory module 500 to the SIU 100. These lines are used to return read requested type data to an active module via the SIU 100. |
| RIFM 0-3, P0, RIFM 4-7, P1 | The two groups of requestor indentifier from memory lines extend from the local memory module 500 to the SIU 100. These lines are coded for directing the read data from module 500 back to the requesting module. |
| DPFM and QUAD | The double precision from memory line and QUAD line extend from the local memory module 500 to the SIU 100. These lines are coded to indicate the number of words to be transferred via the SIU 100 to the requesting module during read data transfer request time interval. These lines are coded as follows |

| QUAD | DPFM | |
|---|---|---|
| 0 | 0 | one word single precision |
| 0 | 1 | two words, double precision |
| 1 | X (don't care) | four words |

| Designation | Description |
|---|---|
| DSD | The read data/status identifier line extends from the local memory module 500 to the SIU. The state of this line signals the SIU 100 whether the information applied to the lines DFM is read data or status information when line RDTR is set to a binary one. When set, the line indicates status information of one or two words (QUAD=0) |
| DSD | is being transferred. When reset to a binary ZERO, the line signals that up to four words of data are being transferred, the number being specified by the coding of lines QUAD and DPFM. |
| RDAA | The read data accepted line, as mentioned in connection with the programmable interface, extends from the SIU 100 to the local memory module. When set, this line signals the memory module that the data applied on the interface lines by the local memory module has been accepted and that the local memory module may remove data from these lines. |
| SYS-CLK | The system clock line is a line which extends from the SIU 100 to each module of the system. This line is connected to a clock source included within the input/output processor to synchronize the operations of each memory module from a common system clock source. |

A last set of interface lines is shown in FIG. 5e. In accordance with the present invention, several of these lines signal certain conditions as for example error conditions and operational conditions. More importantly, these lines enable the SIU 100 to control the operation of the processor pair in accordance with the present invention.

As seen from FIG. 5e, the interface includes a parity error detected line (PED), a trouble line (TBL), a STOP line, an initialize line (INIT), and an operational in line (OPI). The description of the interface lines is given herein in greater detail.

| ERROR NOTIFICATION INTERFACE LINES | |
|---|---|
| Designation | Desription |
| PED | The parity error detected line is a single line which is coded to indicate to the SIU 100 the logical "OR" of all the parity error detector circuits internal to the attached I/O processor. This line is used by the SIU 100 as an indication that a level zero interrupt is to be issued to the processor. |
| TBL | The trouble line, when set by the processor, notifies the SIU 100 that it has encountered an exception condition while in level zero or a time-out during the self test. |
| STOP | A line from the SIU 100 to a module which, when set, indicates that the module should cease all activity. |
| INIT | A line from SIU 100 to a module wich, when set, causes the module to assume the initialized state. |
| OPI | A set/complement pair of lines to the SIU 100 from a module. The pair is coded to indicate when the module is active, is powered up, and is ready to generate or accept commands. |

Having described the different types of interfaces utilized by the modules of FIG. 1, each of the modules pertinent to the understanding of the present invention will now be described in greater detail.

Detailed Description of Input/Output Processor 200

Referring to FIG. 2, it is seen that the processor 200 comprises a microprogrammed control section 201 operative to generate control signals in response to microinstructions stored in a control store 201-10 for executing instructions, an instruction buffer section 202 for storing instructions fetched from the local memory module 500, a storage section 203 and a processing section 204 for performing arithmetic and logic operations under the control of microprograms stored in control store 201-10.

Control Store Section 201

Considering each section in greater detail, the control store 201-10 is constructed of fixed sections which use for example a read only memory (ROM). The store 201-10 is addressable via signals from any one of the eight address sources applied to a selector switch 201-14. The contents of the addressed locations are read out into an output register 201-15 and decoded by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microinstructions read out to register 201-15 include address constants for branching the control store 201-10 to appropriate microprogram routines.

As seen from FIG. 2, the eight control store address sources include: interrupt/exception signals derived from signals applied by the system interface unit 100 and circuits included within processor 200; a next address register position which receives next address information stored in a register 201-22 via an adder circuit 201-24; a return address register position which receives the return address contents of a return register 201-20; an execution address register position which receives an address from a pathfinder memory 201-2 via memory output register 201-4; a sequence address register position which also receives an address from register 201-4; and a constant position which receives a constant value from the output register 201-15.

The appropriate next address is generated by adder circuit 201-24 which receives as one operand input, address signals from one of the sources selected by switch 201-14 and as the other operand input, signals from skip control circuits of a block 201-26. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by switch 201-14 and constant signals provided by skip control circuits of block 201-26. Briefly, the different positions of switch 201-14 are selected in response to microinstructions read from control store 201-10 to provide appropriate addresses for microprograms stored in control store 201-10 required for the execution of an operand specified by the op code of a program instruction. The instruction op code is applied to the pathfinder memory 201-2 via path 201-6 as shown. The return address register position of switch 201-14 is selected during program sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 2 that a higher level interrupt present (HLIP) and level zero interrupt (LZP) lines apply signals to switch 201-14. The signal applied to the HLIP line is "ANDed" with interrupt inhibit signals from a process control register 204-22 and the result is ORed with the signal applied to the LZP line. When the higher level interrupt present signal is not inhibited or there is a signal applied to the LZP line, signals from circuits, not shown connected to switch 201-14 select the exception/interrupt position. The signal lines indicative of the presence of an interrupt (LZP and HIPL) cause the selection of an interrupt sequence of microinstructions to be referenced in lieu of referencing the microinstruction sequence for executing the next program instruction.

Signal lines indicative of "exceptions" are applied to control circuits, not shown, associated with switch 201-14 and cause the selection of the exception/interrupt position. This provides an address for referencing an exception sequence of microinstructions. Depending upon the type of execution, the exception may be processed immediately because continuing program instruction execution must be prevented or it is not possible (e.g. faults, illegal instructions). The exception is processed upon the completion of execution of the program instruction where the condition does not require immediate attention (e.g. time out, overflow, etc.). As explained herein, the occurrence of exceptions cause the exception/interrupt position of 201-14 to be selected and the setting of an appropriate bit position in process control register 204-22.

Timing signals, designated as PDA in FIG. 1, required for establishing appropriate memory cycles of operation for control section as well as timing signals for operating other sections of processor 200 and the other modules of the system of FIG. 1 are provided by clock circuits included within a block 201-30. The clock circuits receive as an input the STOP line which, when in a binary ONE state, inhibits further operation of control section 201. The block 201-30 includes circuits for signalling the SIU 100 via the OPI line that the processor 200 is operational. For the purposes of the present invention, the clock circuits as well as the other circuits of FIG. 2 can be considered conventional in design and can, for example, take the form of circuits disclosed in the publication titled "The Integrated Circuits Catalog for Design Engineers", by Texas Instruments Inc., printed 1972. More specifically, the clock circuits can comprise a crystal controlled oscillator and counter circuits while the switch 201-14 can comprise a plurality of data selector/multiplexer circuits.

From the above, it is seen that, as in most microprogram controlled machines, the control store 201-10 provides the necessary control for each processor cycle of operation. That is, each microinstruction work read out from control store 201-10 during a cycle of operation is divided into a number of separate control fields which provide the necessary input signals to the various selector switches of FIG. 2 for addressing of the different scratch pad memories and selection for branching, signals for controlling the operation of an adder/shifter unit of section 204 and signals for providing control information necessary for generating commands. For more detailed information regarding the operation of control section 201, reference may be made to the copending application titled "Pathfinder Control Memory" invented by G. Wesley Patterson et al., which is assigned to the assignee of the present invention. Reference may also be made to other ones of the documents referenced in the introductory portion of the specification.

Instruction Buffer Section 202

This section includes a plurality of registers 202-2 for storing up to four words of instructions fetched from local memory module 500 and applied via a data in register 204-18. The group of registers 202-2 are connected to a two position instruction register switch 202-4 which is arranged to provide two outputs, a current instruction read output (CIR) and a next instruction read output (NIR). The selection of instruction words on a half or full word basis is made in accordance with the states of bit positions of the current instruction counter (IC) normally stored in a first of the working registers of block 204-12. For the purpose of the present invention, the arrangement can be considered conventional in design.

Storage Section 203

As seen from FIG. 2, this section comprises a scratch pad memory containing eight sets or groups or registers associated with eight priority levels. The highest priority level is level 0 and the lowest priority level is level 7. Each group or level includes 16 registers used as described herein.

The scratch pad memory 203-10 is addressed via an eight position data selector switch 203-14 which selectively applies a seven bit address from any one of eight sources to address input 203-12. The three most significant bit positions of address inputs 203-12 select one of the eight sets of registers (i.e. the level) while the remaining four bits select one of the sixteen registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The white address register 203-22 is loaded via switch 202-4 to store signals corresponding to either bits 9-12 or bits 14-17 of the current program instruction as designated by one of the fields of the microinstruction contained in register 201-15. Accordingly, the write address register provides address storage for loading or returning a result to one of the general registers of scratch pad memory 203-10. The write operation occurs upon the generation of a write clock signal which occurs either in response to switching to a binary ONE a clocked write flip-flop not shown, or in response to a field of a microinstruction loaded into register 201-15. When generated by the write flip-flop, the write clock signal occurs when the write flip-flop is reset to a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 via selector switch 203-14 which is operative to generate a signal on an output line each time register 203-22 stores an address of 0, 1 or 15. This signal inhibits the generation of a write clock pulse by gating circuits, not shown, when write flip-flop is in a binary ONE state. Additionally, the decoder network 203-28 receives a mode signal from the process state register 204-20. The state of the signal which indicates whether the processor 200 is in a master or slave mode of operation is "ANDED" with the output signal and is used to generate an exception signal on another output line which is applied as an input to process control register 204-22 and to one causes selection of the exception-interrupt position of switch 201-14. As explaned herein, this prevents alteration of the contents of the process state register location (GRO) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives data signals applied from one of a pair of output buses selectively connected to any one of four working registers of block 204-12.

Each set of 16 registers includes a process state register (PSR) location (general register 0) for storing information essential to controlling the current process. The first eight bit positions of the register stores steering information coded to identify the interrupting module. The next position is a privilege bit position coded to identify the mode of operation (i.e. master or slave). The register also includes an external register bit position coded to indicate whether the register contents can be altered, an address mode bit position, two condition code bit positions, a carry bit position and 22 bit positions for storing a count which is periodically decremented while the associated process is active (i.e. serves as a "process timer"). Because of the frequency of access to the contents of the process state register required for modification or reference, signals representative of the contents of this register are stored in one of the registers of the processing section 204 (i.e. register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers include a page table base register (general register 15), and a number of general registers (general registers 2-14) for providing temporary storage for operands and address information. The scratch pad memory 203-10 also includes a control block base (CBB) register location which stores an absolute address pointing to the base of an exception control block and interrupt control block tables stored in local memory module 500. The first register GR0 of the highest priority set of registers (level 0) which is never altered, stores the control block base information. The interrupt control block (ICB) tables include 256 groups of storage locations which store information for processing the type of interrupt. The exception control block (ECB) tables include 16 groups of storage locations which store information for processing the type of exception.

Exceptions are processor detected conditions which cause the processor 200 to enter automatically one of the 16 exception processing routines. The exception conditions are identified by a four bit exception number which corresponds to bits 10-13 of the program instruction when the processor enters master mode. In all other instances, the exception number is ZERO. The exception number (ECB#) is used to identify one of the four word exception control blocks (ECB) which points in an exception processing routine. The byte address of an ECB equals the control block base (CBB) - 16 (ECB # +1). Each ECB includes values for loading the PSR, IC, and PTBR registers in addition to a saving area pointer in ECB#0 which points to a stack area for storing information pertinent to the current process before the processor 200 enters the exception routine.

The address of an interrupt control block (ICB) equals the control block base (CBB) + 16(ICB#). The ICB# is obtained from the interrupt word as explained herein. Similarly, the ICB is a four word block and it contains values for the PSR, IC, GR14, and PTBR registers.

Processing Section 204

This section performs all of the arithmetic and logic operations required to process program instructions. The section 204 includes an adder/shifter unit 204-1 capable of performing arithmetic, shift, and logic operations upon a pair of 36 bit operands. The results produced by either an adder portion or shifter portion of unit 204-1 are selected in response to microinstructions and thereafter selectively transferred via a four position data selector switch 204-8 on a pair of output lines to any one of the working registers of block 204-12 and to a data output register 204-14. The data output register 204-14 connects to the lines of the processor data interface 600.

For the purpose of the present invention, the adder/shifter unit 204-1 can be considered conventional in design. Also, the unit 204-1 may include either circuits such as those disclosed in U.S. Pat. No. 3,811,039 to John P. Stafford or circuits disclosed in other documents referenced in the introductory portion of the present specification.

The block 204-12 includes four working registers R0 through R3 which provide temporary storage for the instruction counter and for addresses during instruction execution. The registers can be loaded from any one of the sources connected to switch 204-8 (i.e. adder/shifter 204-1, address switch 204-6, PSR/PCR switch 204-24 and scratch pad buffer input switch 203-18). The register to be loaded and the write signal required for loading the register is established by fields included within the microinstruction read out to register 201-15.

As seen from FIG. 2, the registers are connected to a pair of output buses WRP and WRR. The WRP bus connects to address inputs 204-5, to switch 203-18 and to scratch pad memory 203-10. The WRR bus connects to A operand switch 203-20, to B operand switch 204-1, to register 204-20 and to register 204-22. The registers selected for connection to the WRR and WRP buses are designated by a pair of fields included within the microinstruction read out to register 201-15.

As seen from FIG. 2, the processing section 204 includes process state register 204-20 and a process control register 204-22. The process state register 204-20, as mentioned, is loaded from scratch pad memory 203-10 via output bus WRR. The process control register 204-22 is a 36 bit register common to all eight interrupt levels.

The bit positions of the process control register 204-22 contain the following information. Bit positions 0-8 designate different types of exceptions which include the following.

| PCR BIT POSITION | EXCEPTION TYPE |
| --- | --- |
| 0 | Operation not complete; no response from SIU on lines ARA or ARDA. |
| 1 | Page address bounds fault (key check). |
| 2 | Page access fault. |
| 3 | Page not resident in memory. |
| 4 | Illegal operation (invalid instruction, illegal slave instruction, or illegal slave operation). |
| 5 | Process timer run out. |
| 6 | Overflow. |
| 7 | Lockup fault. |
| 8 | Address misalignment. |

The term "fault" does not necessarily mean the occurrence of a hardware failure, but includes programming errors, etc.

Bit positions 9-12 store the parity errors detected per data path substrate. Bit position 13 indicates when a parity error is detected in the Data In register. Bit positions 14-15 store indications of parity errors detected per control store and pathfinder memory. Bit 15 signals no response to the level zero interrupt present. Bit positions 23-26 identify the processor number and level received from the PNID and AIL lines. Bit position 27 is an interrupt inhibit bit position while bit positions 28-35 store interrupt request bits which, when set to a binary ONE, indicate an interrupt request to a level corresponding to the bit position (i.e., bit 28 = level 0).

The bit positions 27-35 are loaded by program instruction from the bank of registers of block 204-12 via output bus WRR. Bit position 35 is always set to a binary ONE.

The contents of each of the registers 204-20 and 204-22 are selectively applied as an input to another one of the positions of the four position data selector switch 204-8 via a two position data selector switch 204-24. The register 204-20 also connects to the PI positions of a two position steering selector switch 204-10 and a four position address selector switch 204-6.

The steering switch 204-10 provides steering information to the SIU 100 which is used to transfer the command to the correct module. One of the fields contained in the microinstructions read out to register 201-15 selects the appropriate position for either a memory command or PI command. The steering information for a memory command is generated from fields included within the microinstruction and with paged address information from scratch pad memory 204-4 or absolute address information from bus WRP.

In the case of a PI command, the steering information is generated as follows: bit 0 is forced to a binary ONE for a PI command; bits 1-4 correspond to bits 0-3 of register 204-20; and bits 5-6 correspond to bits of one of the fields of the microinstructions which are coded to designate whether it is a single or double word transfer and whether it is a read or write cycle of operation. Upon the start of a memory cycle or initiation of a command, the signals from the steering switch 204-10 are loaded into a steering register 204-16 which applies the signals to the appropriate lines of the data interface 600 of processor 200. As explained herein, the command including additional steering information is provided by position 2 of address switch 204-6 in the case of a PI command.

As also seen from FIG. 2, processing section 204 includes a scratch pad memory 204-4 addressable via address inputs 204-5 which receives address signals from one of the registers connected to the WRP bus. The scratch pad memory 204-4 provides page table word storage for each of the eight interrupt levels used in generating absolute addresses for addressing local memory module 500. When addressed, the contents of the storage location of scratch pad memory 204-4 are read out to two of the four positions of the address switch 204-6. These two positions are used for page referencing of local memory module 500. Since the paging operations of scratch pad memory 204-4 are not particularly pertinent to the present invention, no detailed discussion is included herein. For further information regarding the use of paged addressing, reference may be made to the documents cited at the introductory portion of the specification.

The other two positions of the address selector switch 204-6 are used to provide the memory or PI command. More specifically, positions 0 and 1 of address switch 204-6, when selected by an address control field of a microinstruction word stored in register 201-15, generates the R/W memory command information which includes bits 0-8 coded in accordance with predetermined fields of the microinstruction word and bits 9-35 coded to correspond to either paged address information from memory 204-4 (position 0) or absolute address bits applied to output bus WRP by the working registers of block 204-12 (position 1). When the PI position of switch 204-6 is selected, the switch generates a programmable interface command word wherein bit 0 is a binary ZERO, bit 1 is supplied by a field of the microinstruction word stored in register 201-15, bit 2 is supplied by bit 9 of PSR register 204-20 and defines whether the current process can alter certain external registers, bits 5-8 are equal to bits 4-7 of register 204-20 and define the port or sub-channel within the module, bit 3 is coded to specify the processor pair number supplied by the SIU 100, bit 4 is a ZERO and bits 9-35 equal bits 9-35 of bus WRP which correspond to the absolute address of the PI command.

Error Detection Circuits 201-32 — FIG. 2

In addition to the above described circuits, each IOP processor includes error detection circuits conventional in design, such as parity check circuits, which perform checks on the various storage sections of each input-/output processor as explained herein. The block 201-32 also supplies signals to the various lines of interface 604 as explained herein.

Although shown as a single block, it will be appreciated that the parity generation and check circuits are located at various points throughout the processor 200. For example, the four parity bits for data stored in general register locations of scratch pad 203-10 are generated by circuits connected to the input bus to the scratch pad 203-10. Parity circuits connected to SPB register output check the output signals for correct parity. Similarly, parity generation circuits generate parity for signals at the output of B operand switch 204-1 to be written into the PTW scratch pad 204-4. The parity of each byte read out from PTW scratch pad 204-4 is checked by parity check circuits located at the input to address switch 204-6.

Additionally, the control store 201-10 and pathfinder memory 201-2 include parity check circuits for detecting the presence of single bit failures in memory locations. The occurrence of an error sets the corresponding control store bit (i.e., bit positions 14-15) of PCR register 204-22. Further, parity circuits connected to the Data In register 204-18 check all data and instructions clocked into the Data In register 204-18. A parity error detected on data from the SIU 100 sets the corresponding substrate parity error bit (i.e., bit positions 9-12) for the bad byte and the Data In bit position 13 of PCR register 204-22.

The block 201-32 includes OR logic circuits which are connected to receive signal indications of the parity error bits stored in PCR register 204-22. One group of these circuits provides a resultant signal to line PED which corresponds to the logical OR of the parity error signals.

Counter and Detector Circuits

A last group of circuits pertinent to the operation of the present invention includes the circuits of blocks 201-34, 201-36, and 201-38. Block 201-34 includes a nine stage counter, conventional in design, controlled by the circuits of block 201-36. The counter serves as a "level zero" timer which detects when processor 200 does not respond to an interrupt request within a period equal to twice the operation-not-complete time interval.

In greater detail, the counter is initialized to a zero state by the circuits of block 201-36 as long as the LZP line remains at a binary ZERO. When the LZP line switches to a binary ONE, the circuits of block 201-36 remove the initialize signal and the counter starts running or increases its count by one in response to each PDA signal from the circuits of block 201-30. When it reaches a maximum count (all binary ONES) and the AIL lines still have not been switched to a ZERO state, the counter generates an output which forces bit position 16 of the PCR register 204-22 to a binary ONE.

The incrementing of the counter of block 201-34 is stopped by the circuits of block 201-36 when either the AIL lines are switched to ZERO or the LZP line is switched to ZERO by SIU 100. The signals also initialize the counter. Lastly, the circuits 201-36 apply the signals on the INIT line as an input to switch 201-14. When the SIU 100 forces the INIT line to a binary ONE, this initializes or clears the contents of the various registers within the processor 200 (i.e., PCR register 204-22). When reset, the processor 200 begins exectuion of an initialization routine in control store 201-10.

The circuits of block 201-38 include several OR and AND gates. These circuits are used to force the TBL line to a binary ONE. The TBL line is forced on when bit position 16 of the PCR register 204-22 has been set as a result of a "time out" prior to the SIU switching of the processor 200 into level zero. That is, signals corresponding to bit position 16 and the level bit positions 24-26 are "ANDed" such that the TBL line is switched on when bit position 16 is a binary ONE and the PCR bits indicate that the processor is not in level zero. Another group of circuits provide a logical OR of the exception bit signals stored in PCR register 204-22 (i.e., bit positions 0-8). The output is then ANDed with the level bits 24-26 of the PCR register 204-22. Thus, when the processor has been switched to level 0, any one of the exception signals forces the TBL line to a binary ONE. However, prior to the processor 200 being switched to level zero, exception signals are inhibited from switching the TBL line to a binary ONE. The reason for this is that during an initial self test operation, the time that an error occurs there could already be an exception signal stored in the PCR register 204-22 and it is desirable that this not be detected as a trouble indication. That is, a specific test (self test) is used to establish trouble indications, as explained herein.

DETAILED DESCRIPTION OF SYSTEM INTERFACE UNIT 100

Interrupt Section 101

Figure 3A:
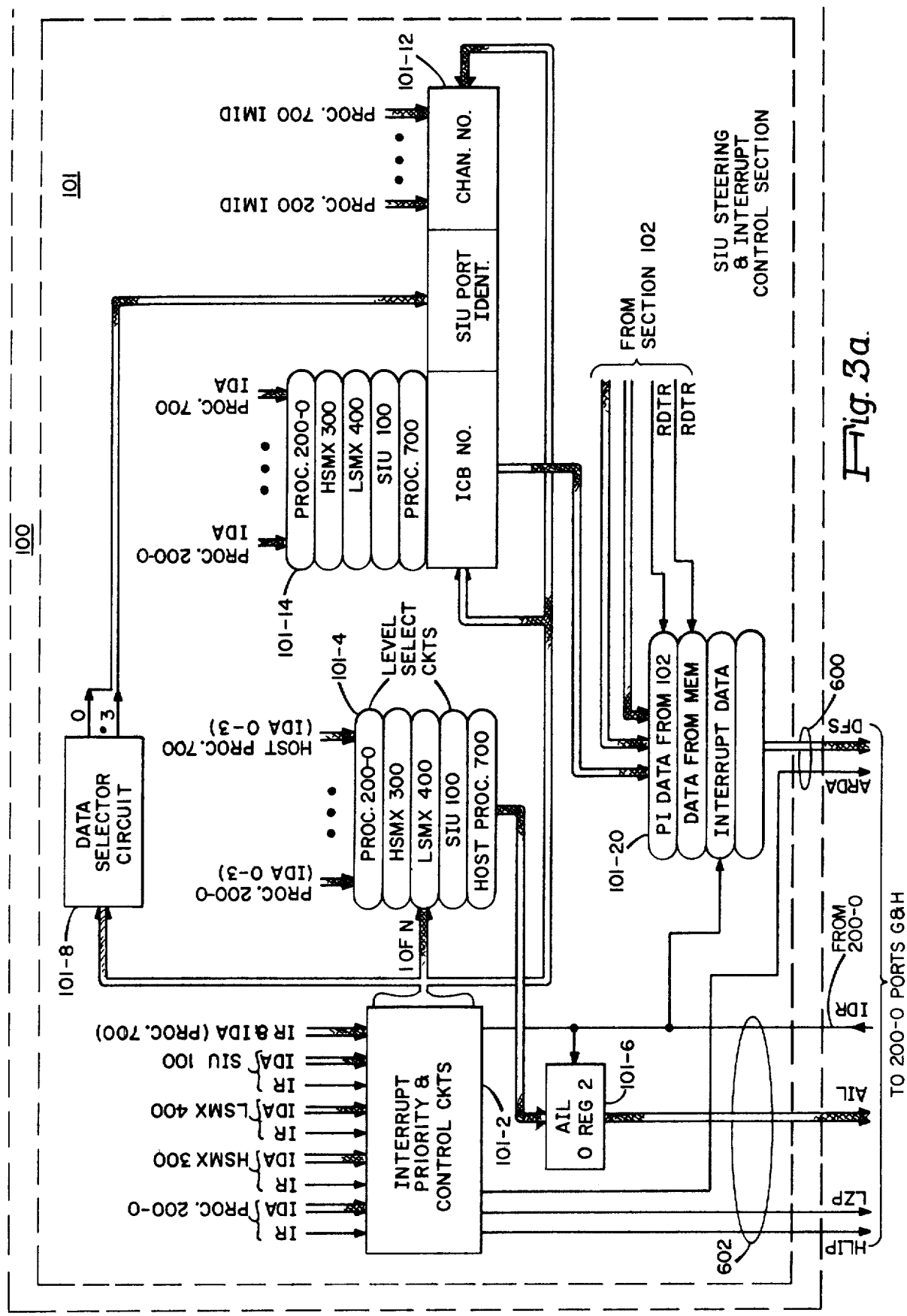

The System Interface Unit 100, as mentioned, provides for communication between modules of the system of FIG. 1 via a plurality of crossbar switches. Separate crossbar switches are used to collect signals from the lines of each of the different interfaces of the modules. FIG. 3a shows the switches and circuits of interrupt section 101 for handling the module interrupt interfaces. In the system of FIG. 1, there are modules which connect to ports LMO, A, E, G, and J, each of which applies signals to the SIU 100 via different ones of the lines of its interrupt interface 602. Additionally, SIU 100 also provides signals via an interrupt interface associated with port L of FIG. 1.

As seen from FIG. 3a, each of the modules when requesting service applies a signal on its interrupt request (IR) line together with appropriate interrupt identifier information of its IDA lines which are applied to the circuits of an interrupt priority and control block 101-2. The circuits of block 101-2 monitor all interrupt interfaces and signals the appropriate processor pair 200-0 referred to herein as processor 200 when there is a request having a priority higher than that of the process being executed. When processor 200 signals that it is able to accept the request, the SIU 100 gates the identifier information associated with the highest priority request to the processor. The identifier information includes an eight bit interrupt control block number including a parity bit, a three bit interrupt level number and a one bit processor number with a parity bit and a four bit channel number.

Considering interrupt section 101 in greater detail, the circuits of block 101-2 include decoder circuits which decode the processor number and interrupt request signals. Providing that there is no parity error, the output signals from the decoder circuits are applied to priority logic circuits of the designated processor logic circuits. The priority logic circuits decode the interrupt level signals and determine the highest priority level and then determine the port priority so that the module having the highest priority level and highest port priority is selected. The interrupt port priority within any given level is as follows:

Old; port L; port A, port B, port C; port D; port E; port F, port G; port H; port J and port K. This means that in the system of FIG. 1 the port of the current process has the highest priority followed by the SIU 100, the high speed multiplexer 300, the host processor 700, the processor 200, and the low speed multiplexer 400.

The priority circuits of block 101-2 are operative to generate an output signal on one of $n$ number of output lines, $n$ corresponds to the number of interrupting modules within the system. The $n$ output lines are applied to an eight position data selector switch 101-4 which selects the interrupt level signals of a level of interrupt having a priority higher than the level currently in progress to be loaded into a register 101-6. The output signals from register 101-6 are applied to the AIL lines when processor 200 forces the IDR line to a binary ONE in response to the SIU 100 having forced prior to the higher level interrupt present (HLIP) line or the level zero present (LZP) line to a binary ONE. When the current process is not inhibited from being interrupted, an interrupt request causes the processor 200 to suspend the current process and to accept an interrupt word from the SIU 100 including the identifier information mentioned previously. More specifically, the interrupt word is formatted as follows.

Bit 0 is a new interrupt bit position. When set to a binary ONE indicates that the interrupt is a new one and when set to a binary ZERO indicates that the interrupt is that of a previously interrupted process that is to be resumed.

Bits 1-17 are unused and are binary ZEROS.

Bits 18-27 define the interrupt control block number with bits 18 and 27 being set to binary ZEROS.

Bits 28-31 are generated by the SIU 100 and identify the source module as explained herein in accordance with the present invention.

Bits 32-35 are generated by the modules having multiple ports and identify the subchannel or port within the source module as explained herein in accordance with the present invention.

For more detailed information regarding the implementation of the circuits of block 101-2, reference may be made to the copending patent application titled "Priority Interrupt Hardware" referenced in the introductory portion of the specification.

It is also seen that the output lines from interrupt priority circuits 101-2 are applied to a further data selector switch circuit 101-8. Since only the requesting module having the highest priority will apply a signal to selector circuit 101-8, the selector circuit is connected to provide a predetermined wired-in set of coded steering signals which identify the physical port to which the requesting module granted priority connects (i.e. bits 28-31 of the interrupt word).

In the present embodiment, the following steering codes are generated for identifying the modules of FIG. 1.

| CODE | SIU PORT (MODULE) IDENTIFIED |
|------|------------------------------|
| 0000 | Local memory module - port LM0 |
| 0001 | port K |
| 0010 | SIU 100 -port L |
| 0101 | Low speed multiplexer 400 - port J |
| 0110 | processor 200 - port G |
| 1101 | high speed multiplexer 300 - port A |
| 1110 | host processor 700 - port E. |

The four bit code generated by the selector circuit 101-8 is in turn applied to a group of conventional AND gating circuits included within a gating network 101-12. The other identifier information provided by the different source system modules are also applied to other gating circuits of network 101-12. Specifically, each module applies an interrupt control block number (ICBN) via its IDA lines to a different one of the positions of an eight position data selector switch circuit 101-14. Additionally, each module provides the information identifying the requesting subchannel or port of the source module to other ones of the gating circuits of network 101-12 via the IMID lines of the interrupt interface. When the processor 200 forces its interrupt data request (IDR) line to a binary ONE, the SIU 100 applies the signals from gating network 101-12 to the data from SIU (DFS) bus lines of the processor data interface 600 via one of the positions of a four position data selector switch circuit 101-20. The other positions of switch 101-20 are not shown since they are not pertinent to an understanding of the present invention.

Data Transfer Section 102

Figure 3B:
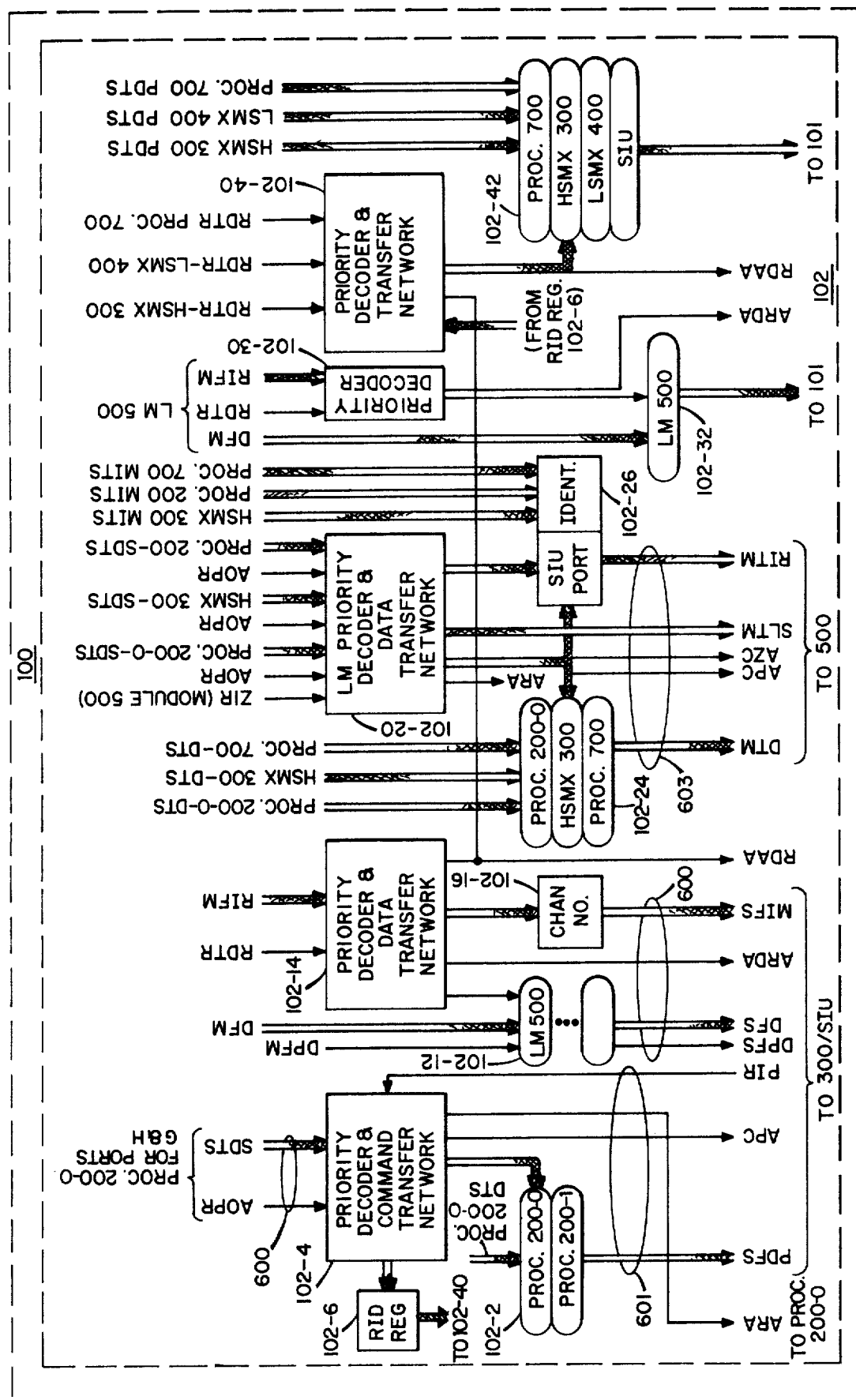

FIG. 3b shows the data transfer section 102 of the system interface unit 100. This section includes priority circuits which establishes which source module is to transfer commands to the high speed multiplexer 300 on its programmable interface 601 and which source module is to transfer data to the multiplexer 300 on its data interface 600. Additionally, section 102 includes priority circuits which determine which source module is going to transfer either data or commands to local memory module 500.

It will be appreciated that transfers between a pair of modules occurs when one module has generated a request to the other module and that the request has been accepted by the other module. In order for a request to be accepted, the requesting module must have the highest priority, both modules must be in a state to receive information and that the transfer path over which the transfer is to take place must be available (i.e. not busy).

As concerns the signals applied to section 102 by processor 200, the generation of these signals is to a large extent controlled by the different fields of the microinstructions read out into processor register 201-15 of FIG. 2. For example, the active output port request (AOPR) line from processor 200 applied to the circuits of block 102-4 is enabled in accordance with a SIU request type control bit field of each microinstruction read out to register 201-15 which is coded to define a transfer of a read/write memory or programmable interface command. The data to SIU lines (DTS) of the processor data interface 600 applied to a two position data selector switch 102-2 constitute command information generated under microprogram control which is loaded into the processor data output register 204-14 of FIG. 2. The steering data to SIU (SDTS) lines receive signals generated under microprogram control which are loaded into the processor steering register 204-16 of FIG. 2.

For the system of FIG. 1, only I/O processors transfer commands to the multiplexer 500 only and processor 200 applies signals to network 102-4. The network 102-4 therefore includes decoder circuits which decode the steering information from the processor module to establish when the module desires to transfer commands to the multiplexer 300. In the case of more than one I/O processor when more than one module desires to transfer during the same cycle, a priority network included in network 102-4 selects the module assigned the highest priority and enables the transfer of a command by that module to the multiplexer 300 on the PDFS lines of its programmable interface 601. More specifically, the network 102-4 applies signals to the two position selector switch 102-2 which selects signals from the appropriate module. This occurs when the multiplexer 300 signals the SIU 100 that it is ready to accept a command by forcing the PIR line to a binary ONE. At the same time, network 102-4 forces the APC line to a binary ONE signaling the multiplexer 300 to accept the command applied to the PDFS lines. When the processor 200 executes an instruction causing it to send a programmable interface (PI) command to the multiplexer 300, the processor 200 places the processor number identification into bit 3 of the command. The multiplexer 300 stores the processor number contained in the command until it wants to issue an interrupt request at which time the processor number is included as part of the interrupt data as explained herein. When the PI command is forwarded to multiplexer 300, the steering information identifying processor 200 as the requester is stored in a register 102-6 associated with multiplexer 300 (port A). As explained herein, when multiplexer 300 responds by generating a read data transfer request to SIU 100, the contents of register 102-6 is used to identify processor 200 as the actual module to receive the data.

A similar arrangement is employed for transferring data signals to multiplexer 300. In FIG. 1, memory module 500 is the only module which transfers data to multiplexer 300. Such transfer occurs in response to a read memory command (ZAC) forwarded to the memory module 500 by multiplexer 300 via network 102-20 as explained herein. When multiplexer 300 forwards the command, the SIU 100 generates the appropriate 4 bit requestor identifier code (steering code) which it appends to the multiport identifier information received from multiplexer 300. The information is stored by the memory module 500 and returned to the SIU 100 when the module 500 generates a read data transfer request to designate that multiplexer 300 is to receive the data. Also, when the SIU 100 accepts the request, it notifies the multiplexer 300 by forcing line ARDA to a binary ONE.

The read data transfer request (RDTR) line when set by memory module 500 signals the network 102-14 that it is ready to transfer information read out during a cycle of operation. The local memory module 500 also supplies signals to the requestor identifier from memory (RIFM) lines to identify the requesting module to which the information is to be transferred.

More specifically, circuits within a decoder network 102-14 decode the identify signals applied to the RIFM lines and when the signals indicate that the local memory module 500 is ready to transfer information to the multiplexer 300 (assumed the multiplexer 300 is ready to receive the information), the decoder network 102-14 applies the appropriate signals to the selector switch 102-12 and circuits within a gating network 102-16.

Additionally, decoder network 102-14 applies a signal to the accept read data (ARDA) line of the data interface signaling the multiplexer 300 that it is to accept the data from SIU (DFS) lines of its interface 600. The circuits of block 102-16 apply the appropriate multiport identifier information to multiport identifier from SIU (MIFS) lines identifying the requesting subchannel which is obtained from the RIFM lines. When the transfer has taken place, the network 102-14 forces the RDAA line to a binary ONE signaling the requesting module that the data has been accepted from memory module 500.

An arrangement similar to network 102-14 is used by SIU 100 to transfer PI and memory commands from any one of the modules of FIG. 1 to local memory module 500. The module 500 is operative to force either the programmable interface request (PIR) line or ZAC interface request (ZIR) line applied to a decoder network 102-20 to a binary ONE when it is ready to accept either a programmable interface or memory command. Additionally, the processor 200, the processor 700, and multiplexer 300 apply a network 102-20 signals to the active output port request (AOPR) line and steering data to SIU lines of their respective data interfaces. The network 102-20 upon decoding the steering information applied by each of the modules is operative to generate the appropriate signals to a three position selector switch 102-24 for enabling the module having the highest priority to apply signals to the data transfer to SIU lines of memory module data interface 603. It is also seen that network 102-20 applies signals to either the accept programmable command (APC) line or accept ZAC command mode (AZC) together with the appropriate requestor identification signals on the request identifier to memory (RITM) lines of the local memory module interface 603 via a gating network 102-26.

The last two networks 102-30 and 102-40 are used to transfer memory data and programmable interface data to processor 200 in response to memory commands and PI commands respectively previously generated by the processor 200. As seen from FIG. 3b, the priority decoder network 102-30 has the same input lines as network 102-14 and operates in the same manner to forward the requested memory data to processor 200 via a data selector switch 102-32 and the four position selector switch 101-20 of FIG. 3a. It will be appreciated that since processor 200 processes a single command at a time, there can be no conflict between the modules applying data to selector switch 101-20 for transfer to the processor DFS lines in response to processor requests. That is, after the processor 200 sends a command to one of the modules of FIG. 1, its operation is stalled pending receipt of the requested data. The SIU 100 upon accepting the processor's request forces the processor's ARA line which causes the processor to delay operations.

The separate network 102-40 processes return data requests from those modules responding to PI commands. The network 102-40 decodes the signals applied to the RDTR lines and from register 102-6 together with registers of the other modules, not shown. When the SIU 100 detects that module is trying to return requested data to processor 200 (i.e. requestor identifier stored in multiplexer 300 register 102-6), the network 102-40 generates signals which conditions a three position data selector circuit 102-42 to apply the signals from the PDTS lines of the PI interface of the module trying to return requested data to processor 200. These signals are in turn applied to the processor's DFS lines via selector switch 101-20 of FIG. 3a which is conditioned by the module request signal. During a next cycle of operation, the network 102-40 forces the RDAA line to a binary ONE signaling the module that the data applied to the PDTS lines has been accepted and that the module can now remove such data (i.e., clear its output register). Thus, it is seen that switch 101-20 selectively applies any one of three types of data to the DFS lines of the processor's data interface 600.

For the purpose of the present invention, the circuits included within different ones of the blocks of FIG. 3b may be considered conventional in design and include logic circuits found in the aforementioned publication by Texas Instruments Inc. Also, for the purposes of the present invention, the switching networks can comprise conventional crossbar switches.

Control Section 103

Figure 3E:
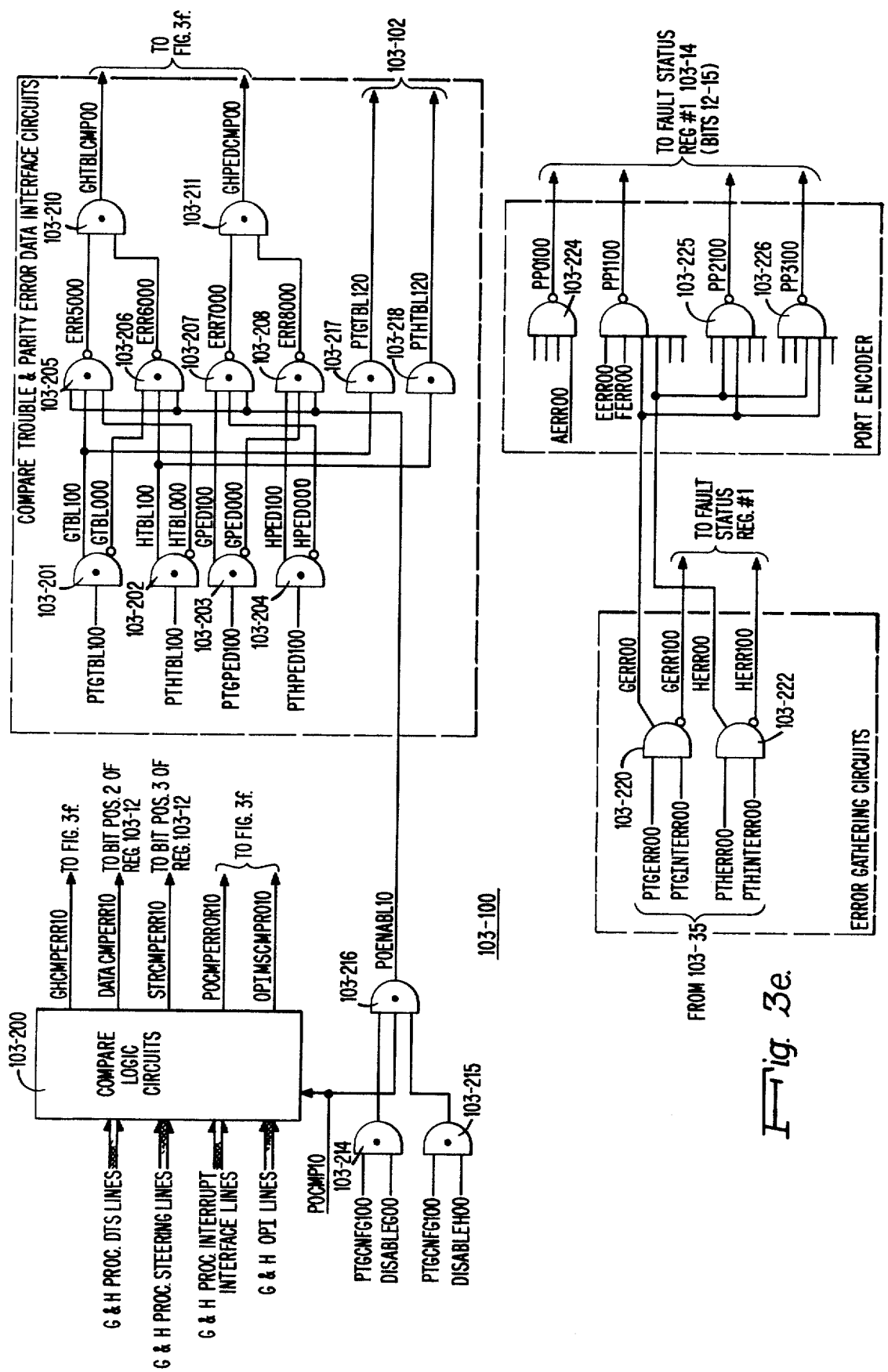
Figure 3C:
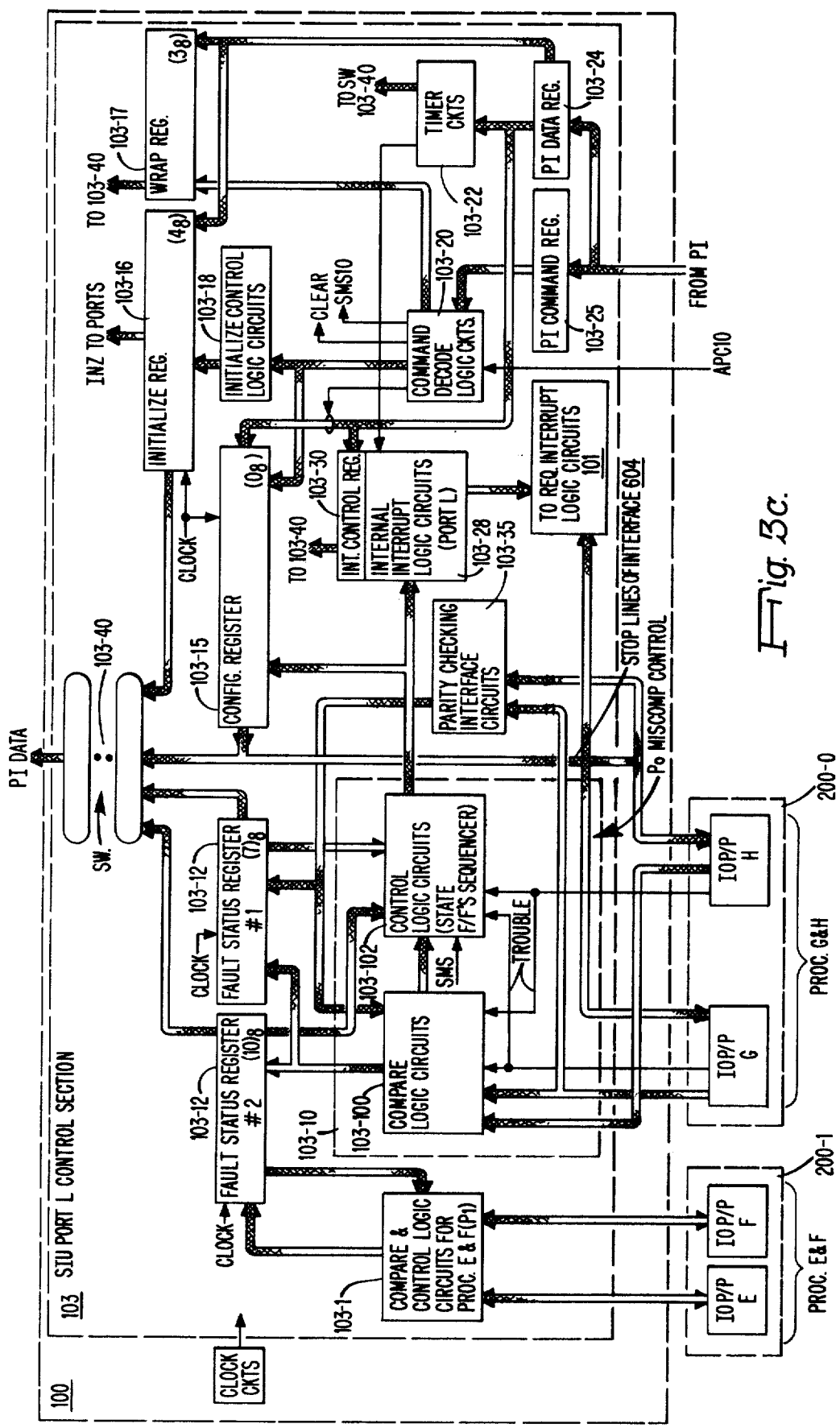

FIG. 3c shows in block diagram form section 103 of the system interface unit 100. This section includes compare and control logic circuits 103-10 and 103-11 for logical processor pairs 200-0 and 200-1. Since these circuits are duplicated for each processor pair, only one is shown in detail herein (i.e., FIG. 3d). Also included are the circuits of blocks 103-20, 103-24, and 103-25 which connect to a PI interface 602 and interpret and execute PI commands directed to the SIU internal logic circuits through port L.

As seen from FIG. 3c, the internal logic circuits in addition to the circuits which process PI commands include an internal interrupt control register 103-30 which feeds internal interrupt logic circuits 103-28. These circuits in construction are similar to the priority interrupt logic circuits 101 shown in FIG. 3a. The internal interrupt logic circuits 103-28 generate eight types of interrupts. The interrupt types pertinent to the present invention are as follows:

1 = interval timer exhaust generated by the interval timer counting through zero;

4 = processor error, detected with no mis-compare;

5 = mis-compare error detected along with a processor error; and,

6 = mis-compare error with no other errors existing.

The interrupt priority within port L is based on type number and the priority is as follows:

| Type | |
|---|---|
| 4 | highest |
| 5 | |
| 6 | |
| 7 | |
| 0 | |
| 1 | |
| 2 | |
| 3 | lowest |

Figure 12:
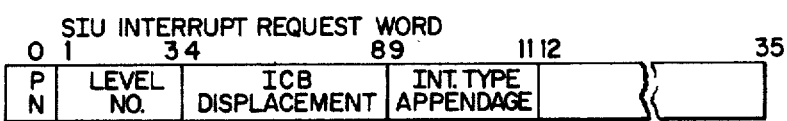
FIG. 12 illustrates the format of an interrupt data word.

The interrupt types 4-7 are hardwired to level 0 while the interrupt levels for other types (i.e., 0, 1, 2, and 3) are programmable using the coded level signals stored in interrupt control register 103-30. The circuits 103-28 establish the interrupt having the highest priority and generate appropriate request signals which are applied to the interrupt logic circuits 101. The format of the request is shown in FIG. 12. As mentioned, the circuits 101 report the interrupts to the designated input/output processor pair.

The SIU internal logic circuits in response to an RDEX instruction to port L enable the contents of different ones of the registers 103-12 through 103-17, register 103-30, and timer 103-40 to be read via a multiposition selection switch 103-40. The configuration register 103-15, assigned octal address 0, stores identifier information and the operational status of all SIU ports. It is formatted as shown in FIG. 8a. The interval timer 103-40 which, for the purpose of the present invention, can be considered conventional is design includes a 24 bit register assigned octal address 2 for storing a count defining a particular time interval. The wraparound register 103-17, assigned octal address 3, is a working register used by test and diagnostic routines.

The initialize register 103-16, assigned octal address 4, stores indications for selectively initializing and masking SIU ports. Initializing takes place in response to signals generated by initialize control logic circuits of block 103-18. That is, the register 103-16 is loaded via a WREX instruction and the initialize bit positions are reset by the circuits 103-18, as explained herein. The masking operations take place in a similar fashion and are not pertinent to the present invention. The format of the register is shown in FIG. 8b.

The fault status registers 103-12 and 103-14 are assigned octal addresses 10 and 7, respectively. Fault status register #1 is a 36 bit register used to signal all errors detected by SIU 100 with the exception of processor or memory reported errors. The storage of information relating to an error condition "locks" the register to the first detected error until it is cleared via an RDEX instruction (PI command). It is formatted as shown in FIG. 8c. Fault status register #2 is also a 36 bit register used to signal all processor miscompare errors and any other faults not stored in fault status register #1. It is formatted as shown in FIG. 8d.

As seen from FIG. 3c, section 103 also includes parity generation and checking circuits of block 103-35. These circuits, for the purpose of the present invention, may be considered conventional in design. They generate parity check bits for the signals applied to different processor interfaces by each processor and check them against the parity check bit signals furnished by the processor pairs. The results of the parity check are applied as inputs to the compare and control logic circuits associated with the processor pair. Although not shown, the parity circuits 103-35 also receive signals from the processor pair 200-1 and furnish result signals to the circuits 103-11.

Detailed Description of Section 103

Figure 3F:
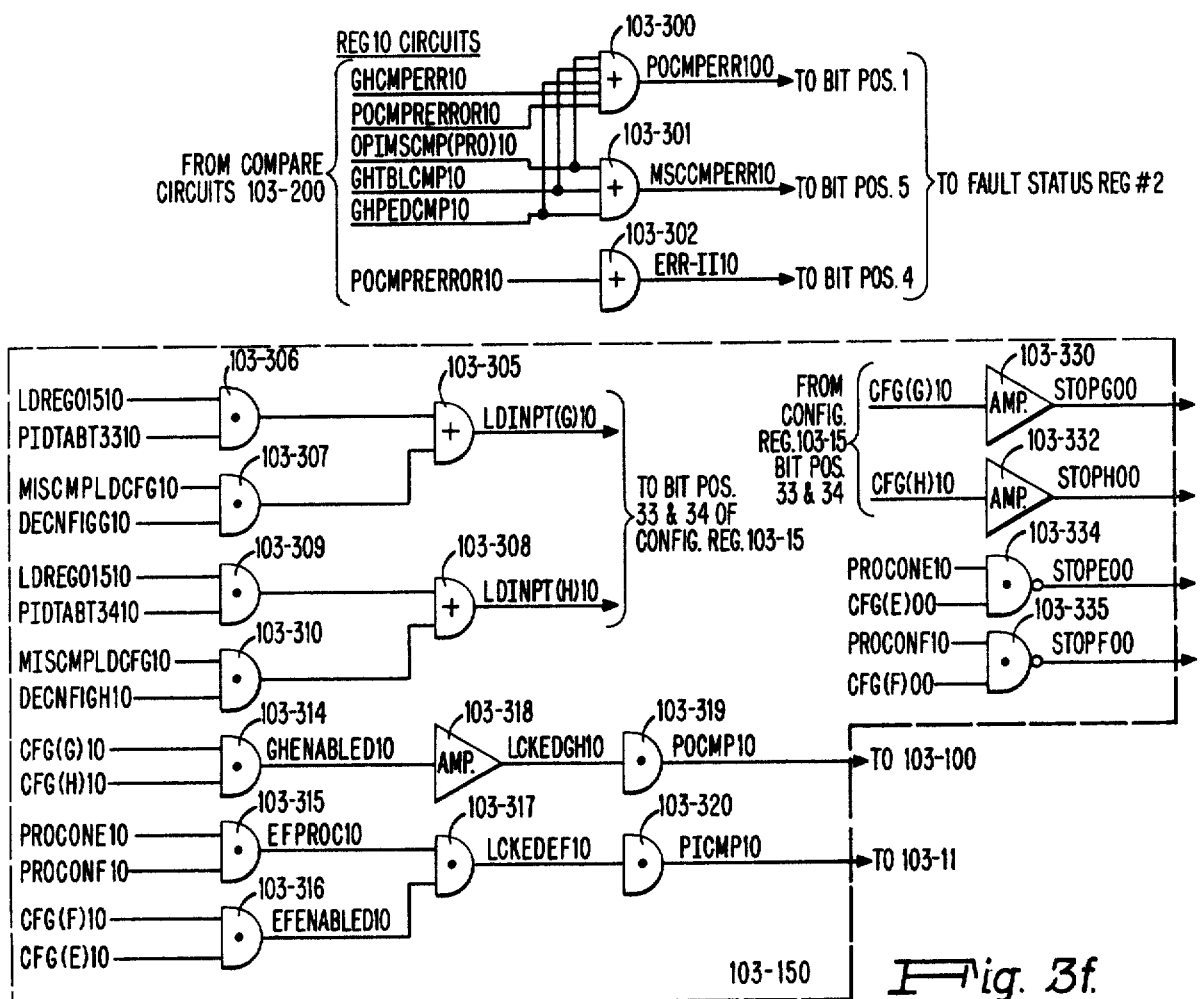

FIGS. 3d, 3e, and 3f show in greater detail the circuits 103-102, 103-100, and 103-18 respectively in addition to the circuits associated with registers 103-12 and 103-15 of FIG. 3c. Referring first to FIG. 3d, this figure illustrates in detail the sequencer control circuits of block 103-102. The sequencer control circuits include three clocked D type flip-flops 103-130, 103-131, and 103-132, which are enabled by a signal GHCMPERREN10 applied via an AND gate 103-106. This gate receives a signal AUTORECNFG00 normally a binary ONE and a signal REG100110 from fault status register #2. Signal REG100110 is a binary ONE when a miscompare is detected on ports G and H. The signal SET11GH10, when forced to a binary ONE, switches the Y1 flip-flop 103-103 to a binary ONE. Similarly, the signals SET21GH10 and SET31GH10, when forced to binary ONES switch flip-flops 103-104 and 103-105, respectively, to binary ONES. A signal RESET10 is used to switch the Y1, Y2, and Y3 flip-flops 103-103 through 103-105 to binary ZEROS. One of input sections of the flip-flops is shown in greater detail. It comprises a pair of AND gates, the outputs of which are connected in a "wired OR".

The collection of NAND gates 103-108 through 103-129 generate the signals SET11GH10 through SET13GH10 in response to the signals shown. For the most part, these signals correspond to output signals from a decoder 103-140 which decodes the states of flip-flops 103-103, 103-104, and 103-105.

In greater detail, the Y1, Y2, and Y3 flip-flops 103-130 through 103-132, respectively, are set in accordance with the following boolean expressions. The dot and plus sign symbols represent a logical AND and logical OR operation, respectively.

Set $\mathcal{C}$Y1-GH100 =
[$\overline{\text{RESET}}$] [GHCMP-ERR-EN100] · ([(Y0·PTH-ERR100)
+ (Y1·SMS110)] + [(Y7)+($\mathcal{C}$Y1·$\overline{\text{READ/CLR10}}$)])

Set $\mathcal{C}$Y2-GH100 =
[$\overline{\text{RESET}}$] [GHCMP-ERR-EN100] · ([(Y0·ERR-GH)
+ (Y1·PTG-TBL) + ($\mathcal{C}$Y2·$\overline{\mathcal{C}\text{Y3}}$·READ/CLR10]
+ [(Y3)+(Y7·$\overline{\text{SMS}}$)+($\mathcal{C}$Y1·$\overline{\mathcal{C}\text{Y2}}$·SMS)])

Set $\mathcal{C}$Y3-GH100 =
[$\overline{\text{RESET}}$] [GHCMP-ERR-EN100] · ([(Y1)+(Y0·$\overline{\text{ERR-GH}}$)]
+ [(Y7·$\overline{\text{PTHTBL·SMS}}$) + (Y5·$\overline{\text{READ/CLR10}}$)])

wherein:
$Y0 = \overline{\mathcal{C}Y1} \cdot \overline{\mathcal{C}Y2} \cdot \overline{\mathcal{C}Y3}$
$Y1 = \mathcal{C}Y1 \cdot \overline{\mathcal{C}Y2} \cdot \overline{\mathcal{C}Y3}$
$Y2 = \overline{\mathcal{C}Y1} \cdot \mathcal{C}Y2 \cdot \overline{\mathcal{C}Y3}$
$Y3 = \mathcal{C}Y1 \cdot \mathcal{C}Y2 \cdot \overline{\mathcal{C}Y3}$
$Y4 = \overline{\mathcal{C}Y1} \cdot \overline{\mathcal{C}Y2} \cdot \mathcal{C}Y3$
$Y5 = \mathcal{C}Y1 \cdot \overline{\mathcal{C}Y2} \cdot \mathcal{C}Y3$
$Y6 = \overline{\mathcal{C}Y1} \cdot \mathcal{C}Y2 \cdot \mathcal{C}Y3$
$Y7 = \mathcal{C}Y1 \cdot \mathcal{C}Y2 \cdot \mathcal{C}Y3$ Other combinations of the decoder signals are applied to a further group of NAND gates 103-141, 103-142, and 103-143. These gates decode combinations of signals applied thereto and generate the control signals DECNFIG10, DECNFIGH10, and MISCMPLDCNFG010, which are applied to the input circuits of configuration register 103-15, shown in FIG. 3f.

A pair of flip-flops 103-150 and 103-151, when switched to binary ONES via signals SET31J100 and GHCMPERREN10, provide indications of the processor configuration to panel indicator circuits as a testing aid. A pair of OR gates 103-154 and 103-155, in response to the output signals from decoder 103-140, generate a type 5 or type 6 interrupt signal which is applied to the internal interrupt circuits of block 103-28. The interrupt signals are generated in accordance with the following boolean expressions:

INT-TYPE 5 = Y2 + Y6

INT-TYPE 6 = Y1 + Y7

A further group of NAND and AND gate circuits 103-160 through 103-162, a JK flip-flop circuit 103-164, and a gate 103-165 provide a reinitialize interrupt signal to the circuits 103-28 of FIG. 3c. This signal is generated in accordance with the following boolean expression:

REINITIALIZE INTERRUPT
(REINIT-INT-GH100) = (PTH-TBL-Y7) +
(Y3) + (SMS-φY1-$\overline{\phi Y2}$)

When enabled by the signals shown, the circuits switch flip-flop 103-165 to a binary ONE which, in turn, causes gate 103-165 to generate signal REINTINTGH10. This signal reinitializes the interrupt circuits. A last pair of gates 103-166 and 103-167, in response to signals from fault status register #2 switch processor number signals FORCEPN10 and ALTPN10 to the appropriate states. These signals are also applied as inputs to the interrupt circuits 103-28.

FIG. 3e shows in greater detail the compare logic circuits 103-100 of FIG. 3c. These circuits include a plurality of AND gates of block 103-200 which compare the states of the signals applied to the different interface lines of both processors of pair 200-0. When a mis-compare (non-comparison) is detected, the circuits force a corresponding one of the mis-compare error signals to a binary ONE. Signal GHCMPERR10 signals a mis-compare of the GH processor pair while signal DATACMPERR10 signals a mis-compare on the DTS lines of the data interface. The remaining signals STRCMPERR10, POCMPRERROR10, and OPIMSCMPRO10, respectively, indicate the occurrence of a mis-compare on the steering lines, interrupt interface lines, and OPI lines. These signals are applied to the input circuits of fault status register #2.

A plurality of NAND/AND gates 103-201 through 103-208 compare the states of the TBL and PED interface lines from the G and H processors. They condition AND gates 103-210 and 103-211 to force signals GHTBLCMP00 and GHPEDCMP00 to binary ONES upon the indication of "trouble" or a parity error condition. These signals are applied to the input circuits of fault status register #2.

The AND gates 103-214 through 103-216 force an enable signal POENAB10 to a binary ONE when both G and H processors are active and connected to operate locked or compare mode (i.e., signal POCMP10 = 1). As explained herein, the states of the configuration register 103-15 are used to define this type of operation.

It will also be noted that signals representative of the states of the processor TBL lines are applied via gates 103-217 and 103-218 to the sequencer control circuits of block 103-102.

A last group of circuits of block 103-100 include error gathering NAND/AND gates 103-22 and 103-222 which the parity error signals generated by the check circuits of block 103-35 for both the data and interrupt interfaces of each processor. The output signals are applied to a further group of NAND gates 103-224 through 103-226 of a port encoder. The encoder forces output signals PP0100, PP1100, PP2100, and PP3100 to the appropriate states to indicate the port from which an error has been detected. The signals PP0100 through PP3100 are applied to bit positions 12-15 of fault status register #1. The complements of the error signals are also applied to bit positions 0-15 of another section of fault status register #1.

FIG. 3f discloses the input and output gates associated with fault status register #2 and configuration register 103-15. As seen from the figure, the NAND gates 103-300 through 103-303 generate signals which are applied to bit positions 1, 4, and 5 of fault status register #2. The AND and OR gates 103-305 through 103-310 in response to a PI command or deconfiguration signal force load signals LDINPT(G)10 and LDINPT(H)10 to binary ONES for setting of bit positions 33 and 34 of configuration register 103-15. The signal MISCMPLDCNFG010 is applied as a load enabling signal to register 103-15.

The output signals from configuration register 103-15 are combined by AND gates 103-314 through 103-317, amplifier circuit 103-318, gates 103-319, and 103-320 to generate compare mole signals POCMP10 and PICMP10. The circuits which generate the signal for compare processor pair P1 are shown for completeness. It will be noted that additional control signals which define processor E and F are also used since this pair may not be connected in the system.

A last group of circuits includes amplifier circuits 103-330 and 103-332 in addition to NAND gates 103-334 and 103-335. These circuits force the STOP interface lines to the appropriate states in response to output signals from bit positions 31-34 of configuration register 103-15.

DETAILED DESCRIPTION OF HIGH SPEED MULTIPLEXER 300

COMMON SECTION

Figure 4A:
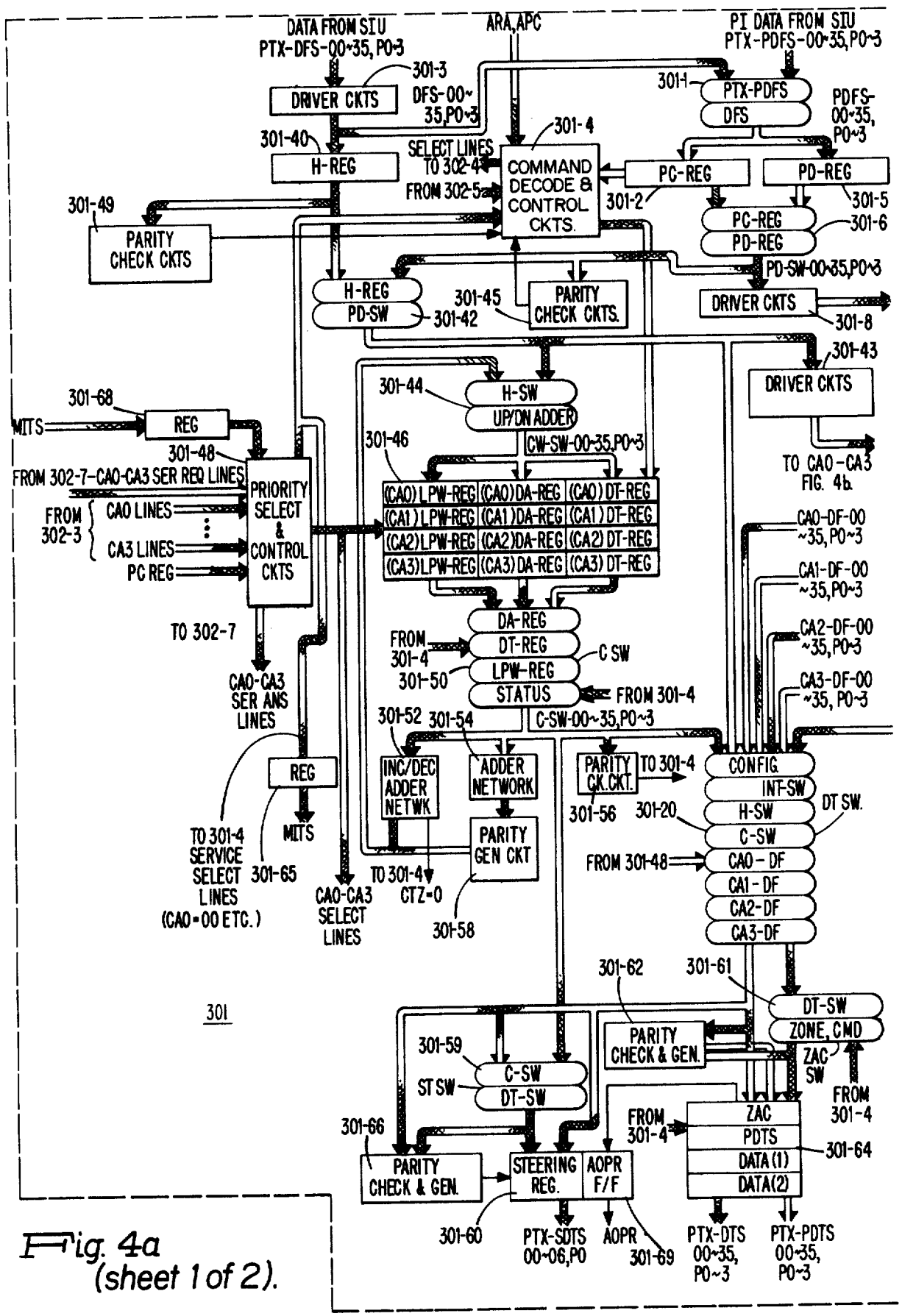
FIGS. 4a and 4b show in greater detail the multiplexer unit 300 of FIG. 1.
Figure 4B:
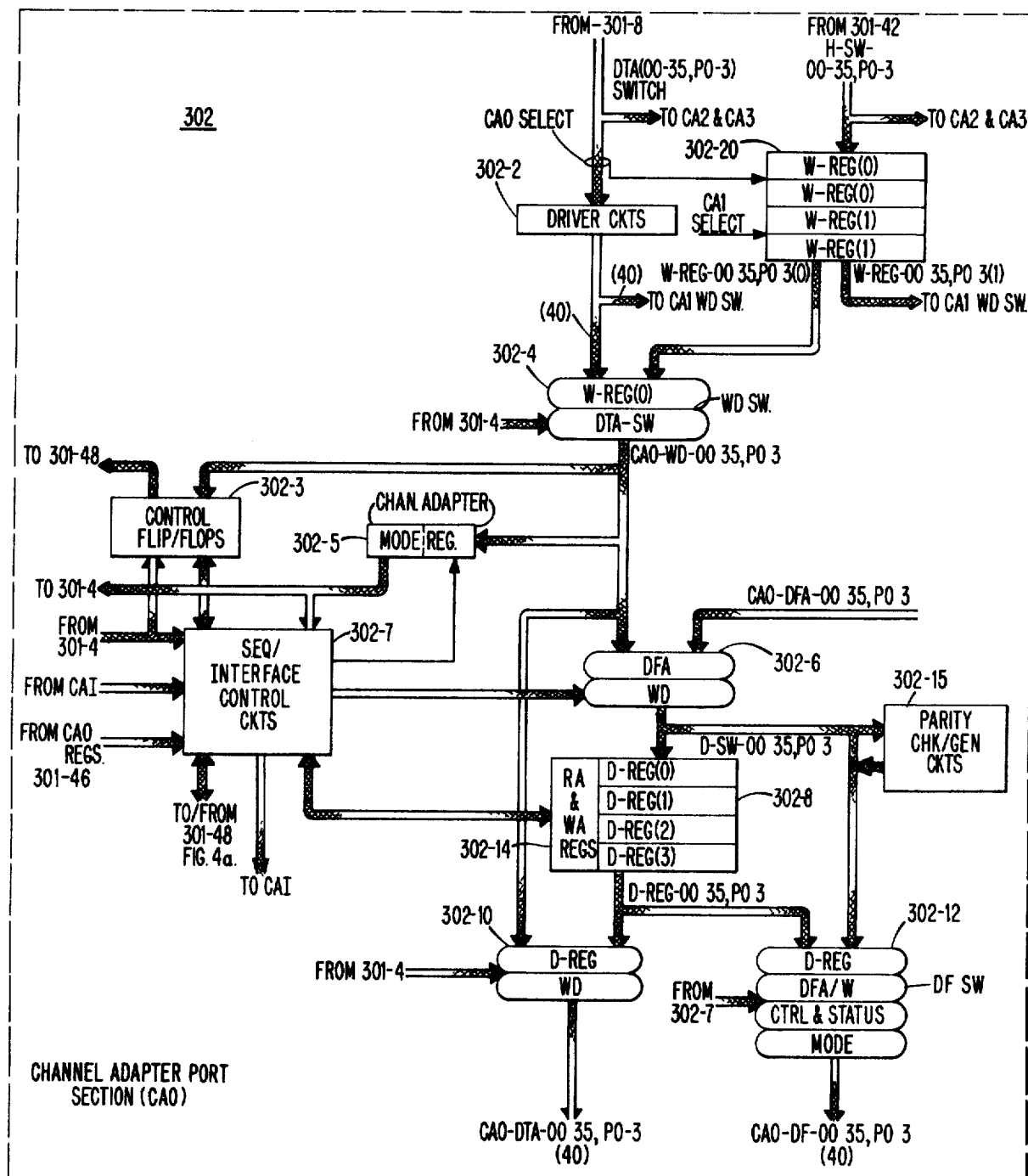

FIGS. 4a and 4b disclose in greater detail the common control section 301 and a portion of the channel adapter section 302. Referring first to FIG. 4a, it is seen that the common control section includes a pair of registers 301-2 and 301-5 for storing the words of a PI command received via the PDFS lines of the multiplexer programmable interface 601 through a two position data selector switch 301-1. The switch 301-1 enables PI command signals from an alternate path (i.e., DFS lines) to be loaded into registers 301-2 and 301-5. However, in the preferred embodiment, only the PDFS position will be used. It is also seen that a register 301-40 receives via driver circuits 301-3 memory data applied to the DFS lines of the multiplexer data in interface 600.

The command signals from both registers 301-2 and 301-5 are selectively applied via a two position data selector switch 301-6 of the four channel adapter sections via driver circuits of block 301-8. Also, the command signals can be selectively applied to one position of an eight position data selector switch 301-20 via a two position data selector switch 301-42. The same switch 301-42 also applies the data signals from register 301-40 to each of the four channel adapter sections via driver circuits of block 301-43.

A pair of parity check circuits 301-45 and 301-49 perform a check upon the contents of registers 301-2, 301-5 and 301-40 and apply signals representative of the results to the circuits of block 301-4 which provides status signals applied to C switch 301-50. These circuits comprise logic circuits, conventional in design, which combine signals from register 301-2 with signals from the channel adapter sections to generate control signals necessary for executing the commands received from processor 200.

Additionally, the signals from register 301-5 can also be loaded into a selected one of the plurality of registers of blocks 301-10, 301-12 and 301-14 via driver circuits of blocks 301-8, 301-15 and 301-16. The block 301-10 comprises four 8 bit registers, conventional in design, which may take the form of registers disclosed in the aforementioned Texas Instrument publication (e.g. TI 7481). Output signals from each of these registers can be selectively applied as an input to an interrupt position of selector switch 301-20 together with the corresponding signals from a four position selector switch 301-30 and an eight position selector switch 301-32. The contents of the ICB, level and mask registers of the channel adapter sections can be read during the performance of testing and verification operations in response to PI commands.

Additionally, the interrupt control block registers of block 301-10 are selectively connected to a 14 bit interrupt data (IDA) register 301-22 in response to signals generated by an interrupt level priority network 301-24. Groups of bit positions of each of the 24 bit level registers of block 301-12 are applied to corresponding positions of a different one of the 8 position multiplexer selection switches 301-26 through 301-28. It is also seen that each of the level registers of block 301-12 connect to different positions of the four position selector switch 301-30 and eight position selector switch 301-32. It is also seen that each of the 8 bit mask registers of block 301-14 connect to different positions of the four eight selector switch 301-32 and to the interrupt enable priority and type logic circuits of block 301-34.

As seen from FIG. 4a, the circuits of block 301-34 receive groups of interrupt request signals from channel adapters in addition to groups of interrupt signals generated by the controller adapters attached to the channel adapters. More specifically, each CA channel can generate four different types of interrupt requests. They include a fault interrupt caused by setting of a parity error indicator bit within a common status register, not shown, which can be considered as part of block 301-4, a data control word (DCW) interrupt, a programmable interrupt, and an exception interrupt produced by the detection of an illegal command etc. The fault interrupt is made common to each channel so as to have one input to block 301-34 which is the same for all four channels.

Each controller adapter can also generate four different types of interrupt requests which are dependent upon the type of device connected to the adapter. In the case of a disk device, the types of interrupt requests include: a fault interrupt caused by detection of parity errors, a rotational position sensed interrupt, a data transfer termination interrupt and an off-line interrupt caused by completion of an off-line operation such as a seek operation. The four types of channel interrupt requests and the four types of CA interrupt requests together provide a group of eight types per CA channel designated as events EV0 through EV7. Each type of interrupt request is assigned a three bit type number such that the four channel types of interrupt requests are numbered 0-3 corresponding to EV0-EV3 while the four controller adapter types of interrupt requests are numbered 4-7 corresponding to EV4-EV7. The events having the lowest codes have the highest priority (e.g. 000 = highest priority = EV0 = fault interrupt and 111 = lowest priority type = EV7 = off-line interrupt). The priority for the different types of interrupt requests is fixed and is determined by the type number. For further information regarding the assignment of priority types, reference may be made to the copending application titled "Programmable Interface Apparatus" which is assigned to the assignee of the present invention. Each of the channels provide 7 interrupt requests inputs to block 301-34 together with the common fault input provided by block 301-4.

The circuits within block 301-34 logically combine the signals from each of the mask registers of block 301-14 with the interrupt request signals from each channel and adapter and select the interrupt type having the highest priority for each channel. The three bit type code for each channel is applied to a corresponding one of the multiplexer selector circuits 301-25 through 301-28. The sets of type codes generated by block 301-34 are also applied as inputs to corresponding ones of the positions of a four position level/type selector switch 301-35.

Each of the multiplexer circuits 301-25 through 301-28 upon being enabled by the circuits of block 301-34 provide an appropriate three bit level code as an input to an interrupt level priority network 301-24. The network 301-24 generates signals on a pair of lines which connect as control inputs to the ICB registers of block 301-10, the switch 301-35 and a four position interrupt multiport identifier IMID switch 301-36. The signals generated by network 301-24 designate the channel or port having the highest priority. In the case where more than one channel has the same priority level, the circuits of network 301-24 select the channel assigned the lowest channel number (i.e. CA0=00XX=highest priority, CA3=11XX=lowest priority). In those instances where the controller adapters employ subchannels or subports, a pair of lines from the CAI provide signals to the low order two bit positions, of switch 301-36. The high order 2 bit positions of the switch are permanently with the corresponding channel adapter number (e.g. 00=CA0 etc.). The output of switch 301-36 is applied to IMID register 301-23 as depicted in FIG. 4a.

The output signals from the selected ICB register of block 301-10, the level signals from the selected multiplexer circuits and the type signals from block 301-34 are merged into the IDA register 301-22. Also, these signals are applied to the parity generator circuits of a block 301-37 which generates a pair of odd parity bits for the signals stored in the register 301-22. A further flip-flop 301-21 which can be considered part of register 301-22 receives a signal from the circuits of block 301-34 to indicate the presence of an interrupt request.

As seen from FIG. 4a, data signals stored in bit register 301-40 are applied via the H register position of two position data selector switch 301-42 to a two position channel write (CW) switch 301-44. The first position of the switch 301-44 when selected loads one of the four groups of channel adapter port registers 301-46 selected in response to signals generated by priority select and control circuits of block 301-48. The circuits of block 301-48 which receive input signals from registers 301-2 and 301-68 and the channel adapters shown apply output signals to the lines and output register 301-65. The registers of group 301-46 include a 40 bit register for storing a list pointer word (LPW) for the port associated therewith, a 40 bit DA register for storing the address of data to be read or stored and a 40 bit register DT for storing tally and control information relating to a current data transfer operation. The same registers of the four channel adapter sections connect to different positions of a four position data selector switch 301-50 which receive control signals from the circuits of block 301-48. The output signals from switch 301-50 are applied to a pair of adder networks 301-52 and 301-54 in addition to a parity check circuit 301-56 operative to check the contents for errors. The adder network 301-52 is operative to update the contents of the register selected via switch 301-50 while the adder network 301-54 applies output signals to a parity generator circuit 301-58. The signals from the circuits 301-52 and 301-58 are returned to the selected register via the update network position of switch 301-44.

As also seen from FIG. 4a, the output signals of switch 301-50 are applied selectively to an 8 bit steering register 301-60 via a steering switch 301-59 and to the DT switch 301-20. Each of the data selector switches 301-59 and 301-61 receives output signals from DT switch 301-20 which in addition to the sources mentioned is connected to receive data signals from the DF lines of each of the channel adapter sections CA0-CA3. The output signals from DT switch 301-20 and ZAC switch 301-61 are applied to a parity generator and check circuit 301-62 and to the bank of registers of block 301-64. Additionally, switch 301-61 is connected to receive zone and command information derived from channel adapter service lines applied to block 301-4 when the multiplexer 300 is being operated in a particular mode not pertinent to the present invention. The four registers of block 301-64 designated as ZAC, PDTS, Data 1, and Data 2 respectively store memory command signals, PI data signals and channel adapter data signals. The output signals from these registers are applied either to the lines DTS of the multiplexers data interface 600 or the PDTS lines of the multiplexers interface 601. When the ZAC register of block 301-64 is loaded, this causes an AOPR flip-flop 301-65 to be switched to a binary ONE which signals the SIU 100 that the multiplexer 300 is requesting a path over which it can transfer a memory (ZAC) command and data. The appropriate memory steering information applied via switch 301-59 will have been stored in register 301-60 and a parity check and generator circuit 301-66 is operative to generate odd parity for the steering information.

CHANNEL ADAPTER SECTIONS

FIG. 4b shows the registers and data selector switch which comprise each of the channel adapter sections CA0-CA3. Since each of the sections are identical, only section CA0 is shown. It is seen that the section receives output signals from data transfer switch 301-6 and H switch 301-42. The signals from DT switch 301-6 are applied via driver circuits of block 302-2 to a two position data selector (WD) switch 302-4. The output command signals from switch 302-4 can be loaded selectively into either a mode register 302-5 or into a plurality of control flip-flops 302-3 in response to control signals from 301-4.

Output signals from the mode register 302-5 and the control flip-flops are applied as inputs to the logic circuits of block 302-7 which generate the required control signals for execution of a command by the controller adapter connected to the section. Also, the circuits of block 302-7 receive control signals from block 301-4 from the register group 301-46 associated with the channel adapter and from the lines of the controller adapter interface.

In the present embodiment, the controller adapter interface includes the following lines.

| CONTROLLER ADAPTER LINES | |
|---|---|
| Designation | Description |
| DTA | The data to adapter lines are 40 lines which extend from the module 300 to the controller adapter used to transmit data including commands and addresses to the adapter. |
| ADTA | The accept data to adapter line extends from the module 300 to the adapter and when set indicates that data is available on the DTA lines and that it should be accepted by the adapter. |
| ACTA | The accept control to adapter line extends from the module 300 to the adapter and when set indicates that a PI command or data is available on the DTA lines and that it should be accepted by the adapter. |
| CHBSY | The channel busy line extends from the module 300 to the adapter and when in an indirect mode indicates to the adapter that the multiplexer 300 is now in an Auto data transfer mode; the channel remains busy until the termination of the Auto data transfer operation. In a direct mode, this line is set when a memory (ZAC) command is received from the adapter and remains set until either the requested read data is transferred or status is returned from the memory module. |
| CDR | The channel data ready line extends from the module 300 to the adapter and when set indicates that the module 300 is ready to accept more data or commands from the adapter. |
| EDT | The end data transfer line extends from the module 300 to the adapter and is used during Auto data transfer operations in indirect mode to indicate that the last word of data has been transferred (Write) or that the last word of data has been stored (Read). |
| DFA | The data from adapter lines are 40 lines which extend from the controller adapter to module 300 used to transfer data including status memory addresses, commands, to module 300. |
| PIDFA | The port identifier from adapter lines are two lines from the adapter to module 300 used in conjunction with the interrupt lines to indicate which subport on the controller adapter caused the interrupt. |
| ADFA | The accept data from adapter line extends from the adapter to module 300 and when set indicates that data or memory command is applied to the DFA lines and should be accepted by module 300. |
| AD-BUSY | The adapter PI busy line extends from the adapter to module 300 and when set indicates that the adapter has accepted a PI command and is not capable of accepting any more commands. |
| ADR | The adapter data ready line extends from the adapter to the module 300 and when set indicates to the channel that the adapter is ready to accept more data. |
| IFA | The interrupt from adapter lines are four lines which extend from the controller adapter to module 300 and indicate the type of interrupt requests (i.e. generates EV4-EV7 signals applied to block 301-34). |
| TFA | The terminate from adapter line extends from adapter to module 300 and when set indicates the termination of a data transfer operation to module 300. |

It will be appreciated that the controller adapter interface includes other lines required for performing other functioning such as initializing, enabling, etc.

Output signals from switch 302-4 are applied to a further two position selector switch 302-6 which also receives data signals applied to the lines DFA by the controller adapter associated therewith. During a data transfer operation, the output signals from the DFA position of switch 302-6 are loaded into different ones of the four 40 bit data registers 302-8 for transfer to common section 301 via a four position switch 302-12 or to the controller adapter via a two position selector switch 302-10. Additionally, output signals from WD switch 302-4 are transferred to the controller adapter via the WD position of switch 302-10. Different ones of the registers 302-8 are selected for loading and unloading by the address signals stored in read and write address registers of block 302-14 which are modified by signals generated by the circuits of block 302-7. Also, these WA and RA registers supply signals indicative of the number of words stored which are used to determine the status of a transfer operation.

During a data transfer operation, the parity check and generation of circuits block 302-14 are operative to check the parity of the data signals received from the controller adapter via switch 302-6 and generate appropriate parity as required. It is also seen that switch 302-4 receives signals from the first pair of channel write data registers (W Reg 0, W Reg 1) which store two words of information for transfer from H switch 301-42 to either the registers 302-8 or directly to the controller adapter via the selector switch 302-10.

DESCRIPTION OF OPERATION

With reference to FIGS. 1 through 14, the state diagram of FIG. 15, and the flow chart of FIG. 16, the operation of the preferred embodiment of the present invention will now be described.

As discussed above, the interface lines of both pairs of I/O processors are duplicated. They are connected in parallel to the comparison circuits of SIU 100, shown in FIG. 3c. Since both processor pairs 200-0 and 200-1 operate in the same fashion, in accordance with the present invention, the operation of one pair (200-0 or P0) will be described herein.

During each clock interval, the compare logic circuits 103-200 compare the sets of signals applied as outputs on each of the interface lines of processors G and H. The configuration register 103-15 has bits 33-34 both set to binary ONES since both processors of pair P0 are normally operated in a "locked" or in a compare mode for purposes of error detection. It will be appreciated that bit positions 33 and 34 of configuration register 103-15 will have been set via a PI load register command to SIU port L having the format shown in FIG. 7b. Thus, circuits of FIG. 3f force the states of each of the STOP lines of interface 604 of each processor to a binary ZERO enabling the clock circuits and cycling of processors G and H control section 201 of FIG. 2. Also, signal POCMP10 is forced to a binary ONE, enabling the operation of circuits 103-200 and 103-205 through 103-208 in FIG. 3e.

Also, during normal operation, the SIU parity circuits 103-35 generate parity bits for the signals applied to the interface lines of each input/output processor interface (data and interrupt interfaces). The generated parity check bits furnished by the processor and the results are applies as inputs to NAND/AND gates 103-220 and 103-222 of FIG. 3e.

If a mis-compare error is detected, signal POCMPERR10 is forced to a binary ONE via OR gate 103-300. This switches bit position 1 of fault status register #2 to a binary ONE. It is assumed, by way of example, that a mis-compare is detected on the DTS data lines of data interface 600. The signal mentioned is clocked immediately into the status register. This allows sufficient time for interrogation by an IOP processor where the mis-compare condition is transient.

The information concerning where the mis-compare occurred is used by the test and diagnostic routines as explained herein. The information stored as to what port had the mis-compare is pertinent to the operation of the sequencer control circuits 103-102. This example is concerned with ports G and H.

Figure 16:
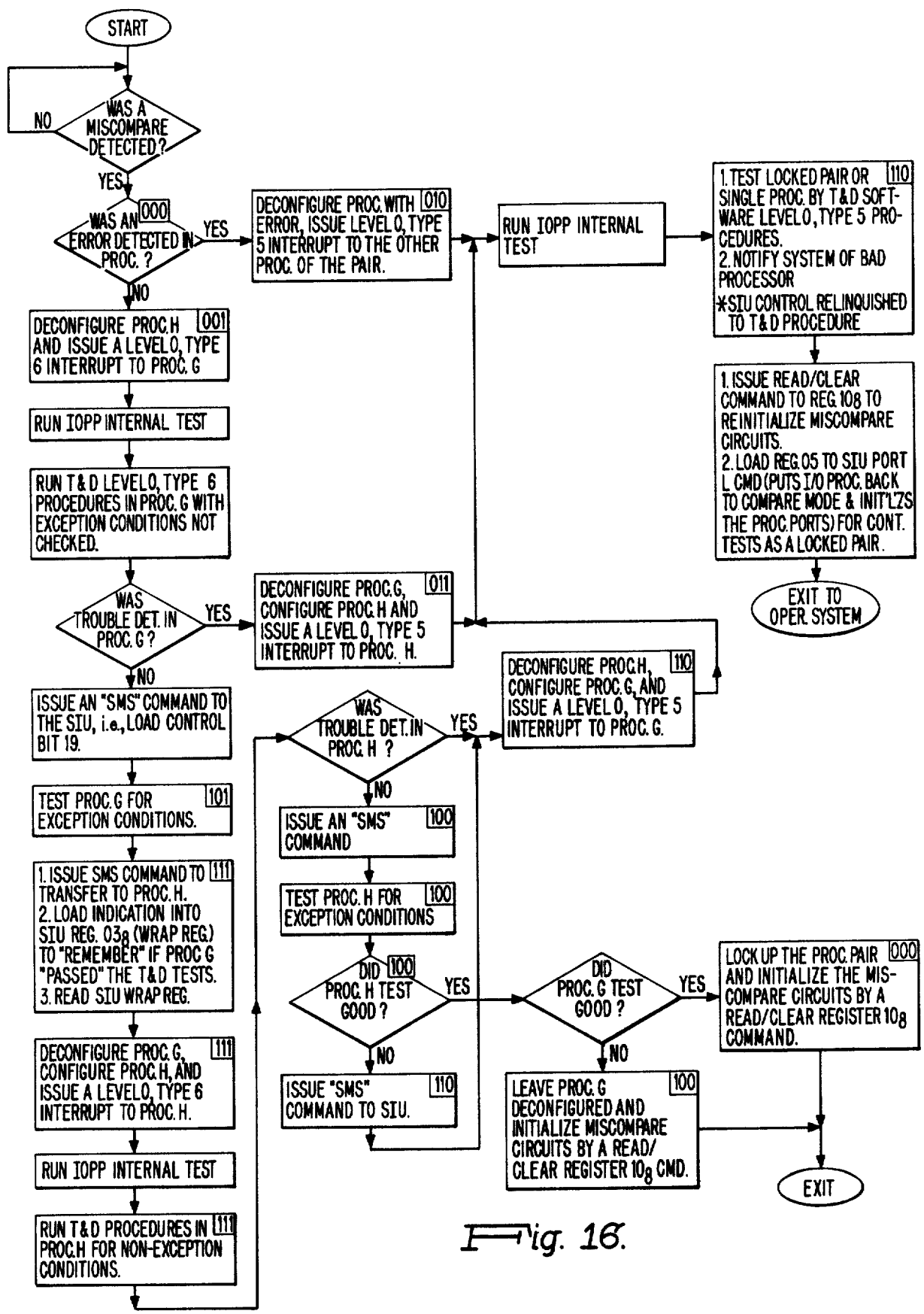
FIG. 16 is a flow chart used in describing the operation of the present invention.

Referring to FIG. 16, it is seen that the circuits 103-102 check on whether there was an error on the processor which will also be stored in fault status register #1 by the circuits of FIG. 3e. Of concern are parity errors detected by the SIU 100 or internally by the processor during the mis-compare. Any parity errors detected are stored in fault status register #1 by the circuits of FIG. 3e along with the designation of the port which was the source of the error (see FIG. 8c).

Figure 15:
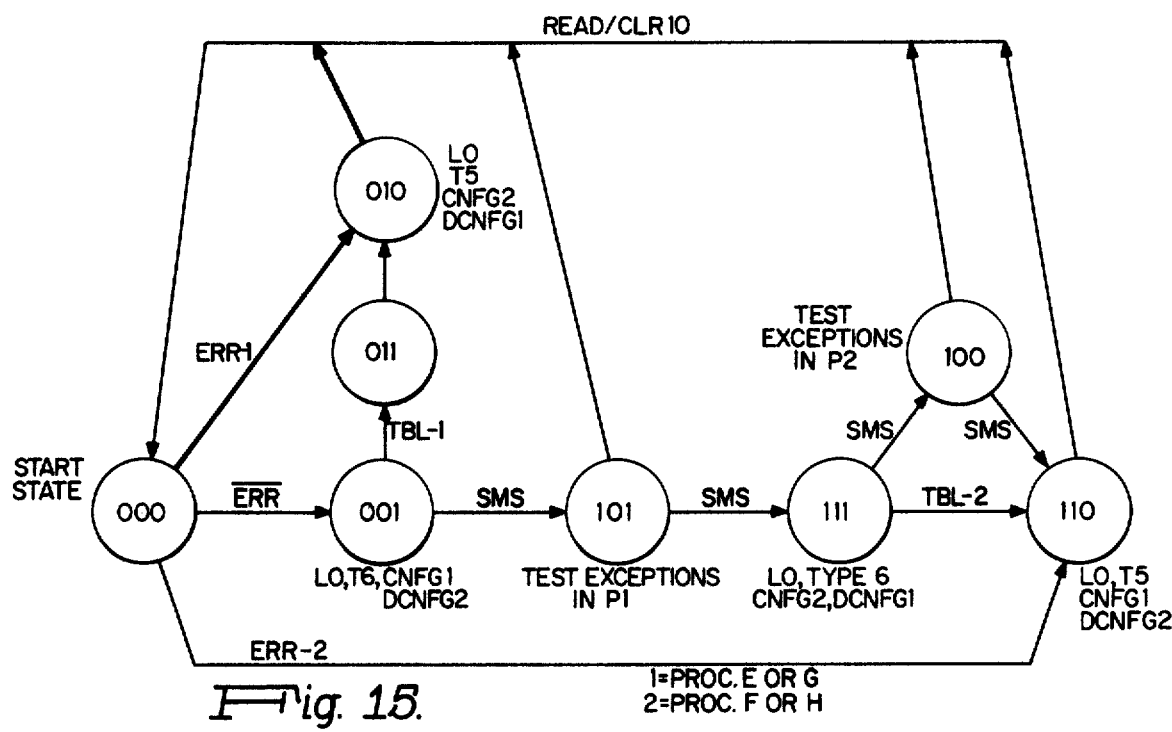
FIG. 15 is a state diagram of a sequencer in accordance with the present invention.

From FIG. 15, it is seen that when the SIU control logic circuits detect an error or there was a processor detected error signalled via the PED lines, the sequencer flip-flops are set to either state 010 or state 110. That is, the mis-compare forces enable signal GHCMPERREN10 to a binary ONE and the Y2 flip-flop 103-104 is switched to a binary ONE via signal SET21GH10.

The signal SET11G10 is forced to a binary ONE when the error detected is associated with processor H. That is, a parity error detected in processor H (REG73100 = 0) or an SIU error detected on port H (HERR00 = 0) forces signal PTHERR10 to a binary ONE when signal YOGH10 from decoder 103-140 is a binary ONE indicating that the sequencer is in state 000.

The SIU circuits of FIGS. 3d and 3f, as explained herein, deconfigure or logically disconnect the processor of the pair having the error by loading signals corresponding to the desired processor configuration into bit positions 33 and 34 of configuration register 103-15. For example, if there was an error detected associated with processor G, the sequencer flip-flops would be forced to state 010. This causes the decoder 103-140 to switch signal DECNFIG10 to a binary ZERO and signal DECNFIH10 to a binary ONE. In greater detail, for an input code of "010", the decoder 103-140 forces only output signal Y2GH10 to a binary ONE. This results in signals DECNFIG10 and DECNFH10 being forced to the states mentioned.

However, where the error detected is associated with processor H, the sequencer flip-flops are forced to state "110". This causes the decoder 103-140 to switch signal DECNFG10 to a binary ONE and signal DECNFH10 to a binary ZERO. That is, for an input code of "011", decoder 103-140 forces only signal Y6GH10 to a binary ONE. The decoder 103-140 also forces signal MISCMPLDCNFG010 to a binary ONE in both cases which loads bit positions 33 and 34 in accordance with the states of signals LDINPT(G)10 and LDINPT(H)10. These signals are generated by the input circuits of FIG. 3f in response to the signals DECNFIGG10 and DECNFIGH10. It should also be noted that states of bit positions 33 and 34 of configuration register 103-15 also establish the states of the processors STOP lines. More specifically, when processor G is configured and processor H is deconfigured, signals STOPG00 and STOPH00 are forced to binary ONE and binary ZERO, respectively. This stops the "clock" of the processor which is not receiving the interrupt request and, thus, "freezes" its state at the time of the error.

In each instance, the decoder 103-140 conditions OR gate 103-154 to generate an interrupt type 5 to the internal interrupt circuits 103-28. This signals the processor receiving the interrupt request that a mis-compare was detected and that an error was detected indicating the bad processor. The signals REG100100 and REG100010 from configuration register 103-15 force signals FORCEPN10 and ALTPN10, respectively, to a binary ONE and binary ZERO. The state of these signals signal the interrupt circuits which logical processor pair is to receive the interrupt request. Since, in this example, processor G or H suffered the mis-compare, all interrupts are directed to that logical pair (i.e., pair P0). The state of signal ALTPN10 specifies the processor pair to receive the interrupt. When signal ALTPN10 is a binary ONE, it designates the processor pair P1 (processor E and F). When signal ALTPN10 is a binary ZERO, it designates the pair P0 (processor G and H).

In greater detail, when either processor pair P0 or P1 is detected to have a mis-compare as indicated by bit positions 0 and 1 of status register #2, this forces the signal FORCEPN10 to a binary ONE. This signals a mis-compare and is used to have the appropriate PN designation loaded into the SIU interrupt request word of FIG. 12. Normally, this designation is specified by the operating system software during the loading of the processor pair and the SIU 100 circuits ensure that the interrupt logic circuits forward the request to processor pair P0 (i.e., load a binary ZERO specified by the state of signal ALTPN10).

Summarizing the above, it is seen that the SIU circuits store information indicating the status of the SIU ports upon detecting a mis-compare. Based upon the status, the SIU circuits deconfigure a processor detected as having an error and issue a level 0 type 5 interrupt to the processor pair detected as having the mis-compare error. At that time, the SIU circuits have completed operations and control is transferred over to the test and diagnostic routines specified via the level 0 type 5 interrupt procedure.

As seen from FIG. 16, the "good" processor performs a self test prior to testing by the test and diagnostic routines. However, the "bad" processor does not have an opportunity to run a self test since its state has been "frozen". During internal testing, the "good" processor should not set the line TBL since the interrupt was directed to the "good" processor and the "bad" processor was deconfigured. If the TBL line should come high, this signals a "fatal" non-recoverable condition which would be reported to the operator in a conventional manner. It should be realized that the possibility of such an error is highly improbable. As explained herein, the "good" processor, upon reaching a point at which self testing is complete, thereafter requests the interrupt request word from the SIU 100 by forcing line IDR to a binary ONE.

Before discussing internal testing or test and diagnostic routines, the situation where no error is detected will be considered. If a mis-compare error occurs, such as on DTS lines, but neither the SIU nor the processors has detected a parity error, then the sequencer flip-flops are forced to state 001, as mentioned. More specifically, in the absence of a parity error, signal ERRGH00 is a binary ONE which, together with signal YOGH10, forces signal SET31GH10 to a binary ONE. The Y1 and Y2 flip-flops 103-130 and 103-131 remain reset because of the absence of detecting parity errors associated with processors G and H.

As seen from FIG. 15, processor G and processor H are to be configured and deconfigured, respectively. In greater detail, the decoder 103-140 of FIG. 3d, in response to the code "001" forces only signal Y1GH10 to a binary ONE. Therefore, signals DECNFIG10 and DECQFIH10 are forced to a binary ONE and a binary ZERO, respectively. At the same time, load configuration register signal MISCMPLDCNFG010 is forced to a binary ONE. This, in turn, loads configuration register bit positions 33 and 34 with values "10". Also, signal Y1GH00 forces signal INTTYPE600 to a binary ZERO generating a type 6 interrupt request to processor G. This signals the detection of a mis-compare bit and that no error was detected indicating which processor of the logical pair is bad. Again, the states of bit positions 33 and 34 of configuration register 103-15 switch the STOPG00 and STOPH00 lines to the appropriate states in addition to forcing processor number signals FORCEPN10 and ALTPN10 to a binary ONE and binary ZERO, respectively. That is, the STOPG00 line is forced to a binary ZERO and the STOPH00 line is forced to a binary ONE. This is effective to "stop" or freeze the state of processor H and to allow processor G to continue operation. A binary ZERO is loaded into the PN bit position of the interrupt request word directed to the SIU internal interrupt logic circuits 103-28. When the interrupt request has priority, this information is forwarded to the interrupt logic circuits 101.

Figure 14:
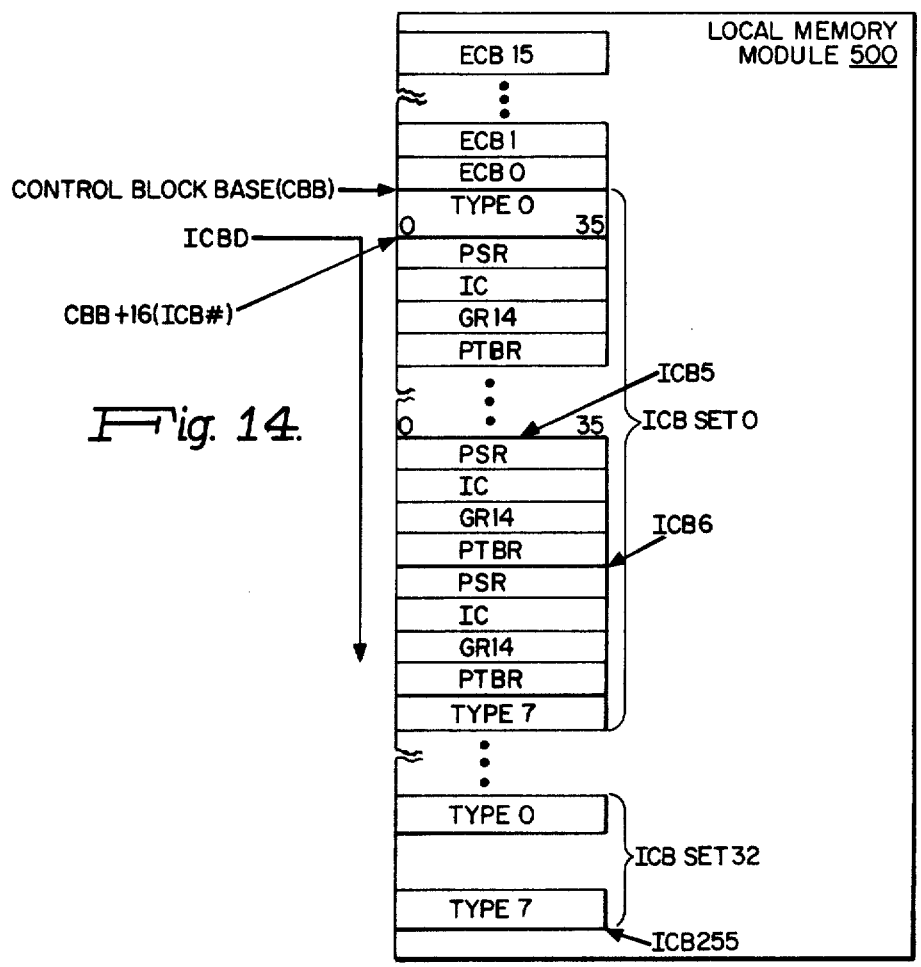
FIG. 14 illustrates an arrangement interrupt control block in memory module 500 for SIU 100.

As seen from FIG. 14, the SIU 100 gives control over to the level 0 routines. The operation of input/output processor 200 will now be discussed in greater detail. As mentioned, there are two types of SIU detected processor errors: type 5 error with mis-compare and type 6 mis-compare without error. These error interrupts cause interrupt control blocks (ICB's) 5 and 6 to be referenced (see FIG. 14). The address pointer IC in each block points to the entry points of the diagnostic routines in local memory 500.

Considering first the situation where the SIU 100 detects a mis-compare error, but no parity errors associated with either processor of pair P0, the SIU100 applies signals indicative of a type 6 interrupt to the internal interrupt logic circuits 103-28. Assuming there is no higher priority interrupt request, the SIU 100 passes along the request to the logic circuits 101. Since type 5 and 6 interrupts are hardwired to level 0, the priority level of the SIU request applied to circuits 101 by port L is ZERO. In the absence of any level 0 requests from other higher priority sources (ports), the SIU logic circuits 101 of FIG. 3a force the LZP line of each interrupt interface 601 to a binary ONE, signalling the presence of a zero level interrupt.

In order to ensure that the processor has accepted the interrupt, the sequencer control circuits 103-102 generate the REINITINTGH10 signal which is applied to the SIU interrupt circuits 101. This lowers and raises the appropriate lines of the interrupt interface.

Referring to FIG. 2, it is seen that the signal applied to the LZP line conditions control store 201-10 to branch to a particular starting storage location. The signal applied to the LZP line overrides the interrupt inhibit signals stored in process control register 204-22 (i.e., inhibits interrupts). Also, the signal applied to the LZP line initiates the start of a time out interval which is twice in duration of the operation not complete period. That is, it conditions the circuits 201-36 to start the counter of block 201-34. The counter is thereafter incremented in response to each system clock pulse.

Upon branching to the starting location, the processor control section 201 is sequenced through microinstructions stored in control store 201-10. The microinstructions condition processor 200 to perform a self check in which a majority of the processor circuits are exercised with a view toward causing an internal error. For example, data signals generated from certain microinstructions are loaded into and read from scratchpad memories 203-10 and 204-4, transferred to the working registers 204-12 through adder/shifter 204-2. The self check test checks a substantial amount of the processor's circuits and, in particular, those circuits which are difficult to check by means of test and diagnostic routines. Thus, the amount of testing the diagnostic programs are required to perform is minimized.

Additionally, arithmetic and logical operations are performed and the result is tested for correctness. When correct, sequencing through control store 201-10 continues to a point where the processor 200 makes a request for interrupt data by forcing line IDR to a binary ONE. That is, when sequencing proceeds properly through control store 210-10, the processor 200 reads out microinstructions for responding to the interrupt request from the SIU 100.

When sequencing does not proceed properly, the processor 200 does not reach the previously mentioned point in the control store 210-10 sequence. This results in the counter of block 201-30 being incremented to an all ONES count signalling the occurrence of the time out. The time out, in turn, causes bit position 16 of the process control register 204-22 to be switched to a binary ONE. The AND circuits of block 201-38, in response to bit position 16's being set, in turn, forces the trouble line TBL to a binary ONE which signals the SIU 100 of the fault. It will be appreciated that the implementation of the shelf check microinstruction sequence can be considered conventional in design for the purpose of the present invention. It could, for example, take the form of certain tests described in the copending patent application of Myrl Kenneth Bailey, Jr., et al., entitled "Diagnostic Testing Apparatus and Method", bearing Ser. No. 533,743, filed Dec. 17, 1974. Also, an example of a self check microinstruction sequence can be found in the copending patent application of Marion G. Porter et al., entitled "Fail Soft Memory", bearing Ser. No. 562,361, filed Mar. 26, 1975. At this time, the SIU sequencer 103-102 is in a state (see FIG. 15) such that it will not switch state in response to the trouble line TBL. However, the trouble indication is stored in fault status register #1.

Assuming that processor 200 executes the self check microinstruction sequence without error, the processor 200 executes a microinstruction which forces the IDR line to a binary ONE. The SIU circuits 101-2 of FIG. 3a in turn are operative to apply to processor pair P0 via interrupt interfaces 602 the interrupt request word data formatted as shown in FIG. 12. The request word includes a level number of ZERO and a code of 110, signalling a mis-compare with no error detected. The steering information is coded to designate SIU port L.

Figure 9:
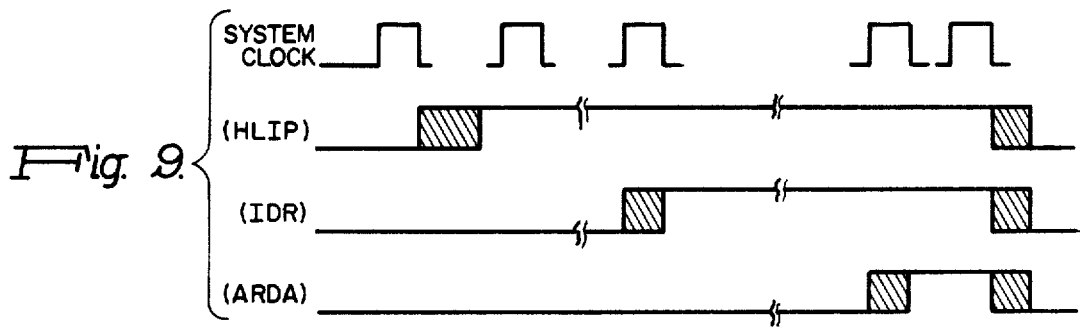
FIG. 9 illustrates the signal sequence for processing an interrupt.
Figure 13:
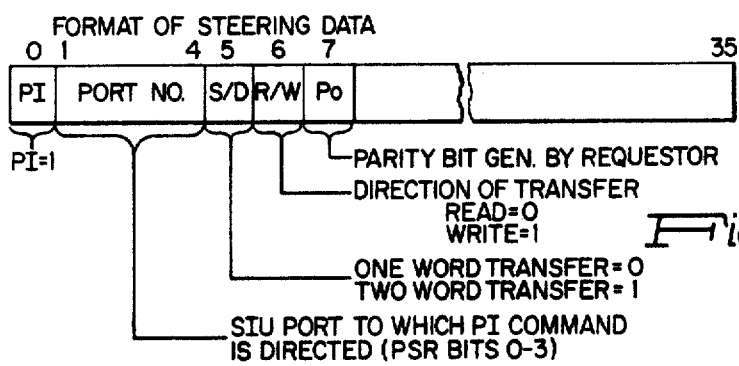
FIG. 13 illustrates the format of one type of steering data.

Upon receipt of the IDR signal, the SIU 100 loads the interrupt level into AIL register 101-6 and applies the interrupt data word signals having the format of FIG. 13 to the DFS lines of each processor interface 600. At the same time, SIU forces the ARDA line to a binary ONE signalling the processor 200 that the interrupt word applied to the DFS lines. This sequence is illustrated in FIG. 9. As soon as the AIL lines are forced to ZEROS, the circuits 201-36 stop and initialize the counter of block 201-34. This signals that the processor 200 operated without trouble and, therefore, was able to assume a level 0 interrupt state.

Referring to FIG. 2, the ARDA line signal causes the interrupt request word to be loaded into the data in register 204-18. At that time, the SIU 100 removes the data from the DFS lines. Additionally, the processor 200 is operative upon receipt of the ARDA signal to reset the AOPR line to a binary ZERO. It will be appreciated that although processor H also receives information applied to the interrupt interface lines, its "stopped" state prevents it from making any response thereto.

Next, processor G, under microprogram control, fetches the control block base (CBB) from scratchpad location zero during the time the interrupt work is loaded into the data in register 204-18. The zero level number signals applied via the AIL lines as an input to switch 203-14 and to the process control register 204-22 establish that the process or routine is to be run at level ZERO. The interrupt word contents are transferred via the DI position of B switch 204-1 through the adder/shifter 204-2 via the adder/shifter position of switch 204-8 into working register IC of register bank 204-12. Also, the scratchpad address register 203-12 is forced to ZEROS to read out the CBB contents from scratchpad 203-10 into buffer 203-16.

For a new interrupt, the primary CBB must be aligned shifting the CBB left 11 bit positions. The CBB is applied to the A operand input of adder/shifter 204-2 via the SPB position of A switch 203-20. The result is transferred via switch 204-8 into working register R2.

Under microprogram control, processor 200 forms the ICB address by first applying the interrupt data contents of the R1 working register via the WRR bus and the WRR position of the A switch 203-20 to adder/shifter 204-2 where they are shifted right by nine bit positions and loaded into working register R2 which stores CBB #1. The shifting removes the ICB number from the interrupt data word. During the same cycle, the contents of working register R2 are then transferred via the WRP bus to buffer 203-16. Next, the ICB number contents from buffer 203-16 are applied via A switch 203-20 to adder/shifter 204-2 and shifted left by four bit positions. The shifted result is then loaded into working register R2. The shifting operation is effective to multiply the ICB number by 16. The adder/shifter 204-2 is operative to sum or combine the contents of the buffer 203-16 applied via the A switch 203-20 and the contents of working register R2 applied via B switch 204-1. The result which identifies the address of the ICB in local memory module 500 is loaded into working register R2.

Referring to FIG. 14, it can be seen that the type 6 defines the particular ICB routine which is to process the SIU mis-compare interrupt. Therefore, processor 200 executes the interrupt routine at the address specified in ICB 6. This routine performs an exhaustive test of the processor.

Figure 11:
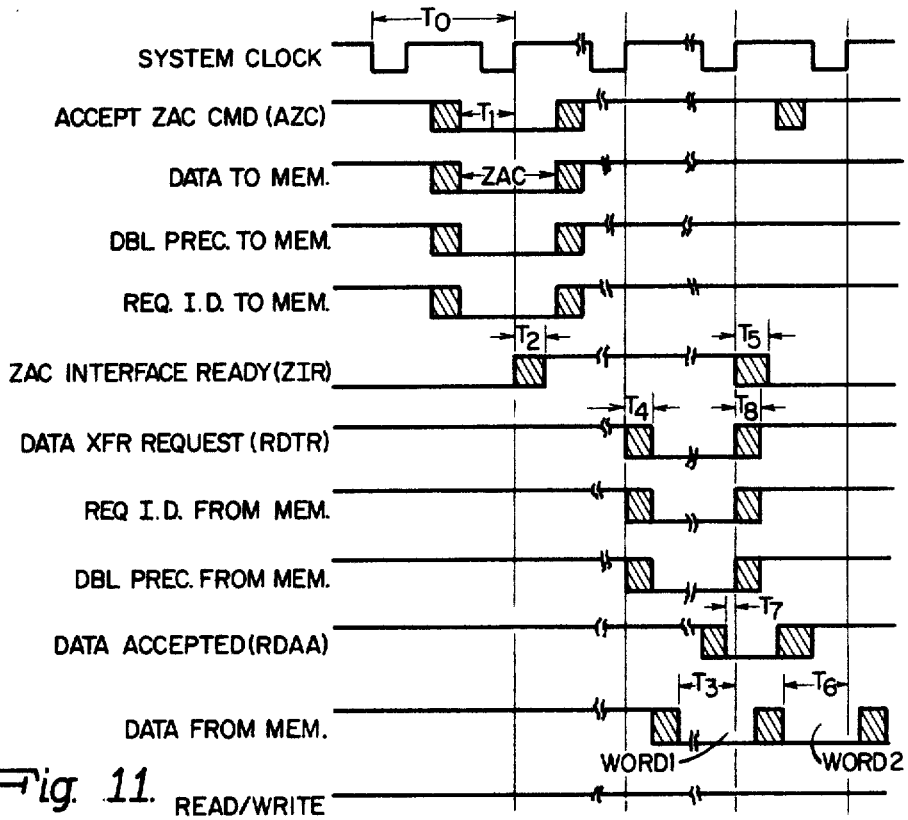
FIG. 11 illustrates in terms of negative logic (i.e., binary ONE = negative transition) the signal sequences for performing memory read operation.

More specifically, under microprogram control, the processor 200 initiates a read double operation for fetching a double word of the ICB (i.e., PSR and IC) from module 500 using the ICB address stored in working register R2. The ICB address, together with other information is loaded into data out register 204-14 from the R2 register via the ABS position of address switch 204-6 and the WRP bus (i.e., ZAC command generated having the format of FIG. 7c). The dialog signal sequence between the SIU 100 and local memory module 500 is illustrated in FIG. 11 and is discussed later herein. Additionally, steering register 204-16 is loaded via the R/W position of steering switch 204-10 and processor 200 forces its AOPR line to a binary ONE to signal SIU 100 of a memory request. Also, the ICB address is incremented by eight and returned to working register R2. The processor 200 then delays execution of further microinstructions until the SIU 100 signals acceptance of the request (i.e., network 102-20 forces the ARA line to a binary ONE).

Next, processor 200 loads the contents of the PCR register 204-22 into working register R3. At this time, working registers R1, R2, and R3 store the interrupt word, the ICB address plus eight, and PCR contents, respectively. The PCR contents stored in the working register R3 are checked to determine that there was a response from the SIU 100 on the ARA or ARDA line. The processor 200, under microprogram control, is operative to generate another double read request to memory module 500 for fetching the next two words of the ICB.

During the checking of the PCR contents, the PSR and IC words from memory module 500 are transferred to data in register 204-18. The first word (i.e., PSR) is transferred via the DI position of B switch 204-1 and adder/shifter 204-2 to working register R3. The second word (i.e., IC) is loaded into the IC working register.

The processor 200 under microprogram control, performs operations necessary to load the interrupt word steering into PSR register 204-20. First, the PSR contents of working register R3 are shifted left by eight bit positions. This eliminates the steering field included in the left most byte of the word since it has no significance to the processing of the interrupt. The result is then transferred to working register R3. The interrupt word contents of working register R1 are transferred to buffer 203-16 via the WRP bus. It will be noted that bits 28-35 include the steering information generated by the SIU 100 and multiplexer 300 which is to be inserted into PSR register 204-20.

During a next cycle of operation, the contents of working register R3 are applied via WRR bus and the WRR position of B switch 204-1 to the B operand input of adder/shifter 204-2 while the contents of buffer 203-16 are applied via the SPB position of A switch 203-20 to the A operand input of adder/shifter 204-2. The A operand and B operand are concatenated and aligned by the shifter to form the new PSR which is transferred to working register R1.

The processor 200 delays execution of further microinstructions until receipt of the next two words of the ICB. Upon receipt of the ARDA signal from the SIU 100, the processor 200 transfers the new PSR contents of working register R1 into PSR register 204-20 via the WRR bus. During subsequenc cycles, the words from the ICB loaded into data in register 204-10 are transferred into the appropriate scratch pad register locations (i.e., GR14 and PTBR addresses). Thereafter, the processor 200 fetches instructions of the program specified by interrupt processing routine using the IC working register contents.

As indicated in FIG. 16, exception conditions are not tested by the initial test routine (not generated intentionally). The tests performed are similar to those basic tests performed by the self check routine, but more extensive as to the combinations of data patterns generated and instruction sequences executed. Thus, this initial phase should test processor 200 without generating any exception conditions. Any SIU detected failures signalled via the TBL line during the execution of this test routine cause the SIU 100 to generate a level 0 type 5 interrupt to the other processor half of the logical pair, here, processor H.

The types of conditions which are detected as processor failures are as follows:

1. operation not complete (ONC), indicating the occurrence of a time out while attempting execution of a processor instruction; and, 2. any other exception condition.

The above failures, as discussed previously, cause different ones of the bit positions of the process control register 204-22 to be switched to binary ONES. Since the processor has entered level 0, an exception condition detected by the processor causes error detection circuits of block 201-30 to force the trouble line TBL to a binary ONE. This is in contrast to the self check routine wherein exception conditions were inhibited from forcing the troule line TBL to a binary ONE. As indicated, it is only when bit position 16 of the process control register 204-22 is forced to a binary ONE upon the occurrence of a time out and when the processor 200 is not in level 0 that the error detector 201-8 forces the trouble line TBL to a binary ONE.

The SIU 100 detects the group one conditions by the processor switching the trouble line TBL to a binary ONE-Group two conditions are detected by the program under execution by its reading of the PCR register contents. Lastly, group three conditions are also detected by the SIU 100 as failures since these are also trapped as exceptions.

Referring to FIGS. 3d, 15, and 16, it is seen that the sequencer control circuits 103-102, in response to trouble line signal PTGTBL12 being forced to a binary ONE, switch to state 011 which is a dummy state. At the next clock pulse, the sequencer circuits 103-102 switch to state 010. This is the same state as that entered in the situation where a mis-compare was detected and the SIU 100 detected a parity error associated with processor G. Accordingly, in the manner previously described, the SIU sequencer circuits 103-102 are operative to configure the good processor H and deconfigure processor G. Also, the circuits force the INTTYPE500 signal to a binary ZERO signalling the level 0 type 5 interrupt to the SIU 100. Again, the STOPG00 and STOPH00 are forced to a binary ZERO and binary ONE, respectively. This enables processor G for operation and freezes the state of processor H. Processor H, in the same manner as processor G, starts execution of the self check routine.

When the initial test routine is executed by processor G without error, the level 0 routine references WREX and RDEX instructions specifying writing information into and reading information from the SIU wrap register 103-17. The WREX and RDEX instructions have the format illustrated in FIG. 6. Each instruction conditions processor 200 to generate under microinstruction control a PI command having the format of FIG. 7a. For further information regarding the specific manner in which such commands are generated, reference may be made to the copending patent application of Garvin W. Patterson et al., entitled "Programmable Interface Apparatus and Method", bearing Ser. No. 562,364, filed Mar. 26, 1975.

Successful execution of the RDEX and WREX instructions verifies the processor's ability to initiate external operations involving other modules of the system of FIG. 1. Upon verifying that the processor can execute these instructions properly, the test routine references a further WREX instruction which conditions processor 200 to generate a PI load control command. This command is formatted as shown in FIG. 7b. This command has bit 19 set to a binary ONE which signals SIU 100 to step the sequencer control circuits 103-102.

Considering the above in greater detail, the PI command is generated by processor 200 and loaded into date out register 204-14. The command includes one level or type of steering information (i.e., bits 5-8). However, the steering information bits in the case of the SIU 100 are ZEROS. Additionally, the processor 200, under microprogram control loads signals from register 201-15 and PSR register 204-20 via the PI position of steering switch 204-10 into bit positions 0-8 of steering register 14. These signals have the format of FIG. 13 and provide another level or kind of steering information for use by the SIU 100 for transferring the PI command to the designated port (i.e., port L).

Following the loading of both registers 204-14 and 204-16, the processor 200 forces the AOPR line to a binary ONE which begins the signal sequence for transfer of the PI command to the SIU 100. Also, the processor 200 increments the instruction counter (IC) and stores the result in working register R3. Then the processor 200 delays execution of the next microinstruction until it receives a signal via the ARA line from the SIU 100 indicating the acceptance of the request.

Figure 10A:
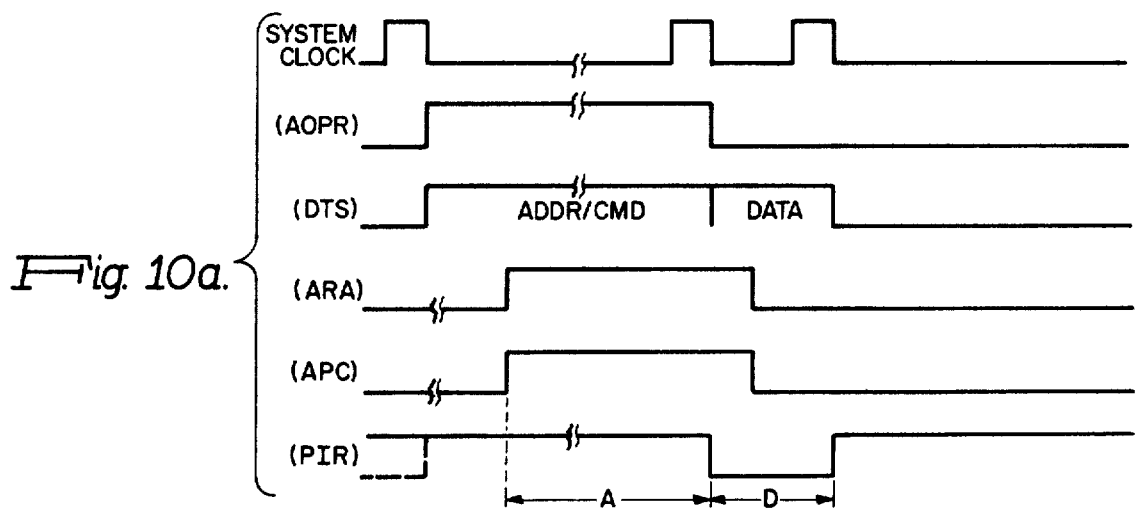
FIGS. 10a and 10b illustrate the signal sequences for transferring a WREX command.
Figure 10B:
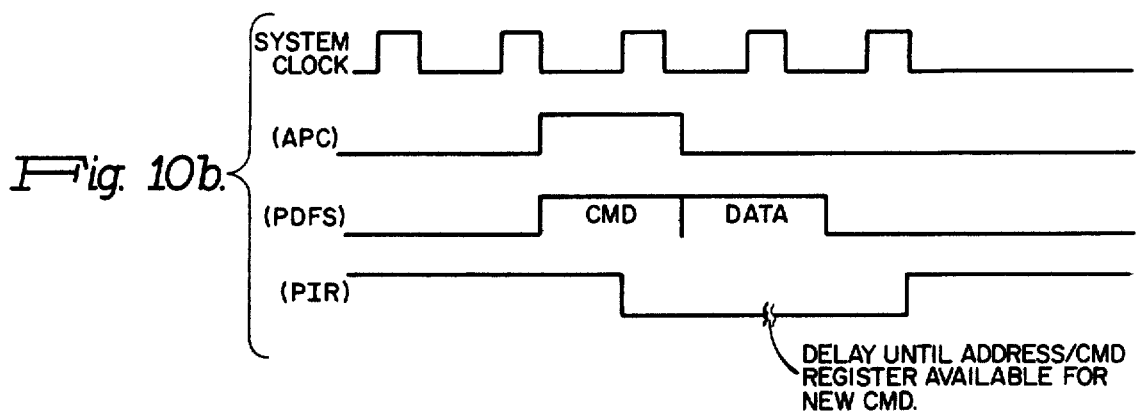

The signal sequence for command transfer is shown in FIG. 10a. The SIU 100 views the PI command as requiring a pair of SIU cycles, an address/command cycle followed by a data cycle designated A and D, respectively, in FIG. 10a. Assuming that the SIU 100 is ready to accept the PI command, the PIR line is a binary ONE. The SIU priority network 102-4 of FIG. 3b is operative to apply the command word via selector switch 102-2 to the PDFS lines of the SIU 100 during the first cycle of operation. The processor 200 waits holding the information in the data out register 204-14 until the SIU 100 switches the ARA line to a binary ZERO.

Upon detecting the change of state in the ARA line, the processor 200, under microinstruction control, completes the processing of the WREX instruction by transferring the data word formatted as shown in FIG. 7a from buffer 203-16 through the adder/shifter 204-2 via the adder/shifter position of switch 204-8 into the data out register 204-14. As seen from FIG. 10a, this word is presented to the SIU 100 during the first clock pulse after the processor 200 detects the change of state in the ARA line. The data word remains on the DTS lines until the occurrence of the next clock pulse at which time the operation is completed.

Referring to FIG. 3c, it is seen that the command word and data word are loaded into the PI register 103-25 and 103-24, respectively, via the PDFS lines. Since this is a load control command, the contents of the data register 103-24 are ignored. The circuits of block 103-20 decode the command bit signals and check its parity. Upon the next clock pulse, the circuits 103-20 force signal SMS10 to a binary ONE.

Referring to FIG. 3d, it is seen that signal SMS10 switches Y1 flip-flops 103-130 to a binary ONE via NAND gates 103-112 and 103-111 by forcing signal SET11GH10 to a binary ONE. As seen from FIG. 15, this steps the sequencer circuits 103-102 to state "101". When in this state, a trouble line indication from the processor does not cause the sequencer circuits 103-102 to setp to a state which could cause the processor to be deconfigured. That is, it inhibits the SIU 100 from responding to trouble line changes in state.

As seen from FIG. 16, the test routines now test processor G for exception conditions to verify that they are being set under the proper conditions. Such testing could involved the writing and reading of information to and from local memory 500. This involves the processor generating memory (ZAC) commands which results in the dialog signal sequence between SIU 100 and local memory module 500, illustrated in FIG. 11.

The processor 200 waits until the SIU network 102-20 of FIG. 3b accepts the request signalled by the AOPR line by line ARA being forced to a binary ONE. Assuming that the SIU 100 has accpeted the request from the processor 200, it then forces the AZC line to a binary ONE which directs module 500 to initiate a data read/write cycle of operation. As indicated in FIG. 11, coincident with setting the AZC line, the requestor I.D. signals, the ZAC command signals, and double precision signal originating from the processor 200 are applied to the RITM lines, the DTM lines and SLTM lines, respectively, of interface 603 in response to signals from network 102-20.

As mentioned previously, the local memory module 500 retains the requestor I.D. signals which it returns to the SIU 100 as steering information with the data read. Referring to FIG. 11, it is seen that the local memory module 500 responds by switching the ZIR line to a binary ZERO. This enables the SIU 100 to disable the requestor path. The local memory module 500 initiates the transfer of data to the SIU 100 by forcing the RDTR line to a binary ONE in addition to placing the requestor I.D. originating from the processor 200 and a double precision signal on the RIFM lines and the DPFM line, respectively, of interface 603.

The SIU 100 responds to the switching of the RDTR line by forcing the RDAA line to a binary ONE as shown in FIG. 11. This signals the local memory module 500 that the path to requestor module 200 is open and to proceed with the data transfer. The signal to the RDAA line also causes the module 500 to place a second data word on interface 603 at the trailing edge of the clock pulse following the receipt of the signals on the RDAA line as shown in FIG. 11. At the completion of the operation, as soon as the module 500 is ready to accept another command, it switches the ZIR line to a binary ONE.

At the time of forcing the RDAA line, the SIU 100 notifies the requesting module 200 that a data word is being applied to its DFS lines by forcing the ARDA line to a binary ONE (see FIG. 9).

During exception testing, it will be appreciated that a failure for the processor G to generate an exception condition is recorded by the diagnostic test routine. Status indications as to the results of exception testing are stored in the wraparound register 103-17 via a PI load register command issued to the SIU port L. Also, status indications as to the processor G tested is also stored in wraparound register 103-17.

As seen from FIG. 15, the software, upon examining the results of such testing, can also issue a PI read and clear command to the fault status register #1. Here, bit 28 of the PI command is set to a binary ONE (see FIG.

7a). The command decoder circuits 103-20 generate the appropriate control signals to clear the register designated after its contents are read. The read and clear command is the response to reset the source of an interrupt in the system. That is, the status stored in either fault status register #1 or #2 due to exception testing produces an interrupt. By having exception testing take place while the sequencer is in state 101, this isolates the sequencer from responding to changes in state in the trouble line TBL, as mentioned before.

As seen from FIG. 16, following the exception testing, processor 200 is operative to execute another WREX instruction coded to specify a step mis-compare sequence (SMS) load control command to the SIU 100. As described previously, this causes the command decode logic circuits 103-20 to generate signal SMS10. This, in turn, switches the sequencer circuits 103-102 to state 111. In greater detail, the signal SMS10 conditions NAND gates 103-120 and 103-121 to switch signal SET22GH10 to a binary ONE. This switches Y2 flip-flop 103-131 to a binary ONE.

The switching of the sequencer circuits 103-102 by the second SMS command causes the SIU 100 to deconfigure processor G, configure processor H, and issue a level 0, type 6 interrupt to processor H (see FIGS. 15 and 16). In greater detail, when the Y1, Y2, and Y3 flip-flops 103-130 through 103-132 are all ONES, the decoder 103-140 of FIG. 3d, in response to a code of 111, forces signal Y7GH10 to a binary ONE. This forces deconfiguration signals DECNFIGG10 and DECNFIGH10 to a binary ZERO and binary ONE, respectively. Also, signal Y7Gh10 forces signal INTTYPE600 to a binary ZERO conditioning the SIU interrupt circuits 103-28 to generate the level 0, type 6 interrupt. The changes in states of the configuration register bit positions 33 and 34 force the stop signals STOPG00 and STOPH00 to the appropriate states (i.e., stop processor G and enable processor H for operation).

Upon switching to state 111, it will be noted that this causes the reinitializing of the interrupt. As mentioned, once a level 0 interrupt is generated by the SIU interrupt logic circuits 101, the circuits cannot generate or issue another level 0 interrupt until the first interrupt is cleared. The circuits of FIG. 3d (i.e., NAND gates 103-100, 103-162, and AND gate 103-161) by forcing the reinitialize signal REININTINTGH10 to a binary ONE, cause the interrupt logic circuits 101 to force the high level interrupt present (HLIP) to a binary ONE and apply the level 0 signals again to the ALL lines. The reason, as indicated previously, is that the interrupt request signals only designate the particular logical processor pair (here, pair P0) and not the particular processor. Therefore, when the trouble line is raised, it is not certain whether processor G or H has encountered the problem. Therefore, each timp the sequencer circuits sequence to state 111, the interrupt logic circuits 101 are initialized.

As seen from FIG. 16, processor H begins execution of its self check routine. The self check and initial test routine are performed in the manner previously described. In the event of a failure as signalled by the state of the trouble line TBL during such testing, signal PTHTBL00 is forced to a binary ZERO. This switches the sequencer circuits from state "111" to "110".

In greater detail, signal PTHTBL00 causes NAND gate 103-126 to switch signal SET32GH10 to a binary ZERO. Since signal SET31GH10 is a binary ZERO at this time, the Y3 flip-flop 103-132 of FIG. 3d is reset to a binary ZERO.

As seen from FIG. 15, this causes the SIU circuits to configure processor G and deconfigure processor H in addition to generating a level 0, type 5 interrupt. It will be noted from FIG. 15 that this is analogous to what happens with respect to processor 200 connected to port G when the sequencer circuits switch from state "001" to "010" (i.e., state "111" ≃ "001").

Accordingly, the SIU 100 generates the necessary control signals in the manner previously described. In greater detail, upon being switched to state "110", the decoder circuits 103-140 of FIG. 3d force signal Y6GH10 to a binary ONE. This, in turn, forces the configuration signals DECNFIGG10 and DECNFIGH10 to a binary ONE and a binary ZERO, respectively. This causes bit positions 33 and 34 of configuration register 103-15 to switch to "10", enabling processor G and disabling processor H via the stop lines STOPG00 and STOPH00. Also, signal YGGH00 forces level 0, type 6 interrupt signal INTTYPE500 to a binary ZERO.

If a trouble indication from processor H is not detected during the execution of both the internal self check routine or initial diagnostic routine, the diagnostic routine executes a WREX instruction which directs an SMS command to the SIU port L. In the manner described previously, the command decode circuits 103-20 force signal SMS10 to a binary ONE. This causes the sequencer circuits 103-102 to switch from state "111" to state "100", as illustrated in FIG. 15.

In greater detail, signal SMS00, when forced to a binary ZERO, switches signal SET32GH10 to a binary ZERO. Since signal SET31GH10 is a binary ZERO at this time, the Y3 flip-flop 103-132 is reset to a binary ZERO. In a similar fashion, signal SMS00 switches signal SET22GH10 to a binary ZERO. Since signal SET21GH10 is a binary ZERO at this time, the Y2 flip-flop 103-131 is reset to a binary ZERO.

While the sequencer circuits 103-102 are in state "100", the test routine tests exception conditions in the manner previously described in connection with processor G. Depending upon the results of such testing, the test routine can either issue a read and clear command to status register #2 clearing the mis-compare error condition which is followed by another PI command which reinitializes bit positions 33 and 34 of configuration register 103-15 again placing the processors G and H in the locked or compare mode (i.e., set bit positions 33 and 34 to binary ONES).

The above would be done, for example, where it was determined that processor H tested good. This signals the case of an intermittent or transient error condition. Each error is recorded on an error file and a threshold is established for intermittent failures in terms of the number of railures per unit of time. When the error rate exceeds the threshold, the system software generates a message to an operator console requesting initiation of a special diagnostic routine.

It will also be noted that the original level 0, type 6 interrupt could have resulted from an SIU error as opposed to a processor error. Therefore, the system software as an alternative can perform an intermediate test of the mis-compare circuits within the SIU 100. At this point, the processor pair P0 has already been tested with the error detected having been isolated specifically to a mis-compare error on one of the processor interface lines.

In accomplishing such testing, the system programs/data are loaded from an auxiliary or backup source in a conventional manner following the loading of the new processor configuration into register 103-15. The loading is accomplished via PI command to register (octal 5) of SIU port L. This command enables the loading of configuration register 103-15 and initialize register 103-16. That is, the command decoder circuits 103-20 generate signals which load bit positions 5-27 of register 103-16 and bit positions 20-35 of configuration register 103-15. The contents of the initialize register 103-16 establish which port(s) is/are to receive an initialize pulse of a predetermined width (i.e., 1.4 microseconds). This is generated by the initialize control circuits 103-18 (i.e., by a conventional one shot circuit triggered by a binary ONE in bit positions 0-27).

If, during exception testing, a problem or error were encountered, the diagnostic routine executes a WREX instruction coded to specify as SMS command. As seen from FIG. 16, this switches the sequencer circuits from state "100" to state "100". This change in state is analogous to going from state "001" to state "010."

Considering the above in greater detail, signal SMS10 conditions NAND gate 103-120 of FIG. 3d to switch signal SET22GH10 to a binary ONE. At this time, NAND gate 103-117 forces signal SET21GH10 to a binary ONE in turn setting Y2 flip-flop 103-131 to a binary ONE. The decoder 103-140 is conditioned by flip-flops 103-130 through 103-132 to force signal Y6GH10 to a binary ONE. In the manner previously described, configuration signals DECNFIGG10 and DECNFIGH10 cause processor G to be configured and processor H to be deconfigured. Also, a level 0, type 5 interrupt is issued to processor G in response to signal INTTYPE500 being forced to a binary ONE by signal Y6GH00.

As seen from FIGS. 15 and 16, the sequencer circuits 103-102 remain in state 110 until the issuance of another read and clear command. In the manner described, processor G begins execution of the self-check routine which should be completed without error (assume single errors). Thereafter, processor G answers the type 5 level 0 interrupt whereupon it transfers control to the routine designated by ICB5 of FIG. 14.

As mentioned previously, the type 5 interrupt defines that the identity of the processor producing the miscompare error is known. In the sequencing just described, the good processor was determined by actual testing. However, from FIG. 15, it is seen that the sequencer circuits 103-102 also enter state "110" when the SIU circuits have detected a parity error associated with processor H at the time the mis-compare error was detected. It will be appreciated that state "110" is equivalent to state "010" which the sequencer circuits 103-102 assume when the SIU circuits detected a parity error associated with processor G at the time of the detected miscompare error. Also, the state "010" is entered from state "001" when "trouble" was detected in processor G.

Accordingly, the test routine referenced by the level 0 type 5 interrupt operates to examine the contents of the fault status registers #1 and #2 to determine whether the entry into the routine was caused by entry from the level 0 type 6 error routine. In the case where the entry was from the level 0 type 6 error routine, the system is reloaded and restarted in the manner previously described. The sequencer circuits 103-102 are returned to an initial state "000" via a read/clear command.

When the entry into level 0 type 5 routine is caused by the SIU 100 having detected the bad processor, the SIU 100 causes the other or "good" processor to perform a self test test operation in the manner previously described. This situation arises when the SIU 100 detects a parity error associated with processor H or detects an error during testing of processor H after processor G tested good in the case of state 110, or detects a parity error associated with processor G in the case of state 010.

As seen from FIG. 16, the level 0 type 5 routine is operative to report the status of fault status registers #1 and #2 as well as the contents of the process control register 204-22 of FIG. 2. This indicates to the system the identity of the "bad processor".

Also, the diagnostic routine issues a load register 5 command followed by a read and clear command to fault status register #2. This places the processor pair back into the locked or compare mode for further testing by the operating system software.

Thereafter, the operating system has the capability of determining whether to continue operation with one processor. That is, it will simply cause a restart of the system, loading the configuration register 103-15 with the appropriate value. Thereafter, the operating system is able to provide for periodic testing of the single configured processor thereby ensuring system reliability.

From the foregoing, it is seen that the apparatus of the present invention is able to determine reliably the presence of a failed processor of a logical processor pair. This is accomplished in a manner which ensures that a processor is established as being bad only by means of positive indication through direct detection of an error or by testing of the bad processor following testing of a good processor.

It will be appreciated that many modifications may be made to the preferred embodiment of the present invention such as changes to the individual processor pairs, to the sequence control circuits and to other units without departing from the teachings of the present invention. Additionally, it will be obvious to those skilled in the art that signals representative of other types of error conditions may also be signaled to the SIU 100 and used for testing purposes.

While in accordance with the provisions and statutes there has been illustrated and described the best forms of the invention known, certain changes may be made to the system described without departing from the spirit of the invention as set forth in the appended claims and, in some cases, certain features of the invention may be used to advantage without a corresponding use of other features.

What is claimed is:

1. An input/output system for controlling input/output operations involving a plurality of input/output devices, said system comprising:
   a plurality of modules, each having an interface port said plurality of modules including at least one memory module and a plurality of command modules each including means for generating output signals including commands said plurality of command modules including a plurality of input/output processing units and a multiplexer module coupled to said plurality of input/output devices; and,
   system interface means having a plurality of interface ports, each port being connected to a different one of said interface ports of said plurality of modules for communication of input and output signals by said system interface means between said modules, said system interface means further including:

configuration register means coupled to the ports of said input/output processing units for storing bit pattern signals coded for designating different configurations of said plurality of input/output processing units to be enabled for operation, said register means initially storing signals representative of an initial locked configuration bit pattern designating at least a pair of said identical plurality of input/output processing units as enabled for operation in a locked mode wherein each processing unit of said locked pair processes the same input signals in an identical manner to generate identical output signals including command to said multiplexer module and memory module required for execution of said input/output operations;

comparison circuit means individually connected to the interface ports of each of said plurality of input/output processing units, said comparison circuit means for comparing sets of said output signals from pairs of said interface ports of said input/output processing units paired for normal operation in said locked mode, said comparison circuit means being operative to generate signals indicative of a miscomparison between any one of said sets of output signals; and, sequence control means connected to said comparison circuit means and to said register means, said sequence control means being operative in response to said signals indicative of said miscomparison to switch said register means from said locked mode configuration bit pattern to an unlocked mode configuration bit pattern wherein only one input/output processing unit of said pair is enabled for operation to permit first testing for reliably establishing which process unit of said pair is faulty.

2. The system of claim 1 wherein each port of each input/output processing unit includes an error notification interface for signaling internal errors detected by said input/output processing unit associated therewith and wherein said system interface means further includes error register means operatively coupled to said error notification interface of each processing unit for storing first signal indications of said internal errors, said sequence control means being connected to said error register means, said first signal indications from said register means, conditioning said sequence control means to switch from an initial state to a predetermined state for conditioning said configuration register means to switch to a predetermined unlocked bit configuration pattern for disabling the operation of an input/output processing unit of said pair with internal errors and for enabling the other potentially good input/output processing unit of said pair for diagnostic testing.

3. The system of claim 2 wherein said system interface means further includes check circuit means connected to said ports of each of said input/output processing units, said check circuit means being operative to generate check error signals for indicating the invalidity of each set of output signals received from each of said plurality of input/output processing units, said check circuit means being connected to said error register means for conditioning said error register means to store second indications of said check error signals, and said sequence control means being conditioned by said check error signals to switch from said initial state to said predetermined state for altering the pattern stored in said configuration register means to enable deconfiguration of said input/output processing unit of said pair with internal errors and configuration of said potentially good processing unit of said pair for diagnostic testing.

4. The system of claim 2 wherein each said error notification interface includes a plurality of control lines, a first one of each plurality of control lines for selectively stopping the enabling of said input/output processing unit associated therewith, and wherein said system interface configuration register means further includes a plurality of bit positions for storing signals corresponding to said different bit configuration patterns, each of said register bit positions being connected to a different first one of said control lines of each processing unit error notification interface.

5. The system of claim 4 wherein each input/output processing unit includes:

a clocking unit for generating timing signals, said clocking unit being connected to said first control line of said error notification interface; and, a microprogram controlled unit connected to said clocking unit, said microprogram controlled unit storing sequences of microinstruction words for generating control signals for directing the operation of said input/output processing unit, said first control line when switched to a first predetermined state by the content of one bit position inhibiting the operation of said clocking unit to prevent further operation of said microprogram controlled unit and freeze the state of one of said input/output processing units at the time an error is detected by said system interface means.

6. The system of claim 2 wherein each input/output processing unit includes a number of circuits including:

a clocking unit for generating timing signals for said input/output processing unit, said clocking unit being connected to said error notification interface; and a microprogram controlled unit connected to said clocking unit, said microprogram controlled unit storing sequences of microinstruction words for generating control signals for directing the operation of said input/output processing unit, one of said sequences being coded to include a self-test sequence of microinstructions for exercising a majority of said number of circuits; and, said system interface means further including:

interrupt means connected to said sequence control means; and, status register means connected to said comparison circuit means for storing indications of said miscomparison, said status register means conditioning said interrupt means to direct an interrupt request via said port to the pair of input/output processing units designated by said status register means to have said miscomparison, said clocking unit of said good processing unit of said pair being enabled by said error notification interface causing said microprogram controlled unit in response to said interrupt request to reference said self-test sequence of microinstructions for verifying that said potentially good processing unit is operating properly.

7. The system of claim 6 wherein each input/output processing unit further includes:

fault detection means connected to receive a signal indication of said interrupt request, said fault detection means being operative to detect when said potentially good input/output processing unit is unable to execute successfully said self-test sequence of microinstructions; and means connecting said fault detection means to said error notification interface for signaling said system interface means of a fault condition in the absence of successful execution of said self-test sequence.

8. The system of claim 7 wherein said error notification interface includes a trouble indication line connected to said means, and wherein said fault detection means includes internal timer means for generating a time out signal at the end of a predetermined time interval, said timer means being connected to said clocking unit for advancing through said time interval, said signal indication of said interrupt request conditioning said timer means to start said time interval, and said means being conditioned by said time out signal to force said trouble indication line to a predetermined state indicating said fault to said system interface means.

9. The system of claim 8 wherein said interrupt request is coded to specify one of a plurality of types for designating which one of a plurality of test and diagnostic routines is to be executed by said potentially good input/output processing unit during the further testing thereof.

10. The system of claim 9 wherein said memory module including a plurality of storage locations for storing a number of different interrupt control blocks coded to identify a predetermined one of said test and diagnostic routines; and, wherein each input/output processing unit further includes interrupt control means coupled to receive said interrupt request, said interrupt control means of said good input/output processing unit following successful execution of said self-test sequence being operative to process said interrupt request from said system interface means and reference the particular one of said interrupt control blocks from said memory module specified by the type of interrupt request.

11. The system of claim 10 wherein each input/output processing unit further includes:

error detection means connected to said trouble indication line, said error detection means for signaling errors detected during the execution of different ones of said test and diagnostic routine; and, said interrupt control means being conditioned by the referenced one of said interrupt control blocks to reference a first one of said test and diagnostic routines specified by the coding of said referenced interrupt control blocks, said potentially good input/output processing unit being conditioned by said first one of said test and diagnostic routines to test more extensively the circuits tested during said self-test sequence, said error detection means being operative upon detecting an error during the execution of said first one of said test and diagnostic routines to force said trouble indication line to said predetermined state for signaling said system interface means of trouble in said potentially good input/output processing unit.

12. The system of claim 11 wherein said first one of said test and diagnostic routines including at least one predetermined type of instruction for generating a predetermined type of command to said system interface means;

said system interface means further including command decoder means operatively connected to said port of each of said plurality of input/output processing units, said command decoder means being conditioned by said predetermined state to said initial state for conditioning said configuration register means to switch to said configuration to a locked bit pattern enabling said pair to continue diagnostic tests in said locked mode.

13. The system of claim 1 wherein said system interface means further includes:

timing unit for generating clock signals defining successive cycles of operation to synchronize the operation of said system, and said comparison circuit means being connected to receive said clock signals for comparing said sets of said output signals from said pairs of said interface ports during each of said successive cycles of operation.

14. The system of claim 13 wherein said system interface means further includes:

indicator means connected to said configuration register means, said indicator means being conditioned by said configuration register means to forward to a display utilization device signals indicative of said different configurations assumed by said plurality of input/output processing units during the operation thereof.

15. The system of claim 13 wherein said system interface means further includes:

command decoder means operatively connected to said port of each of said input/output processing units, said command decoder means being conditioned by a command from any one of said input/output processing units to generate signals for switching said sequence control means to said initial state for operation in said locked configuration mode.

16. The system of claim 1 wherein each port of each input/output processing unit includes an error notification interface for signaling internal errors detected by each said input/output processing unit, and wherein said system interface means includes check circuit means connected to each said port of each input/output processing unit, said check circuit means for detecting check errors indicating the invalidity of said output signals received from each said input/output processing unit, and status register means connected to said error notification interface and said check circuit means, said status register means for storing indications of said internal errors and said check errors for indicating potentially good and bad processing units, said sequence control means including a plurality of bistable storage devices connected to said status register means, said bistable storage devices being conditioned by said indications from said status register means in response to a miscompare signal to switch from an initial state to a first one of a number of states in a first sequence of predetermined states when said indications designate that one of said processing units of said pair was detected to have an error, and said plurality of said bistable storage devices being conditioned to switch from said initial state to a first one of a number of states of a second sequence of of predetermined states when said indications designate that none of said processing units of said pair was detected to have an error, said register means being conditioned by said plurality of said bistable storage devices to switch from said initial locked configuration bit pattern to an unlocked configuration bit pattern to enable selectively said good and bad processing units of said pair for testing in a predetermined manner established by said first and second sequences of state for reliably establishing which processing units are bad.

17. The system of claim 16 wherein said plurality of said bistable storage devices when in a first state of said first sequence of predetermined states conditions said configuration register means to switch from said locked configuration bit pattern coded for enabling and disabling the potentially good and bad processing units respectively, and wherein said plurality of said bistable storage devices when in a first state of said second sequence of predetermined states conditions said register means to switch from said locked mode configuration bit pattern to said unlocked mode configuration bit pattern coded for enabling and disabling first and second ones of said processing units of said pair.

18. The system of claim 17 wherein said first one of said first sequence corresponds to a code of either "010" or "110" and wherein said first one of said second sequence corresponds to a code of "110".

19. The system of claim 17 wherein each input/output processing unit includes a number of circuits including:

a clocking unit for generating timing signals for sequencing said input/output processing unit, said clocking unit being connected to said error notification interface; and, a microprogram controlled unit connected to said clocking unit, said microprogram controlled unit storing sequences of microinstruction words for generating control signals for directing the operation of said input/output processing unit, one of said sequences being coded to include a self-test sequence of microinstructions for exercising a majority of said number of circuits; and said system interface means further including:

interrupt means connected to said sequence control means; and, comparison register means connected to said comparison circuit means for storing indications of said miscomparisons, said comparison register means conditioning said interrupt means to direct via said ports an interrupt request to the pair of input/output processing units designated by said comparison register means to have produced said miscomparison, said clocking unit of said first one of said pair being enabled by said error notification interface causing said microprogram controlled unit in response to said interrupt request to reference said self-test sequence of microinstruction for verifying that said first one of said processing units is operating properly.

20. The system of claim 19 wherein each input/output processing unit further includes:

fault detection means connected to receive a signal indication of said interrupt request from said system interface means, said fault detection means being operative to detect when said input/output processing unit is unable to execute successfully said self-test sequence of microinstructions; and, means connecting said fault detection means to said error notification interface for signaling said system interface means of a fault condition in the absence of successful execution of said self-test sequence.

21. The system of claim 20 wherein said interrupt request is coded to specify one of a plurality of types for designating which one of a plurality of test and diagnostic routines is to be executed by one of said input/output processing units during the further testing thereof.

22. The system of claim 21 wherein said memory module includes a plurality of storage locations for storing a number of different interrupt control blocks coded to identify a predetermined one of said test and diagnostic routines; and, wherein each input/output processing unit further includes interrupt control means coupled to receive said interrupt request, said interrupt control means following successful execution of said self-test sequence being operative to process said interrupt request from said system interface means and reference the particular one of said interrupt control blocks from said memory module specified by the type of interrupt request.

23. The system of claim 22 wherein each input/output processing unit further includes:

error detection means connected to said trouble indication line, said error detection means for signaling errors detected during the execution of different ones of said test and disgnostic routine; and, said interrupt control means being conditioned by the referenced one of said interrupt control blocks to reference a first one of said test and diagnostic routines specified by the coding of said referenced interrupt control blocks, said one of said input/output processing units being conditioned by said first one of said test and diagnostic routines to test more extensively the circuits tested during said self-test sequence, said error during the execute of said first one of said test and diagnostic routines to force said trouble indication line to said predetermined state for signaling said system interface means of trouble.

24. The system of claim 23 wherein said first one of said test and diagnostic routines including at least one predetermined type of instruction for generating a predetermined type of instruction for generating a predetermined type of command to said system interface means;

said system interface means further including command decoder means operatively connected to said port of each of said plurality of input/output processing units, said command decoder means being conditioned by said predetermined type of command to switch said bistable storage devices from said first state of said second sequence to a second state of said second sequence for inhibiting further switching of said bistable storage devices in response to signals from said error notification interface; and, each input/output processing unit further including:
process control register means for storing exception conditions, said process control register means being connected to said error detection means, said error detection means of said one of said processing units being operative to condition said process control register means to store signals indicative of exception conditions during the execution of said test and diagnostic routine following the switching of said bistable storage devices to said second state.

25. The system of claim 24 wherein said first state and said second state correspond to codes of 001 and 101 respectively.

26. The system of claim 24 wherein said test and diagnostic routines include instructions for generating memory commands for reading and writing information from and to said memory module.

27. The system of claim 24 wherein said test and diagnostic routines include another one of said predetermined type of instruction for generating said predetermined type of command, said command decoder means being conditioned by said predetermined type of command to switch said bistable storage devices from said second state to a third state of said second sequence, said bistable storage devices conditioning said configuration register means to switch from said unlocked mode configuration bit pattern coded for enabling and disabling said first and second ones of said processing units to another unlocked mode configuration bit pattern coded for disabling and enabling said first and second ones of said processing units for testing both of said processing units of said pair in accordance with a sequence similar to said second sequence of predetermined states to establish reliably which one of said processing units is faulty.

28. The system of claim 27 wherein said third state corresponds to a code of "111".

29. The system of claim 27 wherein said interrupt means of said system interface means further includes initialization circuit means operatively connected to each of said ports, said bistable storage devices when in said third state conditioning said interrupt means to direct an interrupt request fo said one of said plurality of types via said port to said pair having said miscompare and to condition said initialization circuit means to signal said pair of said interrupt requests.

30. The system of claim 29 wherein said fault detection means of said second one of said processing units of said pair is operative to detect when said second processing unit is unable to execute successfully said self-test sequence of microinstructions; and,
said means connecting said fault detection means conditioning said error notification interface for signaling said system interface means of a fault condition upon unsuccessful execution of said self-test sequence.

31. The system of claim 30 wherein said bistable storage devices are conditioned by said error notification interface means to switch from said third state to a fourth state in said second sequence, said bistable storage devices conditioning said configuration register means to switch from said another unlocked mode configuration bit pattern to said unlocked mode configuration bit pattern for enabling and disabling said first and second ones of said processing units.

32. The system of claim 31 wherein said fourth state corresponds to a code of "110".

33. An input/output system for controlling input/output operations involving a plurality of input/output devices, said system comprising:
a plurality of modules, each having an interface port, said plurality of modules including at least one memory module and a plurality of command modules each, including means for generating output signals including commands, said plurality of command modules including a number of pairs of input/output processing units and a multiplexer module coupled to said plurality of input/output devices; and,
system interface means having a plurality of interface ports, each being connected to a different one of said plurality of modules for communication of sets of input and output signals by said system interface means between said module, said system interface means further including:
configuration register means coupled to the ports of each of said processing units for respectively storing bit patterns coded for signals designating different configurations for said number of pairs of input/output processing units enabled for operation, said configuration register means being set to a locked bit configuration pattern for enabling one of said pairs of input/output processing units for normal operation in a compare mode wherein each processing unit of said locked pair processes the same input signals in an identical manner to generate identical output signals including said commands to said multiplexer and memory modules required for execution of said input/output operations in response to identical instructions;
comparison circuit means individually connected to the interface ports of each of said plurality of input/output processing units, said comparison circuit means for comparing sets of said output signals from pairs of said interface ports of said input/output processing units, said comparison circuit means being operative to generate signals indicative of a miscomparison between any one of said sets of output signals; and,
mulitstate sequence control means connected to said comparison circuit means and to said configuration register means, said sequence control means being operative in response to said signals indicative of said miscomparison to switch from an initial state to a first state in a predetermined sequence, said configuration register means being conditioned by said sequence control means to switch from said locked mode configuration to a first unlocked mode configuration wherein only one input/output processing unit of said one pair is enabled for operation in a non-compare mode to permit testing of said one processing unit of said pair for reliably establishing which processing unit of said pair is faulty.

34. A system of claim 33 wherein each port of each input/output processing unit includes an error notification interface for signaling internal errors detected by said input/output processing unit associated therewith and wherein said system interface means further includes status register means operatively coupled to said error notification interface of each processing unit for storing first signal indications of said internal errors, said sequence control means being connected to said register conditioning said sequence control means to switch from said initial state to said first state for conditioning said configuration register means to switch to said first unlocked mode configuration bit pattern for disabling said input/output processing unit of said one pair with internal errors and for enabling the other potentially good input/output processing unit of said one pair for diagnostic testing.

35. The system of claim 34 wherein said system interface means further includes check circuit means connected to said ports of said input/output processing units, said check circuit means being operative to generate check error signals for indicating the invalidity of said output signals received from each of said plurality of input/output processing units, said check circuit means being connected to said status register means for conditioning said status register means to store second indications of said check error signals, and said sequence control means being conditioned by said check error signals to switch from said initial state to said first state enabling deconfiguration of said input/output processing unit of said one pair with internal errors and configuration of said potentially good processing unit of said one pair for diagnostic testing.

36. The system of claim 33 wherein each port of each input/output processing unit includes an error notification interface for signaling internal errors detected by each said input/output processing unit, and wherein said system interface means includes check circuit means connected to each said port of each input/output processing unit, said check circuit means for detecting check errors indicating the invalidity of said input and output signals applied to and received from each said input/output processing unit, and status register means connected to said error notification interface and said check circuit means, said status register for storing indications of said internal errors and said check errors for indicating potentially good and bad processing units of said number of pairs of input/output processing units;

said sequence control means including a plurality of bistable storage devices connected to said status register means, said bistable storage devices being conditioned by said indications from said status register means in response to a miscompare signal to switch from an initial state to said first state in said predetermined sequence when said indications designate that one of said processing units of said pair was detected to have an error, and said plurality of said bistable storage devices being conditioned to switch from said initial state to a first state in another predetermined sequence when said indications designate that none of said processing units of said pair was detected to have an error, said configuration register means being conditioned by said plurality of said bistable storage devices to switch from said locked mode configuration bit pattern to said first unlocked mode configuration bit pattern to enable selectively said good and bad processing units of said pair testing in a manner established by said predetermined sequence and said another predetermined sequence for reliably establishing whether and one processing unit of said one pair is bad.

37. The system of claim 36 wherein said plurality of said bistable storage devices when in a first state of said predetermined sequence conditions said configuration register means to switch from said locked mode configuration bit pattern to said first unlocked mode configuration bit pattern coded for enabling and disabling the potentially good and bad processing units respectively, and wherein said plurality of said bistable storage devices when in a first state of said another predetermined sequence conditions said configuration bit pattern to a second unlocked mode configuration bit pattern coded for enabling and disabling first and second ones of said processing units of said pair.

38. The system of claim 37 wherein said number of said pairs include processor pairs, P0 and P1, said pairs P0 and p1 including processing units G and H and E and F respectively, said locked mode configuration bit pattern corresponding to a code "11" for enabling either processing units E and F or G and H, said first unlocked mode configuration bit pattern corresponding to a code "10" for enabling only processing units E or G and said second unlocked mode configuration corresponding to a code "01" for enabling only processing units F or H.

39. An input/output system for controlling input/output operations involving a plurality of input/output devices, said system comprising:

a plurality of modules, each having an interface port, said plurality of modules including at least one memory modules and a plurality of command modules each including means for generating output signals including commands through said port, said plurality of command modules including a plurality of input/output processing means for executing input/output operations involving said plurality of input/output devices and a multiplexer module coupled to said input/output devices, each of said processing means including first and second halves, each half including an input/output processor; and, system interface means having a plurality of interface ports, each being connected to a different one of said plurality of modules for communication of sets of input and output signals by said system interface means between said modules, said system interface means further including:

configuration register means coupled to the ports of each of said processing means for storing bit patterns coded for designating different configurations for said plurality of processing means, said configuration register means being set to an initial locked configuration bit pattern for enabling at least one of said plurality of of processing means for operation wherein each half of said locked processing means processes the same input signals in an identical manner to generate identical output signals including said commands to said memory and multiplexer modules required for execution of said input/output operations;

comparison circuit means individually connected to the interface ports of each of said halves of said input/output processing means, said comparison circuit means for comparing sets of said output signals from halves of said interface ports of said input/output processing means, said comparison circuit means being operative to generate signals indicative of a miscomparison between any one of said sets of output signals; and, sequence control means connected to said comparison circuits means and to said configuration register means, said sequence control means being operative in response to said signals indicative of said miscomparison to switch said configuration register means from said locked mode configuration bit pattern to an unlocked mode configuration bit pattern wherein only one half of said processing means is enabled for operation for testing of said half of said processing means pair for reliably establishing which half of said processing means is faulty.

40. The system of claim 39 wherein each port of each half includes an error notification interface for signaling internal errors detected by each said half, and wherein said system interface mans includes check circuit means connected to each said port of each half, said check circuit means for detecting check errors indicating the invalidity of said output signals received from each said half, and status register means connected to said error notification interface and said check circuit means, said status register means for storing indications of said internal errors and said check errors for indicating potentially good and bad processors;

said sequence control means including a plurality of bistable storage devices connected to said status register means, said bistable storage devices being conditioned by said indications from said status register means in response to a miscompare signal to switch from an initial state to a first one of a number of states in a first sequence of predetermined states when said indications designate that one of said halves of said processing means was detected to have an error, and said plurality of said bistable storage devices being conditioned to switch from said initial state to a first one of a number of states of a second sequence of predetermined states when said indications designate that neither half of said processing means was detected to have an error, said configuration register means being conditioned by said plurality of said bistable storage devices to switch from said initial configuration bit pattern to an unlocked mode configuration bit pattern to enable selectively said potentially good and bad halves of said processing means for testing in a predetermined manner and established by said first and second sequences of states for reliably establishing which input/output processors are actually bad.

41. The system of claim 40 wherein said plurality of said bistable storage devices when in a first state of said first sequence of predetermined states conditions said configuration register means to switch from said locked mode configuration bit pattern to said unlocked mode configuration bit pattern coded for enabling and disabling the potentially good and bad halves respectively, and wherein said plurality of said bistable storage devices when in a first state of said second sequence of predetermined states conditions said configuration register means to switch from said locked mode configuration bit pattern to said unlocked mode configuration bit pattern coded for enabling and disabling first and second halves of said processing means.

* * * * *